United States Patent
Tsutsui et al.

(10) Patent No.: US 6,353,807 B1
(45) Date of Patent: Mar. 5, 2002

(54) INFORMATION CODING METHOD AND APPARATUS, CODE TRANSFORM METHOD AND APPARATUS, CODE TRANSFORM CONTROL METHOD AND APPARATUS, INFORMATION RECORDING METHOD AND APPARATUS, AND PROGRAM PROVIDING MEDIUM

(75) Inventors: Kyoya Tsutsui; Osamu Shimoyoshi, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/304,928

(22) Filed: May 4, 1999

(30) Foreign Application Priority Data

| May 15, 1998 | (JP) | ................................. 10-152064 |
| May 15, 1998 | (JP) | ................................. 10-152065 |
| May 15, 1998 | (JP) | ................................. 10-152066 |
| May 15, 1998 | (JP) | ................................. 10-152067 |
| May 15, 1998 | (JP) | ................................. 10-152068 |

(51) Int. Cl.[7] ............................................. G10L 19/02
(52) U.S. Cl. ........................ 704/230; 704/201; 704/224; 704/500
(58) Field of Search ................................. 704/200, 201, 704/229, 222, 224, 230, 500, 501, 502, 503, 504, 203, 205, 206, 220, 223, 258, 266, 268, 269

(56) References Cited

U.S. PATENT DOCUMENTS

| 5,349,549 | A |   | 9/1994 | Tsutsui ........................ 364/725 |
| 5,381,143 | A |   | 1/1995 | Shimoyoshi et al. .......... 341/51 |
| 5,438,643 | A | * | 8/1995 | Akagiri et al. ............... 704/201 |
| 5,454,011 | A |   | 9/1995 | Shimoyoshi ................. 375/240 |
| 5,548,574 | A | * | 8/1996 | Shimoyoshi et al. ....... 369/124 |
| 5,553,193 | A | * | 9/1996 | Akagiri ....................... 704/229 |
| 5,642,111 | A | * | 6/1997 | Akagiri ........................ 341/50 |
| 5,819,214 | A |   | 10/1998 | Suzuki et al. ................ 704/229 |
| RE36,683 | E | * | 5/2000 | Tsutsui ........................ 704/229 |

OTHER PUBLICATIONS

D. Huffman, "A Method for the Construction of Minimum–Redundancy Codes," Proceedings of the I.R.E., vol. 4, No. 2, 1952, 1098–1101.

J. Princen et al., "Analysis/Synthesis Filter Bank Design Based on Time Domain Aliasing Cancellation," IEEE Transactions on Acoustics, Speech, and Signal Processing, vol. ASSP–34, No. 5, Oct. 1986, pp. 1153–1161.

R. Zelinski et al., "Adaptive Transform Coding of Speech Signals," IEEE Transacti on Acoustics, Speech, and Signal Processing, vol. ASSP–25, No. 4, Aug. 1977, pp. 299–309.

M.A. Krasner, "The Critical Band Coder—Digital Encoding of Speech Signals Based onthe Perceptual Requirements of the Auditory System," ICASSP Proceedings, 1980, 327–331.

(List continued on next page.)

Primary Examiner—Richemond Dorvil
(74) Attorney, Agent, or Firm—Sonnenschein, Nath & Rosenthal

(57) ABSTRACT

A code transform apparatus performs fast data transform by enabling intercode data transform. The code transform apparatus includes a code-string decomposing unit for inputting a first code string obtained by coding a spectral signal which has been transformed with a first block length after a time-series information signal had been divided into a first band group. A signal-component decoding unit decodes the input first code string into a spectral signal. A spectral-signal transform unit transforms the decoded spectral signal into a spectral signal which is transformed with a second block length after being divided into a second band group. A signal-component coding unit and a code-string generating unit code the transformed spectral signal into a second code string.

139 Claims, 23 Drawing Sheets

OTHER PUBLICATIONS

R.E. Crochiere et al., "Digital Coding of Speech In Sub-Bands," The Bell System Technical Journal, vol. 555, No. 8., Oct. 1976, pp. 1069–1085.

J. Rothweiler, "Polyphase Quadrature Filters—A New Sub-band coding Technique," ICCASSP Proceedings ICCASP 83, Boston, 1983.

International Standard, ISO/IEC 11172–3, Information Technology—Coding Moving Pictures and Associated Audio for Digital Storage Media at Up to About 1,5 MBIT/S—Part 3: Audio, First Edition, 1993.

* cited by examiner

INFORMATION CODING METHOD AND APPARATUS, CODE TRANSFORM METHOD AND APPARATUS, CODE TRANSFORM CONTROL METHOD AND APPARATUS, INFORMATION RECORDING METHOD AND APPARATUS, AND PROGRAM PROVIDING MEDIUM

BACKGROUND OF THE INVENTION

1. Field of the Invention

The present invention relates to a method and an apparatus for transforming coded information signals. The invention also relates to a program providing medium on which a program for transforming coded information signals is recorded.

2. Description of the Related Art

High-efficiency coding methods are known in which the amount of data for audio or sound signals is compressed with very little loss in the acoustic quality. Various high-efficiency coding methods for coding audio or sound signals are available and include, for example, the non-block frequency band division technique, i.e., the subband coding (SBC) technique, and the block frequency-band division technique, i.e., the transform coding technique. In the subband coding technique, an audio signal in the time domain is divided into a plurality of frequency bands and coded rather than forming the audio signal into blocks. In the transform coding technique, a signal in the time domain is transformed (spectrum-transformed) into a signal in the frequency domain, and is divided into a plurality of frequency bands. The signal component in each band is then coded.

As a filter used for frequency division, a quadrature mirror filter (QMF) may be used, which is discussed in the technical document "R. E. Crochiere, *Digital coding of speech in subbands,* Bell Syst. Tech. J., Vol. 55, No. 8, 1976".

In the above-described QMF filter, aliasing components generated by signals decimated to a half rate after performing frequency division are canceled by aliasing components generated when the signals in the respective bands are synthesized. Because of this characteristic, the loss incurred by coding can be almost completely eliminated if the signal components in the respective bands are coded with a sufficiently high precision.

In the technical document "Joseph H. Rothweiler, *Polyphase Quadrature filters—A new Subband coding technique,* ICASSP 83, BOSTON, 1983", a polyphase quadrature filter (PQF) filter used in the equal-bandwidth filter division technique is described. In this PQF filter, aliasing components generated by the signal components between the adjacent bands, which are decimated to a rate in accordance with the bandwidth after performing frequency division, are canceled by aliasing components generated by the signal components between the adjacent bands when the signal components in the respective bands are synthesized. Because of this characteristic, the loss incurred by coding can be almost completely eliminated if the signal components in the respective bands are coded with a sufficiently high precision.

As the aforementioned spectrum transform, the following type of spectrum transform, for example, is known. An input audio signal is formed into blocks with a predetermined unit time (frame), and discrete Fourier transform (DFT), discrete cosine transform (DCT), modified discrete cosine transform (MDCT), etc. may be performed on the signal component in each block, thereby transforming the time domain signal into signal components in the frequency domain. The MDCT is discussed in, for example, the technical document "J. P. Princen, A. B. Bradley, *Subband/Transform Coding Using Filter Bank Designs Based on Time Domain Aliasing Cancellation,* ICASSP 1987, Univ. of Surrey Royal Melbourne Inst. of Tech.".

According to the above-described DFT or DCT used as a method for transforming a waveform signal into a spectrum, the waveform signal is transformed by a time block having M number of samples so as to obtain M independent items of real-number data. In order to reduce the connection distortion between the time blocks, samples are generally overlapped by M1 number of samples between adjacent blocks. Accordingly, in the DFT or DCT, M items of real-number data are quantized and coded in relation to (M–M1) number of samples.

On the other hand, according to the above-described MDCT used as a method for transforming a waveform signal into a spectrum, M independent items of real-number data are obtained from 2M samples having an overlapping portion between adjacent time blocks of M number of samples. Accordingly, in the MDCT, M items of real-number data are quantized and coded in relation to M samples. For example, in a decoder, the codes obtained by using the MDCT are inverse-transformed in the respective blocks so as to produce waveform elements. The waveform elements are then added while interfering with each other, thereby reconstructing the waveform signal.

Generally, by increasing the length of the time block used for transforming, the frequency resolution of the spectra is increased to concentrate energy in a specific spectral component. Thus, by using the MDCT in which transforming is conducted with a longer block having an overlapping portion by an amount of a half block between adjacent blocks, and in which the obtained number of spectral signal components is not more than the original number of time samples, coding can be performed with higher efficiency than in the aforementioned DFT or DCT.

Additionally, a sufficient length of the overlapping portions is provided between adjacent blocks, thereby reducing the interblock distortion of a waveform signal. However, a larger work area for transforming is required with an increased length of the transform block, thereby hampering the miniaturization of, for example, reproduction means. This causes an increase in cost, particularly when it is difficult to increase the integration level of a semiconductor.

According to the above description, signal components divided into the respective bands by using a filter or spectrum transform are quantized, which makes it possible to control the bands in which quantizing noise is generated. By further utilizing characteristics, such as the masking effect, acoustically higher-efficiency coding can be performed.

The masking effect is an effect in which louder sounds acoustically mask softer sounds. By utilizing this effect, the generated quantizing noise can be acoustically masked by the original signal sound. Thus, the sound quality of the compressed signal is almost the same as that of the original signal. For effectively utilizing the masking effect, however, it is necessary to control the generation of the quantizing noise in the time domain or in the frequency domain. For example, if quantizing noise is generated for a few microseconds or greater during a small magnitude of signal immediately before the attack portion in which the magnitude of signal sharply increases, it is no longer masked by the signal sound. This further brings about the loss of sound quality to such a degree as to be uncomfortable from an auditory point of view, which is referred to as "pre-echo". To overcome this drawback, the block length used in transforming a waveform signal into spectral signal components is changed in accordance with the characteristics of the signal component in the corresponding block. Before performing quantization, the signal component in each band is normalized by the maximum of the absolute value of the signal component, thereby making it possible to perform higher-efficiency coding.

To determine the frequency division width used for quantizing the individual frequency components, a band division technique may be employed by considering human auditory characteristics. For example, in a bandwidth that increases toward the higher range, which is generally referred to as the "critical band", the band division technique for dividing an audio signal into a plurality of, for example, 25 bands may be employed.

Data in each band is coded by performing predetermined bit allocation or adaptive bit allocation. For example, in coding coefficient data obtained by the aforementioned MDCT according to the above-described bit allocation, the MDCT coefficient data in each band obtained by performing the aforementioned MDCT on each block is coded with the adaptively allocated number of bits.

As the bit allocation methods, the following two methods are known.

In a first method, bit allocation is conducted based on the magnitude of a signal component in each band. According to this method, a quantizing noise spectrum becomes flat to minimize noise energy. However, since the masking effect is not utilized, the actual acoustic perception is not optimized. The above-described first method is discussed in the technical document "R. Zelinski and P. Noll, *Adaptive Transform Coding of Speech Signals*, IEEE Transactions of Acoustics, Speech and Signal Processing, vol. ASSP-25, No. 4, August 1977".

In a second method, a signal-to-noise ratio required for each band is obtained by utilizing the auditory masking effect, and then, fixed bit allocation is performed. According to this method, however, bit allocation is fixed even when the characteristics are measured with a sine wave input, thus failing to exhibit very good characteristic values. The above-described second method is discussed in the technical document "M. A. Kransner, MIT, *The critical band coder—digital encoding of the perceptual requirements of the auditory system*, ICASSP 1980".

To solve the problems inherent in the aforementioned methods, the following high-efficiency coding method has been proposed. All the bits usable for bit allocation are divided between the fixed bit allocation pattern in which a predetermined number of fixed bits are allocated to the individual small blocks, and the bit allocation pattern in which bits are allocated according to the magnitude of a signal component in each block. The division ratio between the patterns is determined by a spectral signal (for example, by a normalized signal) related to the input signal. The ratio of the fixed bit allocation pattern becomes higher in response to a smoother spectrum of the signal.

According to the above method, if sine waves are input, in which case, energy concentrates in a specific spectral component, a greater number of bits are allocated to the block containing such a specific spectral component, thereby remarkably improving the overall signal-to-noise ratio. Generally, humans are extremely sensitive to signals having sharp spectral components. Accordingly, by improving the signal-to-noise ratio by using the above method, not only the measurement values are improved, but also the sound quality is effectively enhanced.

In addition to the aforementioned method, many other bit allocation methods have been proposed. If acoustic models are becoming more precise with higher performance of coding apparatuses, higher-efficiency coding can be achieved from the auditory point of view. In such methods, generally, the real-number bit-allocation reference value that can most faithfully implement the calculated signal-to-noise ratio is determined, and the integer approximating the bit-allocation reference value is determined to be the number of bits to be allocated.

In constructing an actual code string, the quantizing precision information and the normalizing coefficient information for each band in which quantization and normalization are conducted are first coded with a predetermined number of bits, and the normalized and quantized spectral signal is then coded. In the technical document "ISO/IEC 11172-3: 1993(E)", a high-efficiency coding method in which the number of bits representing the quantizing precision information varies according to the band is described. This method is standardized in such a manner that the number of bits representing the quantizing precision information becomes smaller with respect to a higher frequency range.

Hitherto, instead of directly coding the quantizing precision information by a decoder, a method for determining the quantizing precision information from the normalizing coefficient information is known. In this method, however, when standards are set, the relationship between the normalizing coefficient information and the quantizing precision information is determined. It will thus be impossible to control the quantizing precision based on a higher-level acoustic model. Additionally, if there is a variation in the compression ratio, it is necessary to determine the relationship between the normalizing coefficient information and the quantizing precision information according to each compression ratio.

If an acoustic signal is formed of a plurality of channels, the aforementioned methods are applicable to the respective channels of the acoustic signal. For example, the above-described methods are applicable to an L channel corresponding to the left side speaker and to an R channel corresponding to the right side speaker. Also, the above methods may be used for a signal (L+R)/2 obtained by adding the signals of the respective L and R channels. Alternatively, high-efficiency coding may be performed by employing the above methods for a signal (L+R)/2 and a signal (L−R)/2 obtained from the signals of the two channels.

By focusing attention on the fact that stereo sound is dominantly influenced by signals in the low frequency range, a method for narrowing the band of the signal (L−R)/2 more than that of the signal (L+R)/2 may be considered. According to this method, efficient coding can be performed with a fewer number of bits while maintaining good acoustic stereo sound.

Another high-efficiency coding method for coding quantized spectral signals is known using a variable code, which is described in the technical document "D. A. Huffman, *A Method for Construction of Minimum Redundancy Codes*, Proc. I.R.E., 40, p. 1098 (1952)".

The following method is considered. Tone components, which are particularly important from the acoustic point of view, i.e., signal components having energy concentrating around a specific frequency are removed from a spectral signal and are coded separately from the other spectral components. According to this method, audio signals can be efficiently coded with a high compression ratio with very little loss in acoustic quality.

In this manner, various methods for enhancing the coding efficiency are being progressively developed. By employing standards integrating a newly developed method, the recording period becomes longer, and audio signals having a higher quality can be recorded with the same recording period.

As a method for mapping time-series audio signals in the time domain or the frequency domain, a method for combining the aforementioned band division coding technique and the transform coding technique is considered. In this method, after band division is performed by using a band division filter, a signal component in each band is spectrum-transformed into a signal component in the frequency domain. Coding is then performed on the spectral signal component in each band.

The advantages of performing spectrum transform by, for example, the MDCT after conducting band division by a band division filter are as follows.

The transform block length can be optimally set for each band so as to optimize the generation of quantizing noise in the time domain or the frequency domain from an acoustic point of view, thereby improving the sound quality. Generally, spectrum transform, such as MDCT, is usually performed by a fast computation method, such as fast Fourier transform (FFT), which requires a memory area having a size proportional to the block length. For example, by performing spectrum transform on a signal, which has been decimated in proportion to the bandwidth of each band, after conducting band division, the number of samples of spectrum transform for obtaining the same frequency resolution can be decreased, thereby requiring only a smaller memory area for spectrum transform.

If it is desired that a coded signal be reproduced in a decoder having the smallest possible scale of hardware, though sound quality does not have to be high, signal data only in the low frequency range is processed, thereby achieving the above-mentioned result.

Thus, the compression method in which spectrum transform is performed by using a combination of the band division filter and spectrum transform, such as MDCT, can be implemented by using comparatively small-scale hardware. Accordingly, this type of compression method is very convenient for portable recorders. However, the amount of computation is increased since a large number of product-sum operations are required to implement the band division filter.

When code strings transmitted via a communication channel having a relatively small transmission capacity are to be recorded on a recording medium having a comparatively large recording capacity, or when code strings are to be transmitted via a communication channel having a large transmission capacity over a short period and are to be recorded at a high rate on a recording medium having a relatively large recording capacity, it is necessary to employ a high-efficiency coding method in such a communication channel. To meet the above requirement, spectrum transform having a long transform block is desirably used to obtain a high frequency resolution.

Additionally, when code strings are to be recorded on a recording medium having a relatively large capacity, spectrum transform having a comparatively short transform block is desirably employed in order to implement coding or decoding in comparatively small-scale hardware. In particular, when code strings are to be recorded on a recording medium for use in portable machines, it is convenient that spectrum transform be performed after conducting band division in order to reduce the memory size of a decoder. If the signal transmitted via a communication channel is completely decoded and reproduced into the time-series signal, and the time-series signal is then coded to obtain a code string for a recording medium, a predetermined code string can be recorded on the recording medium. However, this requires the processing of the band division filter, which increases the amount of computation. In particular, when the code string is to be transmitted via a communication channel having a comparatively large transmission capacity over a short period and is to be recorded on a recording medium having a relatively large recording capacity, it is necessary to perform fast code-string transform. However, by performing band division processing, which requires a large amount of computation, the time required for recording the code string on the recording medium becomes longer.

In particular, when transforming signals of a plurality of channels, a greater amount of processing is required. This makes it more difficult to perform fast transform by using conventional methods.

SUMMARY OF THE INVENTION

Accordingly, in view of the above background, it is an object of the present invention to provide an information coding method and apparatus, a coding transform method and apparatus, a code transform control method and apparatus, and an information recording method and apparatus, all in which fast data transform is performed by enabling intercode data transform, and also to provide a program providing medium on which a program implementing one of the above-described methods is recorded.

In order to achieve the above object, according to one aspect of the present invention, there is provided an information coding method including: an input step of inputting a first code string obtained by coding a spectral signal which has been transformed with a first block length after a time-series information signal had been divided into a first band group; a decoding step of decoding the input first code string into the spectral signal; a spectral-signal transform step of transforming the decoded spectral signal into a spectral signal which is transformed with a second block length after being divided into a second band group; and a coding step of coding the transformed spectral signal into a second code string.

According to another aspect of the present invention, there is provided an information coding apparatus including input means for inputting a first code string obtained by coding a spectral signal which has been transformed with a first block length after a time-series information signal had been divided into a first band group. Decoding means decodes the input first code string into the spectral signal. Spectral-signal transform means transforms the decoded spectral signal into a spectral signal which is transformed with a second block length after being divided into a second band group. Coding means codes the transformed spectral signal into a second code string.

According to still another aspect of the present invention, there is provided a program providing medium for providing an information coding program to an information processing apparatus. The information coding program includes: an input step of inputting a first code string obtained by coding a spectral signal which has been transformed with a first block length after a time-series information signal had been divided into a first band group; a decoding step of decoding the input first code string into the spectral signal; a spectral-signal transform step of transforming the decoded spectral signal into a spectral signal which is transformed with a second block length after being divided into a second band group; and a coding step of coding the transformed spectral signal into a second code string.

According to a further aspect of the present invention, there is provided a code transform method including: an input step of inputting a first code string obtained by coding time-series information signals corresponding to a plurality of channels; and a transform step of transforming the input first code string into a second code string which reproduces the time-series information signals having the same higher band when being decoded.

According to a yet further aspect of the present invention, there is provided a code transform apparatus including input means for inputting a first code string obtained by coding time-series information signals corresponding to a plurality of channels. Transform means transforms the input first code string into a second code string which reproduces the time-series information signals having the same higher band when being decoded.

According to a further aspect of the present invention, there is provided a code transform method including: an input step of inputting a first code string obtained by coding time-series information signals corresponding to a plurality of channels; and a transform step of transforming the input first code string into a second code string by reproducing the plurality of channels of the time-series information signals having the same higher band and by assigning weights to the respective channels of the information signals.

According to a further aspect of the present invention, there is provided a code transform apparatus including input means for inputting a first code string obtained by coding time-series information signals corresponding to a plurality of channels. Transform means transforms the input first code string into a second code string by reproducing the plurality of channels of the time-series information signals having the same higher band and by assigning weights to the respective channels of the information signals.

According to a further aspect of the present invention, there is provided a program providing medium for providing a code transform program to an information processing apparatus. The code transform program includes: an input step of inputting a first code string obtained by coding time-series information signals corresponding to a plurality of channels; and a transform step of transforming the input first code string into a second code string which reproduces the time-series information signals having the same higher band when being decoded.

According to a further aspect of the present invention, there is provided a program providing medium for providing a code transform program to an information processing apparatus. The code transform program includes: an input step of inputting a first code string obtained by coding time-series information signals corresponding to a plurality of channels; and a transform step of transforming the input first code string into a second code string by reproducing the plurality of channels of the time-series information signals having the same higher band and by assigning weights to the respective channels of the information signals.

According to a further aspect of the present invention, there is provided a code transform control method in which a plurality of code transform operations for transforming a first code string into a second code string are selectable. The code transform control method includes the step of selecting one of the plurality of code transform operations based on input transform-operation-rate control information.

According to a further aspect of the present invention, there is provided a code transform control apparatus including a plurality of code transform operation means for transforming a first code string into a second code string. Code transform selection means selects one of the plurality of code transform operation means based on input transform-operation-rate control information.

According to a further aspect of the present invention, there is provided a program providing medium for providing a code transform control program to an information processing apparatus. In the code transform control program, a plurality of code transform operations for transforming a first code string into a second code string are selectable. The information coding program includes a step of selecting one of the plurality of code transform operations based on input transform-operation-rate control information.

According to a further aspect of the present invention, there is provided an information recording method including: an input step of inputting a first code string obtained by coding a spectral signal which has been transformed with a first block length after a time-series information signal had been divided into a first band group; a transform step of transforming the first code string into a second code string obtained by coding a spectral signal which has been transformed with a second block length after being divided into a second band group; and a recording step of recording the second code string on a recording medium.

According to a further aspect of the present invention, there is provided an information recording apparatus including input means for inputting a first code string obtained by coding a spectral signal which has been transformed with a first block length after a time-series information signal had been divided into a first band group. Transform means transforms the first code string into a second code string obtained by coding a spectral signal which has been transformed with a second block length after being divided into a second band group. Recording means records the second code string on a recording medium.

According to a further aspect of the present invention, there is provided a program providing medium for providing an information recording program to an information processing apparatus. The information recording program includes: an input step of inputting a first code string obtained by coding a spectral signal which has been transformed with a first block length after a time-series information signal had been divided into a first band group; a transform step of transforming the first code string into a second code string obtained by coding a spectral signal which has been transformed with a second block length after being divided into a second band group; and a recording step of recording the second code string on a recording medium.

According to a further aspect of the present invention, there is provided a code transform method including: an input step of inputting a first code string obtained by coding a spectral signal which has been transformed after a time-series information signal had been divided into a first band group; a decoding step of decoding the input first code string into the spectral signal; a spectral-signal transform step of transforming the decoded spectral signal into a spectral signal which is transformed after being divided into a second band group by inverse-transforming part of the spectral signal of a higher band into a decimated time-series signal and by transforming the decimated time-series signal into a lower-band spectral signal within the higher band; and a coding step of coding the transformed spectral signal into a second code string.

According to a further aspect of the present invention, there is provided a code transform apparatus including input means for inputting a first code string obtained by coding a spectral signal which has been transformed after a time-series information signal had been divided into a first band group. Decoding means decodes the input first code string into the spectral signal. Spectral-signal transform means for transforming the decoded spectral signal into a spectral signal which is transformed after being divided into a second band group by inverse-transforming part of the spectral signal of a higher band into a decimated time-series signal and by transforming the decimated time-series signal into a lower-band spectral signal within the higher band. Coding means codes the transformed spectral signal into a second code string.

According to a further aspect of the present invention, there is provided a code transform method including: an input step of inputting a first code string obtained by coding a spectral signal which has been transformed from a time-series information signal; a decoding step of decoding the input first code string into the spectral signal; a spectral-signal transform step of inverse-transforming only lower-band spectral components of the decoded spectral signal into a decimated time-series signal and of transforming the decimated time-series signal into lower-band spectral components of a second code string; and a coding step of coding the transformed spectral signal.

According to a further aspect of the present invention, there is provided a code transform apparatus including input means for inputting a first code string obtained by coding a spectral signal which has been transformed from a time-series information signal. Decoding means decodes the input first code string into the spectral signal. Spectral-signal transform means inverse-transforms only lower-band spectral components of the decoded spectral signal into a decimated time-series signal and transforms the decimated time-series signal into lower-band spectral components of a second code string. Coding means codes the transformed spectral signal.

According to a further aspect of the present invention, there is provided a program providing medium for providing a code transform program to an information processing apparatus. The code transform program includes: an input step of inputting a first code string obtained by coding a spectral signal which has been transformed after a time-series information signal had been divided into a first band group; a decoding step of decoding the input first code string into the spectral signal; a spectral-signal transform step of transforming the decoded spectral signal into a spectral signal which is transformed after being divided into a second band group by inverse-transforming part of the spectral signal of a higher band into a decimated time-series signal and by transforming the decimated time-series signal into a lower-band spectral signal within the higher band; and a coding step of coding the transformed spectral signal into a second code string.

According to a further aspect of the present invention, there is provided a program providing medium for providing a code transform program to an information processing apparatus. The code transform program includes: an input step of inputting a first code string obtained by coding a spectral signal which has been transformed from a time-series information signal; a decoding step of decoding the input first code string into the spectral signal; a spectral-signal transform step of inverse-transforming only lower-band spectral components of the decoded spectral signal into a decimated time-series signal and of transforming the decimated time-series signal into lower-band spectral components of a second code string; and a coding step of coding the transformed spectral signal.

DESCRIPTION OF THE PREFERRED EMBODIMENT

An embodiment of the present invention is described below with reference to the drawings. In this embodiment, the information coding method and apparatus, the code transform method and apparatus, the code transform control method and apparatus, and the information recording method and apparatus according to the present invention are used in a compressed-data recording and/or reproducing apparatus for compressing audio information and recording it on a recording medium.

The compressed-data recording and/or reproducing apparatus is described below in detail.

Figure 1:
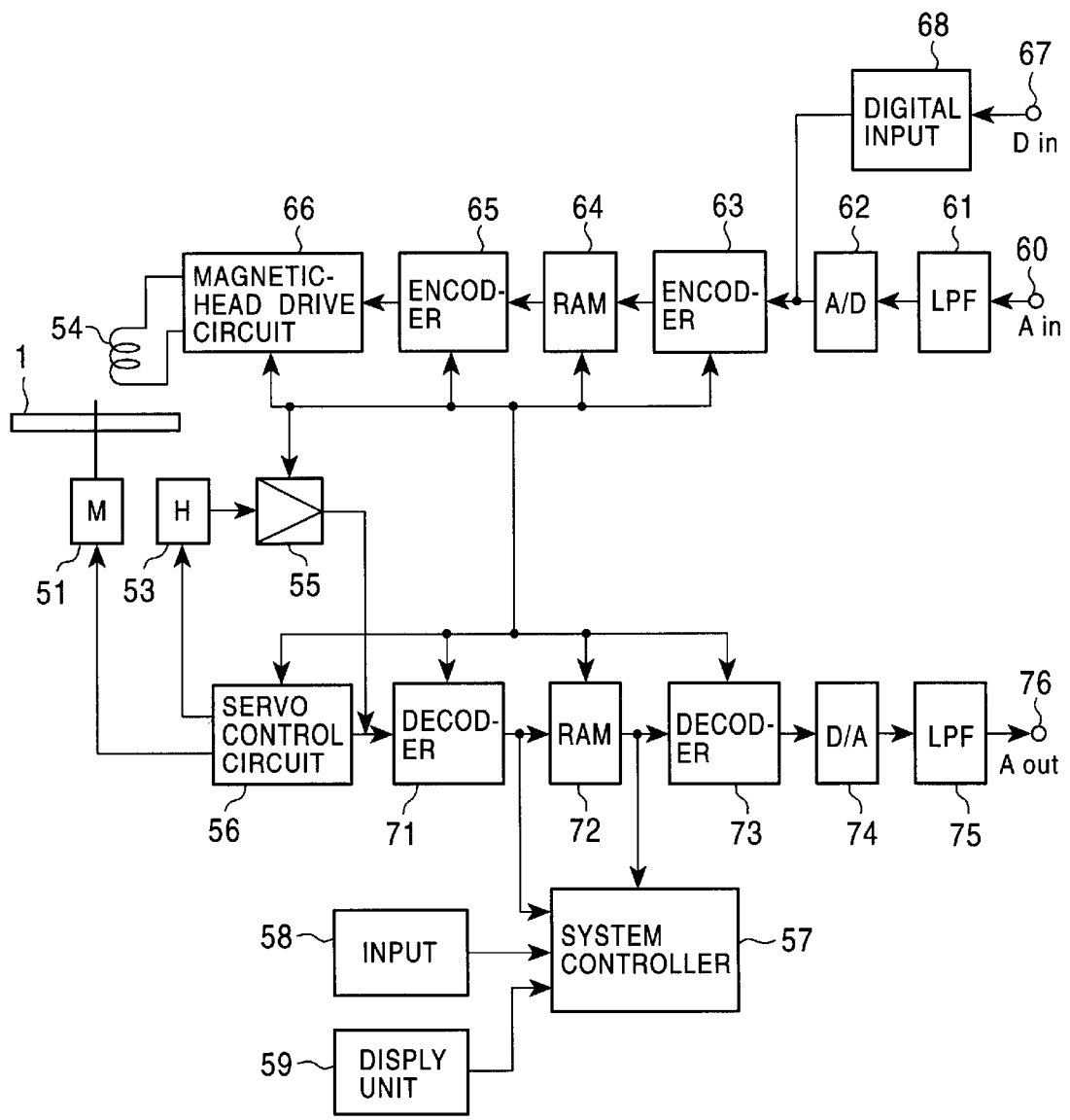
FIG. 1 is a block diagram illustrating the configuration of a compressed-data recording and/or reproducing apparatus according to an embodiment of the present invention.

The compressed-data recording and/or reproducing apparatus is primarily formed of, as shown in FIG. 1, a recording system for recording compressed data on a magneto-optical disk 1, which serves as a recording medium, and a reproducing system for reproducing compressed data recorded on the magneto-optical disk 1.

The compressed-data recording system has an input terminal 60, which serves as an external input portion for analog audio signals, an input terminal 67, which serves as an external input portion for digital audio signals, a low-pass filter (LPF) 61 for performing low-pass filtering, an analog-to-digital (A/D) converter 62 for converting an analog signal into a digital signal, a digital input interface circuit 68, which serves as an interface for digital audio signals, an encoder 63 for encoding an input signal, a memory 64 for storing data, an encoder 65 for encoding data, and a magnetic-head drive circuit 66. As the encoding and decoding method, adaptive transform coding (ATC), for example, may be used.

The compressed-data reproducing system includes decoders 71 and 73 for decoding compressed data, a memory 72, which serves as a data storage device, a digital-to-analog (D/A) converter 74 for converting a digital signal into an analog signal, a low-pass filter (LPF) 75 for performing low-pass filtering, and an output terminal 76, which serves as an output terminal for audio signals.

The compressed-data recording and/or reproducing apparatus is provided with an optical head 53 for applying laser light to the magneto-optical disk 1 so as to reproduce compressed data recorded on the magneto-optical disk 1, an RF circuit 55 for generating an RF signal, servo control circuitry 56 and a spindle motor 51 for executing servo processing, both of which form a rotation driving system for the magneto-optical disk 1, a system controller 57 for controlling the individual elements of the compressed-data recording and/or reproducing apparatus, a key input operation unit 58, which serves as input means, and a display unit 59.

The individual elements of the compressed-data recording and/or reproducing apparatus are described in detail below. The magneto-optical disk 1 is a recording medium on or from which compressed data is recorded or reproduced by using the compressed-data recording and/or reproducing apparatus.

The above-described spindle motor 51 drives the rotation of the magneto-optical disk 1. The above-described optical head 53 and a magnetic head 54 are used for recording and reproducing data on and from the magneto-optical disk 1.

The optical head 53 is formed of, for example, a laser light source, such as a laser diode, optical parts, such as a collimator lens, an object lens, a polarization beam splitter, and a cylindrical lens, and a photo detector having a light-receiving portion of a predetermined shape. The optical head 53 is positioned to face the magnetic head 54 with the magneto-optical disk 1 therebetween.

The aforementioned magnetic-head drive circuit 66 drives the magnetic head 54 to apply a modulating magnetic field to the magneto-optical disk 1 in accordance with the recording data. More specifically, for recording data on the magneto-optical disk 1, the magnetic-head drive circuit 66 drives the magnetic head 54 to apply a modulating magnetic field to the magneto-optical disk 1 in response to the recording data, and also, the optical head 53 applies laser light to a target track of the magneto-optical disk 1, thereby performing thermomagnetic recording according to the magnetic-field modulation method.

The optical head 53 also senses the reflected light of the laser light applied to the target track so as to detect focusing errors using what is called the "astigmatism technique", for example, to detect tracking errors using what is called the "push-pull method". When reproducing data from the magneto-optical disk 1, the optical head 53 detects the above-described focusing error and tracking error, and simultaneously detects a difference in the polarization angle (Kerr rotational angle) of the laser reflected from the target track, thereby generating a reproducing signal.

Thus, in recording data on the magneto-optical disk 1 while laser light is being applied from the optical head 53 to the magneto-optical disk 1 rotated by the spindle motor 51, a modulating magnetic field in accordance with recording data is applied from the magnetic head 54 to the magneto-optical disk 1. That is, magnetic-field modulation recording is performed to record the data along the recording track of the magneto-optical disk 1. In reproducing data from the magneto-optical disk 1, the recording track of the magneto-optical disk 1 is traced by laser light applied from the optical head 53, thereby magneto-optically reproducing the data. An output of the optical head 53 is then supplied to the RF circuit 55.

The above-described RF circuit 55 extracts the aforementioned focusing error signal and tracking error signal from the output of the optical head 53, and supplies it to the servo control circuitry 56. The RF circuit 55 also binarizes the reproducing signal and supplies it to the decoder 71 of the reproducing system, which will be described later.

The servo control circuitry 56 is formed of, for example, a focus servo control circuit, a tracking servo control circuit, a spindle motor servo control circuit, a thread servo control circuit, etc. The focus servo control circuit controls the focus of the optical system of the optical head 53 so that the focus error signal becomes zero. The tracking servo control circuit controls the tracking of the optical system of the optical head 53 so that the tracking error signal becomes zero. The spindle motor servo control circuit controls the spindle motor 51 to drive the rotation of the magneto-optical disk 1 at a predetermined rotational velocity (for example, a constant linear velocity). The thread servo control circuit shifts the optical head 53 and the magnetic head 54 to the position of a target track of the magneto-optical disk 1 specified by the system controller 57.

The servo control circuitry 56, performing various control operations as described above, transmits information of the operation states of the individual elements controlled by the servo control circuitry 56 to the system controller 57.

The key input operation unit 58 and the display unit 59 are connected to the system controller 57. The system controller 57 controls the recording system and the reproducing system according to the information of the operation input through the key input operation unit 58.

The system controller 57 also manages the recording position or the reproducing position traced by the optical head 53 and the magnetic head 54 based on address information of each sector reproduced by a header time and sub-code Q data from the recording track of the magneto-optical disk 1.

Additionally, the system controller 57 controls the display unit 59 to indicate the reproducing time based on the data compression ratio of the compressed-data recording and/or reproducing apparatus and based on information of the reproducing position of the recording track.

The reproducing time is obtained by the following procedure. Address information of each sector (absolute time information) reproduced by the header time and the sub-code Q data from the recording track of the magneto-optical disk 1 is multiplied by the reciprocal of the data compression ratio (for example, four when the compression ratio is 1/4), thereby determining the actual time information. The reproducing time is then indicated on the display unit 59.

Time information may be indicated during the recording operation. If the absolute time information has been recorded (pre-formatted) on a recording track of a magneto-optical disk, the pre-formatted absolute time information may be read and multiplied by the reciprocal of the data compression ratio. Thus, the current position may be indicated as the actual recording time.

In the aforementioned recording system, an analog audio signal Ain input from the input terminal 60 is supplied to the A/D converter 62 via the low-pass filter 61.

The A/D converter 62 quantizes the analog audio input signal Ain. The digital audio signal obtained from the A/D converter 62 is supplied to the ATC encoder 63. Also supplied to the ATC encoder 63 is a digital audio signal Din from the input terminal 67 via the digital input interface circuit 68.

The ATC encoder 63 performs bit compression (data compression), in accordance with a predetermined bit compression ratio, on the digital audio PCM data having a predetermined transfer rate which is obtained by quantizing the input signal Ain in the A/D converter 62. The data (ATC data) compressed in the ATC encoder 63 is input into the memory 64. If data compression ratio is, for example, 1/8, the data transfer rate is reduced to 1/8 (9.375 sectors/second) of the data transfer rate (75 sectors/second) of the above-described standard compact disc-digital audio (CD-DA) format.

The reading and writing of data from and into the aforementioned memory 64 is controlled by the system controller 57. The memory 64 is used as a buffer memory, which temporarily stores the ATC data supplied from the ATC encoder 63 and records it on the magneto-optical disk 1 as required.

If the data compression ratio is, for example, 1/8, the data transfer rate of the compressed audio data supplied from the ATC encoder 63 is reduced to 1/8, i.e., 9.375 sectors/second, of the data transfer rate (75 sectors/second) of the standard CD-DA format. The compressed data with the reduced transfer rate is continuously written into the memory 64.

It is sufficient that the compressed data (ATC data) be recorded on every 8 sectors. In practice, however, the recording of data on every 8 sectors is almost impossible. Accordingly, the data is continuously recorded on sectors in the following manner. Data is recorded in units of clusters in a burst mode with a recording interval, each cluster being formed of a predetermined plural number of sectors (for example, 32 sectors+a few sectors), at the same data transfer rate (75 sectors/second) as the standard CD-DA format. That is, the ATC audio data with a data compression ratio of 1/8 continuously written into the memory 64 at a transfer rate as low as 9.375 (=75/8) sectors/second in accordance with the above bit compression ratio is read in the burst mode at a transfer rate of 75 sectors/second as recording data.

Although the overall data transfer rate of the recording data including the recording intervals is as low as 9.375 sectors/second, the momentary data-transfer rate within the period of the burst recording operation is 75 sectors/second, which is equal to the transfer rate of the standard CD-DA format. Thus, when the rotational velocity of a disk is the same velocity (constant linear velocity) as the standard CD-DA format, recording can be performed with the same recording density and the same storage pattern as the CD-DA format.

The ATC audio data, i.e., the recording data, read from the memory 64 in the burst mode at a (momentary) transfer rate of 75 sectors/second is supplied to the encoder 65. The unit of data strings supplied to the encoder 65 and to be simultaneously recorded at one time is calculated by the sum of a cluster formed of a plurality of sectors (for example, 32 sectors) and the number of cluster-connecting sectors positioned at the front and rear of the cluster. The cluster-connecting sector is set to be longer than the interleave length used in the encoder 65 so as to prevent the sector from influencing the data of other clusters when they are interleaved.

The aforementioned encoder 65 performs error-correcting coding (parity adding and interleave processing) or eighteen-to-fourteen modulation (EFM) coding on the recording data supplied from the memory 64 in the burst mode. The recording data coded by the encoder 65 is supplied to the magnetic-head drive circuit 66.

The magnetic head 54 is connected to the magnetic-head drive circuit 66, and the drive circuit 66 drives the magnetic head 54 to apply a modulating magnetic field in response to the above recording data to the magneto-optical disk 1.

The system controller 57 performs memory control on the memory 64 as described above, and also controls the recording position to continuously record on the recording track of the magneto-optical disk 1 the above recording data which has been read from the memory 64 in the burst mode by memory control. The control of the recording position is performed by the system controller 57 by managing the recording position of the recording data and by supplying to the servo control circuitry 56 a control signal designating the recording position on the recording track of the magneto-optical disk 1.

A description of the reproducing system is given below. The reproducing system is used for reproducing the recording data continuously recorded on the recording track of the magneto-optical disk 1 by the aforementioned recording system. The reproducing system of the compressed-data recording and/or reproducing apparatus is provided with the decoder 71. A reproducing output obtained by tracking the recording track of the magneto-optical disk 1 with laser light by the optical head 53 is binarized in the RF circuit 55 and is then supplied to the decoder 71. For the reproducing operation, not only a magneto-optical disk, but also a read-only optical disc, similar to what is called "Compact Disc (CD)", may be read.

The decoder 71, which corresponds to the encoder 65 of the above-described recording system, executes error-correcting decoding or EFM decoding on the reproducing output binarized by the RF circuit 55, thereby reproducing the ATC audio data having a data compression ratio of 1/8 at a transfer rate of 75 sectors/second, which is faster than the normal transfer rate. The reproducing data acquired by the decoder 71 is then supplied to the memory 72.

The reading and writing of data from and into the memory 72 is controlled by the system controller 57. The reproducing data supplied from the decoder 71 at a transfer rate of 75 sectors/second is written into the memory 72 in the burst mode at the same transfer rate of 75 sectors/second. The reproducing data written into the memory 72 is continuously read from the memory 72 at a transfer rate of 9.375 sectors/second, which corresponds to a data compression ratio of 1/8.

The aforementioned system controller 57 performs memory control so that the reproducing data is written into the memory 72 at a transfer rate of 75 sectors/second and is also continuously read from the memory 72 at a transfer rate of 9.375 sectors/second. In addition to performing memory control on the memory 72 as described above, the system controller 57 controls the reproducing position to continuously reproduce from the recording track of the magneto-optical disk 1 the recording data to be written into the memory 72 in the burst mode by memory control. The control of the reproducing position is performed by the system controller 57 by managing the reproducing position of the reproducing data to be read from the memory 72 in the burst mode and by supplying to the servo control circuitry 56 a control signal designating the reproducing position on the recording track of the magneto-optical disk 1 or the optical disc 1. The ATC audio data, which has been obtained as reproducing data continuously read from the memory 72 at a transfer rate of 9.375 sectors/second, is then supplied to the ATC decoder 73.

The ATC decoder 73, which corresponds to the ATC encoder 63 of the above-described recording system, executes data expansion (bit expansion) on the ATC data, for example, by eight times, thereby reproducing 16-bit digital audio data. The digital audio data output from the ATC decoder 73 is then supplied to the D/A converter 74.

The D/A converter 74 converts the digital audio data supplied from the ATC decoder 73 into an analog signal, thereby forming an analog audio output signal Aout. The analog audio signal Aout obtained from the D/A converter 74 is output from the output terminal 76 via the low-pass filter 75.

With the above configuration, the compressed-data recording and/or reproducing apparatus is able to record and reproduce compressed data on and from a magneto-optical disk. High-efficiency data compression and coding can thus be implemented by the above compressed-data recording and/or reproducing apparatus.

A detailed description of high-efficiency compression and coding is as follows. High-efficiency compression and coding is a technique of coding, for example, input digital signals, such as audio PCM signals, by compressing the signals with high efficiency by using various techniques, such as band division coding (SBC), adaptive transform coding (ATC), and adaptive bit allocation.

Figure 2:
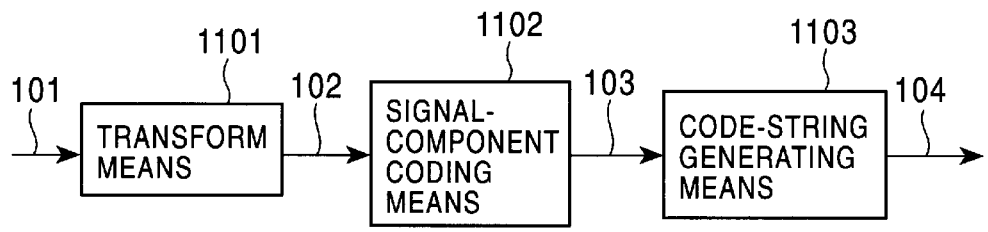
FIG. 2 is a block diagram illustrating the configuration of coding means for use in the compressed-data recording and/or reproducing apparatus shown in FIG. 1.

FIG. 2 illustrates an example of the configuration of coding means for coding acoustic waveform signals. The coding means for acoustic waveform signals is formed of transform means 1101 for performing spectrum transform by dividing an input audio signal into a plurality of bands, a signal-component coding means 1102 for normalizing and quantizing an input signal, and code-string generating means 1103 for generating a code string from a signal 103 output from the signal-component coding means 1102. In the coding means for acoustic waveform signals, an input signal waveform 101 is transformed into a signal 102, which represents individual signal frequency components, by the transform means 1101, and then, the signal 102 is coded into the coded signal 103, which represents the individual signal frequency components, by the signal-component coding means 1102. A code-string signal 104 is then generated from the coded signal 103 by the code-string generating means 1103.

Figure 3:
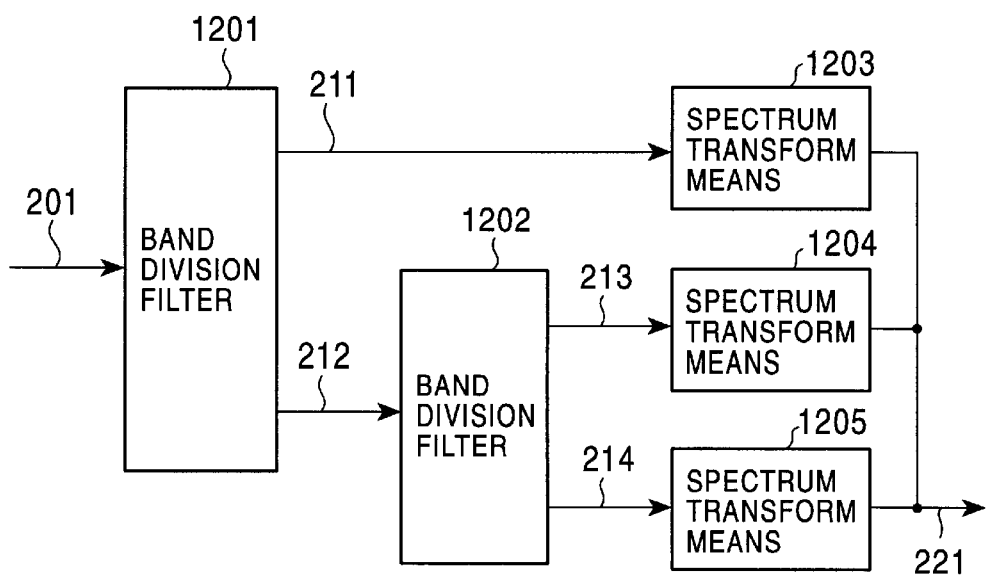
FIG. 3 is a block diagram illustrating the configuration of transform means for use in the compressed-data recording and/or reproducing apparatus shown in FIG. 1.

The above-described transform means 1101 is formed of, for example, as shown in FIG. 3, band division filters 1201 and 1202, and spectrum transform means 1203, 1204, and 1205.

The band division filter 1201 divides a signal 201 between two bands. Among signal components 211 and 212 divided between two bands by the band division filter 1201, the higher-range band signal component 211 is transformed into a spectral signal component 221 by the spectrum transform means 1203, such as MDCT.

The lower-range band signal component 212 is further divided into two band signal components 213 and 214 by the band division filter 1202, and then the signal components 213 and 214 are transformed in the respective bands into the spectral signal component 221 by the spectrum transform means 1204 and 1205, respectively, such as MDCT. It should be noted that the signal 201 input into the band division filter 1201 shown in FIG. 3 is equivalent to the signal 101 input into the transform means 1101 shown in FIG. 2.

The bandwidth of the signal components 211 and 212 divided and output from the band division filter 1201 is one-half the bandwidth of the signal 201 input into the band division filter 1201, for example, it is decimated to one-half the bandwidth of the signal 201.

The bandwidth of the signal components 213 and 214 divided and output from the band division filter 1202 is one fourth the bandwidth of the signal 201 input into the band division filter 1201, i.e., it is decimated to one fourth the bandwidth of the signal 201.

The above-described spectrum transform means 1203, 1204, and 1205 are formed by the aforementioned MDCT, but may be formed by DFT or DCT.

Figure 4:
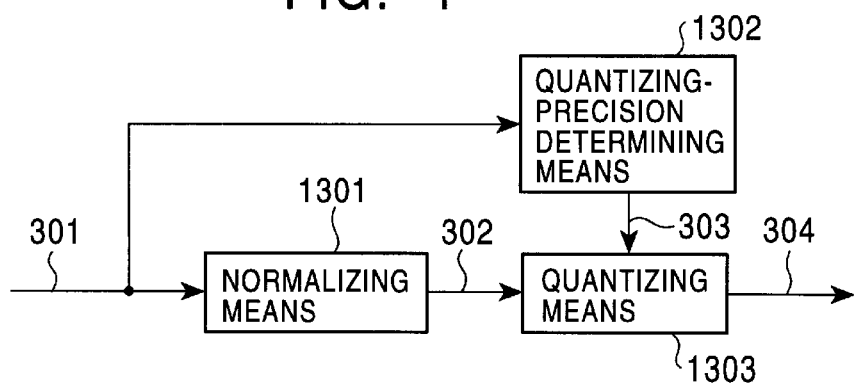
FIG. 4 is a block diagram illustrating the configuration of signal-component coding means for use in the compressed-data recording and/or reproducing apparatus shown in FIG. 1.

The signal coding means 1102 is formed of, as shown in FIG. 4, normalizing means 1301, quantizing-precision determining means 1302, and quantizing means 1303.

A signal component output from each of the spectrum transform means 1203, 1204, and 1205 is normalized in a predetermined band by the normalizing means 1301.

A normalized signal 302 is then quantized by the quantizing means 1303 based on the quantizing precision calculated by the quantizing-precision determining means 1302. The quantizing means 1303 controls the quantizing precision in accordance with a signal 303, which serves as a control signal output from the quantizing-precision determining means 1302.

A signal 301 input into the normalizing means 1301 and into the quantizing-precision determining means 1302, shown in FIG. 4, is equivalent to the signal 221 output from the spectrum transform means 1203, 1204, and 1205 shown in FIG. 3. A signal 304 output from the quantizing means 1303 illustrated in FIG. 4 is equivalent to the signal 103 output from the signal-component coding means 1102 illustrated in FIG. 2. It should be noted that the signal 304 output from the quantizing means 1303 shown in FIG. 4 includes the normalizing coefficient information and the quantizing precision information as well as the quantized signal components.

The signal output from the signal-component coding means 1102 configured as shown in FIG. 4 is transformed into a code-string by the code-string generating means 1103 and is then output.

In the acoustic-waveform coding means constructed as described above, the input signal waveform 101 is transformed into the signal 102, which represents the individual signal frequency components, by the transform means 1101, and then, the signal 102 is transformed into the coded signal 103, which represents the individual frequency components, by the signal-component coding means 1102. The code-string signal 104 is then generated from the coded signal 103 by the code-string generating means 1103.

Figure 5:
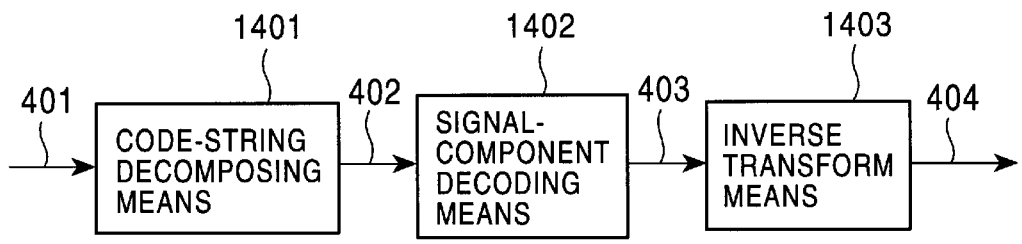
FIG. 5 is a block diagram illustrating the configuration of decoding means for use in the compressed-data recording and/or reproducing apparatus shown in FIG. 1.

FIG. 5 illustrates decoding means for decoding an acoustic signal from the code string generated by the coding means shown in FIG. 2 and for outputting the decoded signal. The decoding means is formed of code-string decomposing means 1401, signal-component decoding means 1402, and inverse transform means 1403.

In the decoding means, the codes of the respective signal components are extracted from a code-string signal 401 by the code-string decomposing means 1401. Code data 402 is then decoded into a signal 403, which represents the individual signal components, by the signal-component decoding means 1402, and an acoustic waveform signal 404 is generated by the inverse transform means 1403.

Figure 6:
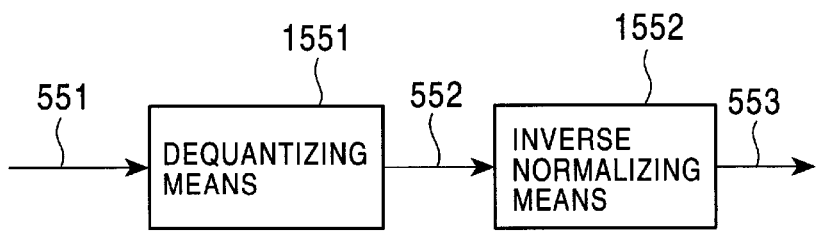
FIG. 6 is a block diagram illustrating the configuration of signal-component decoding means for use in the compressed-data recording and/or reproducing apparatus shown in FIG. 1.

The signal-component decoding means 1402, which corresponds to the signal-component coding means 1102 shown in FIG. 4, is formed of, for example, as illustrated in FIG. 6, dequantizing means 1551 and inverse normalizing means 1552. Input data 551 input into the dequantizing means 1551 and output data 553 output from the inverse normalizing means 1552 shown in FIG. 6 are equivalent to the input data 402 input into the signal-component decoding means 1402 and the output data 403 output from the signal-component decoding means 1402, respectively, shown in FIG. 5.

In the signal-component decoding means 1402 configured as described above, the input data 551 representing the individual spectral signals is dequantized by the dequantizing means 1551, and a signal 552 output from the dequantizing means 1551 is inverse-normalized by the inverse normalizing means 1552.

Figure 7:
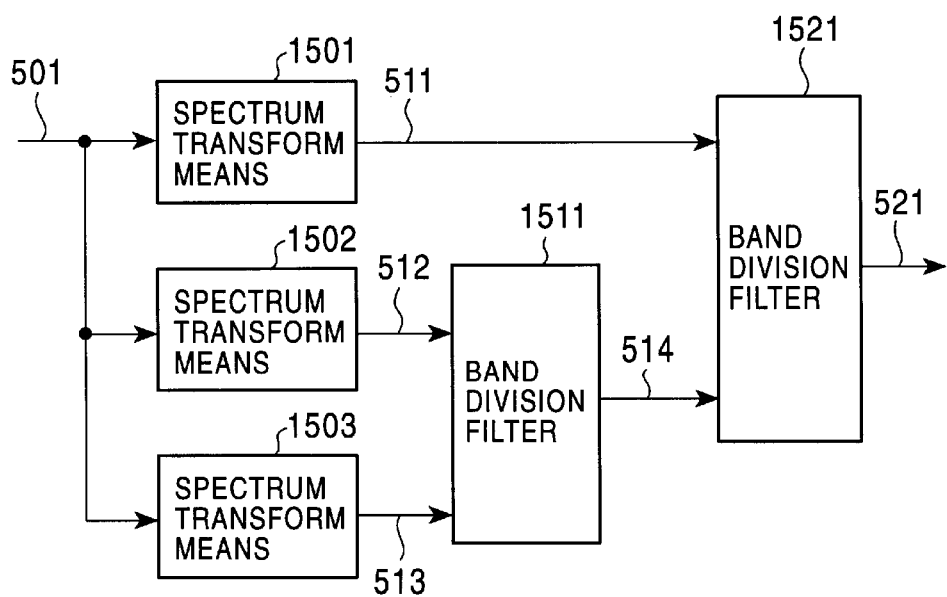
FIG. 7 is a block diagram illustrating the configuration of inverse transform means for use in the compressed-data recording and/or reproducing apparatus shown in FIG. 1.

The inverse transform means 1403, which corresponds to the transform means 1101 illustrated in FIG. 3, is formed of, for example, as shown in FIG. 7, inverse spectrum transform means 1501, 1502, and 1503, and band synthesizing filters 1511 and 1512. In the code-string decomposing means 1401, signal components 511, 512, and 513 of the individual bands obtained by the respective inverse spectrum transform means 1501, 1502, and 1503 are synthesized by the band synthesizing filters 1511 and 1512.

More specifically, the band synthesizing filter 1511 synthesizes the signal components 512 and 513 output from the respective inverse spectrum transform means 1502 and 1503 so as to output a signal component 514. The band synthesizing filter 1512 synthesizes the signal component 511 output from inverse spectrum transform means 1501 and the signal component 514 output from the band synthesizing filter 1511 so as to output a signal 521. Accordingly, a signal 501 input into the inverse spectrum transform means 1501, 1502, and 1503 shown in FIG. 7 is equivalent to the signal 403 input into the inverse transform means 1403 shown in FIG. 5. The signal 521 output from the band synthesizing filter 1512 illustrated in FIG. 7 is equivalent to the signal 404 output from the inverse transform means 1403 illustrated in FIG. 5.

A coding method is now described by using the coding means shown in FIG. 2. For example, a spectral signal is obtained by the transform means shown in FIG. 3, and the level of the absolute value of the MDCT spectral signal is converted into dB. Such a spectral signal is shown in FIG. 8.

Figure 8:
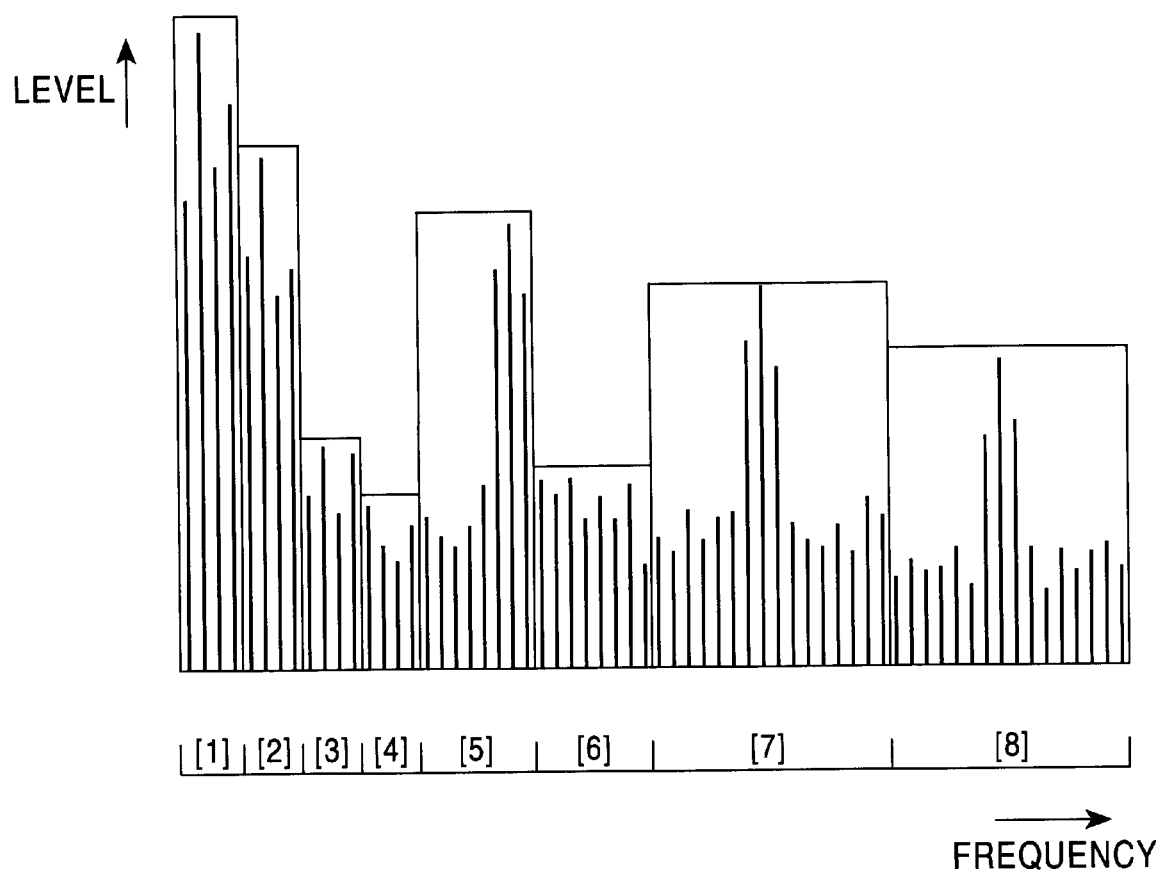
FIG. 8 illustrates a coding method employed by the compressed-data recording and/or reproducing apparatus shown in FIG. 1.

In FIG. 8, the input signal of a predetermined time block is transformed into 64 spectral signal components and, the signal components are divided into 8 bands from band [1] to [8] (hereinafter referred to as the "coding units"), and the signal components are simultaneously normalized and quantized in the 8 bands. The quantizing precision can be changed in each coding unit according to the distribution of the frequency components, thereby achieving acoustically high-efficiency coding while minimizing the loss of sound quality.

Figure 9:
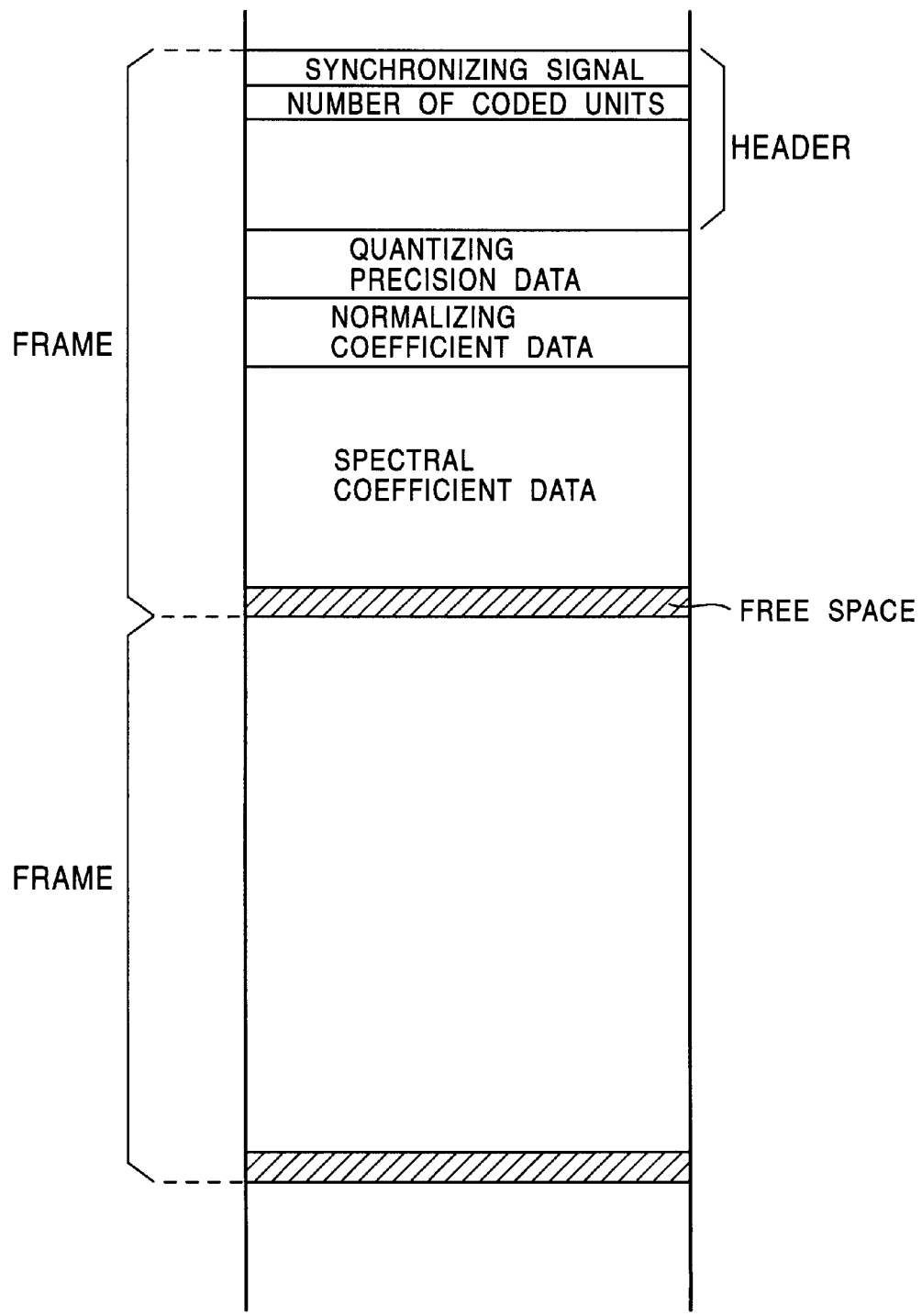
FIG. 9 illustrates a code-string generated by the coding operation performed by the compressed-data recording and/or reproducing apparatus shown in FIG. 1.

FIG. 9 illustrates an example of the configuration of a code string generated by the coding operation. According to this configuration, data for reproducing spectral signal components in each time block is coded in correspondence with a frame having a predetermined number of bits.

As illustrated in FIG. 9, the header of each frame contains coded control data, such as a synchronizing signal and the number of coded units, with a predetermined number of bits. Subsequently, the quantizing precision data and the normalizing coefficient data of each coding unit are coded starting from the coding unit of the lower band. Finally, the spectral coefficient data normalized and quantized based on the above-described normalizing coefficient data and quantizing precision data in each coding unit is coded starting from the coding unit of the lower band. The number of bits actually required for reproducing the spectral signal components of this time block is determined by the number of coded units and by the number of quantizing bits indicated by the quantizing precision information of each coding unit. The above number of bits may be varied according to the frame.

Only the required number of bits starting from the header of each frame is used for the reproducing operation, and the remaining space of the frame is free, without influencing the reproducing signal. As indicated by this example, each time block is coded in correspondence with a predetermined number of bits. Accordingly, if this code string is recorded on a recording medium, such as a magneto-optical disk, the recording position of a given time block can easily be calculated. This makes it possible to easily implement what is called "random access", i.e., to reproduce data from a given random position. Generally, to improve sound quality, the greatest number of bits possible should be efficiently utilized so as to reduce the free space of each frame to as little as possible.

The aforementioned method is a basic coding method. It is, however, possible to further enhance the coding efficiency. For example, among the quantized spectral signal components, a comparatively shorter code length is assigned to signal components with a higher frequency, while a relatively longer code length is allocated to signal components with a lower frequency. This makes it possible to increase the coding efficiency.

Additionally, by increasing the transform block length, the amount of sub information, such as the quantizing precision information and the normalizing coefficient information, can be relatively reduced, and the frequency resolution can be enhanced. Accordingly, the quantizing precision can be controlled more precisely in the frequency domain, thereby enhancing coding efficiency. The following coding method may also be considered. Tone components, which are particularly important from the auditory point of view, i.e., signal components having energy concentrating around a specific frequency, may be removed from a spectral signal, and such tone components may be separately coded from other spectral components. According to this method, audio signals can be very efficiently coded at a high compression ratio with very little loss in sound quality.

A description is further given below of an example of the configurations of coding means and decoding means that achieve increased coding efficiency.

Figure 10:
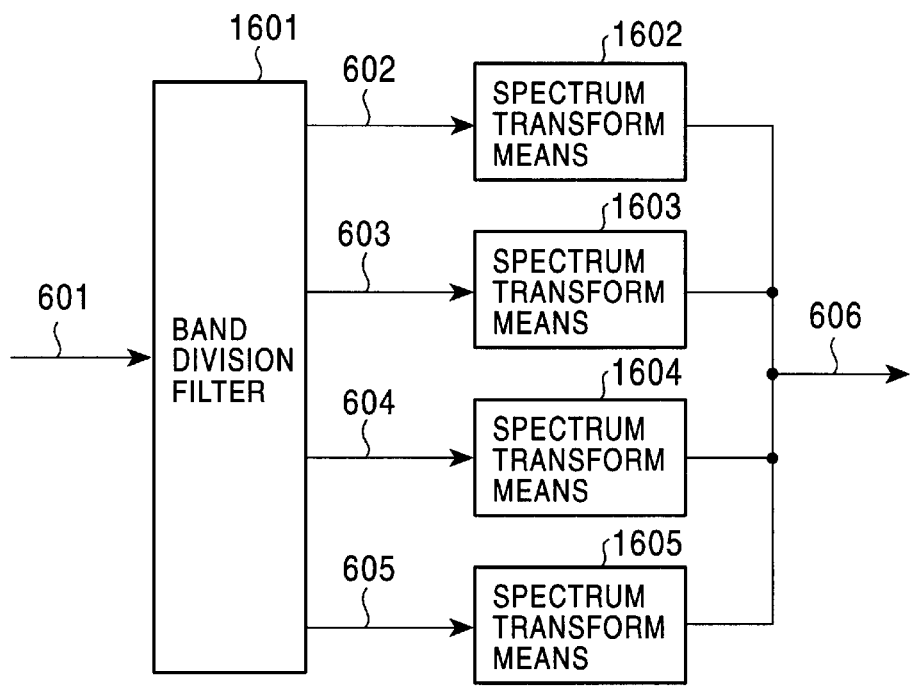
FIG. 10 is a block diagram illustrating the configuration of another transform means for use in the compressed-data recording and/or reproducing apparatus shown in FIG. 1.

FIG. 10 illustrates the configuration of the transform means 1101 shown in FIG. 2. The transform means 1101 shown in FIG. 10 is configured differently from that shown in FIG. 3, and is formed of a band division filter 1601 and spectrum transform means 1602, 1603, 1604, and 1605.

In the transform means constructed as described above, a signal 601 is divided by the band division filter 1601 into four signal components 602, 603, 604, and 605 among four bands having an equal bandwidth. Spectrum transform is then performed on the signal components 602, 603, 604, and 605 by the spectrum transform means 1602, 1603, 1604, and 1605, respectively. The spectrum-transform block length used in the transform means shown in FIG. 10 is set to be longer than the transform means shown in FIG. 3. For example, the frequency resolution of an output spectral signal is twice as high as that shown in FIG. 3.

Figure 11:
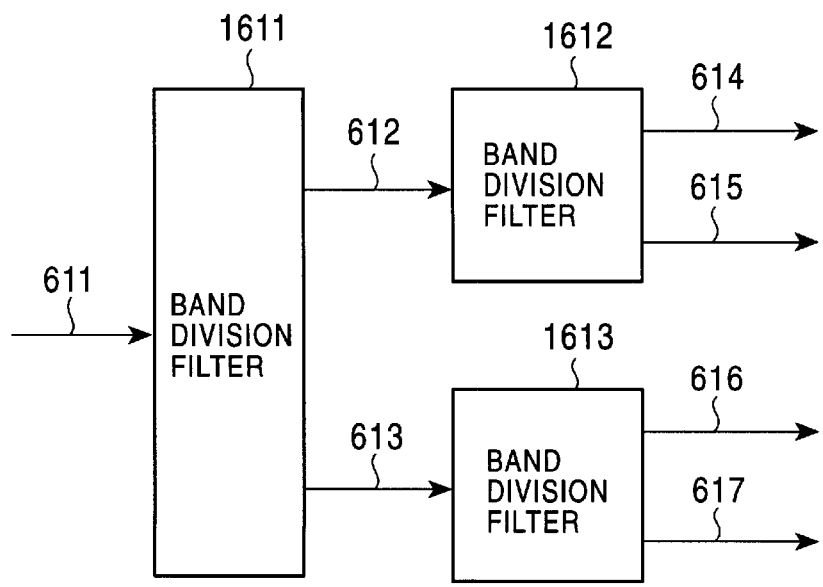
FIG. 11 is a block diagram illustrating the configuration of another transform means for use in the compressed-data recording and/or reproducing apparatus shown in FIG. 1.

In the example of the transform means configured as shown in FIG. 10, the band is divided into four, and the time-series signals 602, 603, 604, and 605, which have been decimated in accordance with the bandwidth, are arranged in the order from the higher-range band to the lower-range band. For example, the above-described band division filter 1601 may be configured as shown in FIG. 11. That is, a signal may be first divided between predetermined bands by a band division filter 1611, and may be further divided by band division filters 1612 and 1613. More specifically, a signal 611 may be first divided between a lower range band and a higher range band by the above-configured QMF filter (band division filter 1611). Divided signal components 612 and 613 are further divided between two bands by the band division filters 1612 and 1613, respectively, thereby generating four band signal components 614, 615, 616, and 617 each having an equal bandwidth.

The band division filter 1601 may be configured using a PQF filter in such a manner that a signal can be divided into four bands at one time. Whichever configuration is used, each of the signal components 602, 603, 604, and 605 shown in FIG. 10 has been decimated to one fourth the signal 601, and a high frequency resolution can be obtained while reducing the amount of buffer memory required for spectrum transform processing.

Figure 12:
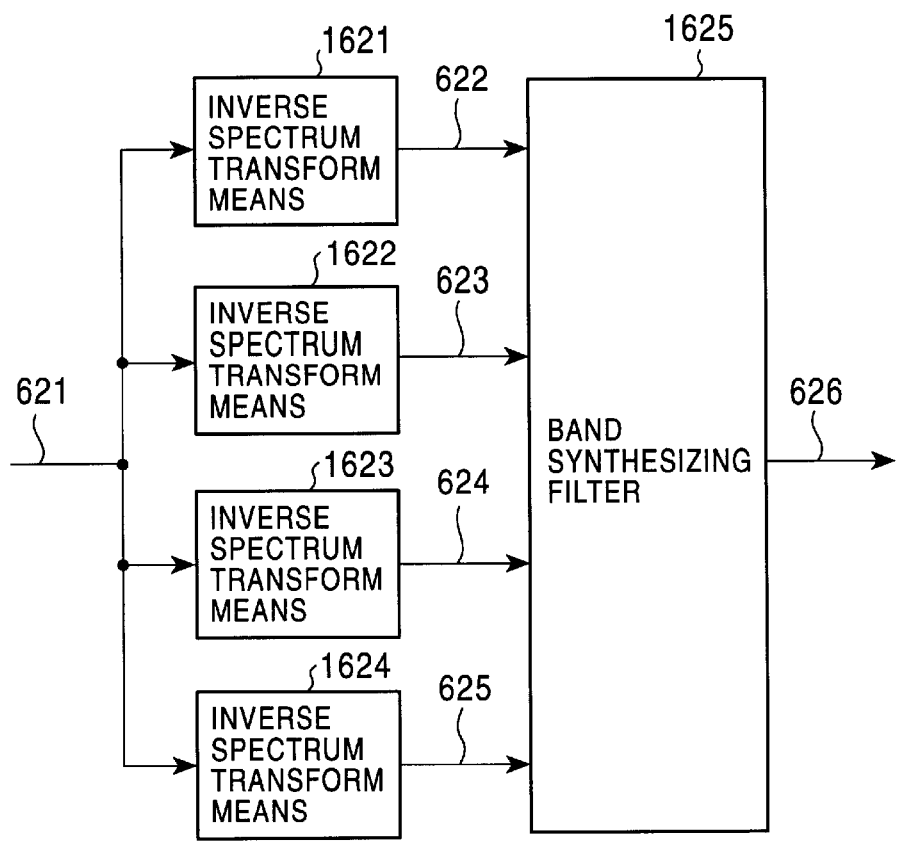
FIG. 12 is a block diagram illustrating the configuration of another inverse transform means for use in the compressed-data recording and/or reproducing apparatus shown in FIG. 1.

FIG. 12 illustrates an example of the inverse transform means 1403 shown in FIG. 5. The inverse transform means 1403 shown in FIG. 12 is configured differently from that shown in FIG. 7, and is formed of inverse spectrum transform means 1621, 1622, 1623, and 1624, and a band synthesizing filter 1625. With this configuration, the inverse transform means 1403 performs inverse transform corresponding to transform processing executed by the transform means shown in FIG. 10.

In the inverse transform means 1403 constructed as described above, inverse spectrum transform is performed on a code-string signal 621 in the individual bands, and inverse-spectrum-transformed signals 622, 623, 624, and 625 are then synthesized in the band synthesizing filter 1625 so as to output a signal 626.

Figure 13:
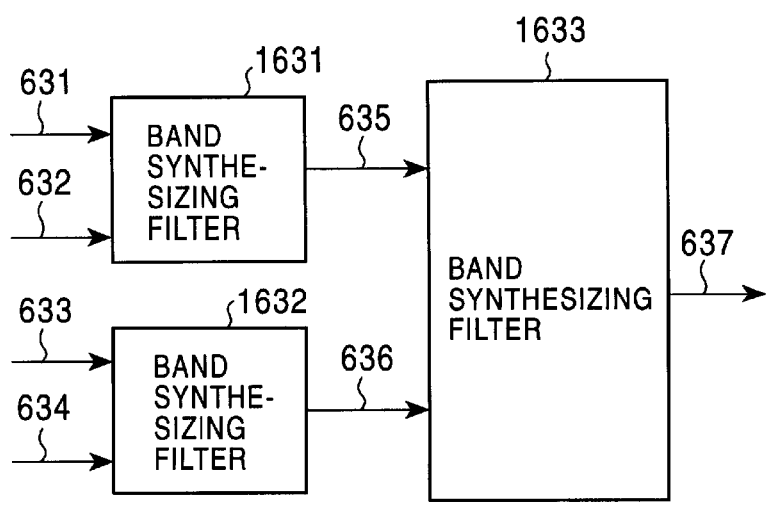
FIG. 13 is a block diagram illustrating the configuration of another inverse transform means for use in the compressed-data recording and/or reproducing apparatus shown in FIG. 1.

The above-described band synthesizing filter 1625 may be formed by, for example, as shown in FIG. 13, a QMF band synthesizing filter. In the band synthesizing filter 1625, signal components 631 and 632 are first synthesized by a band synthesizing filter 1631, while signal components 633 and 634 are synthesized by a band synthesizing filter 1632. Then, signal components 635 and 636 generated by the band synthesizing filters 1631 and 1632, respectively, are further synthesized by a band synthesizing filter 1633, thereby outputting a signal 637.

Figure 14:
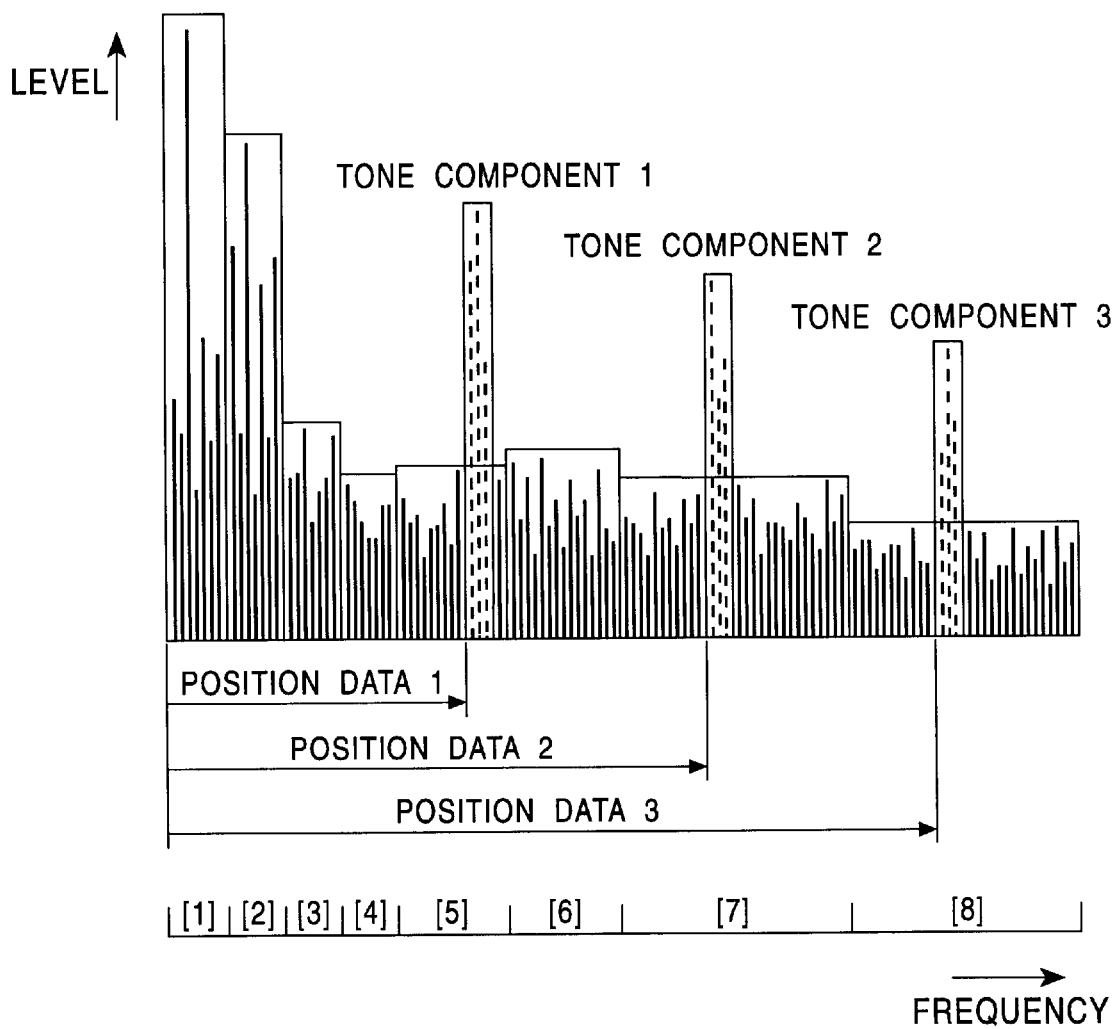
FIG. 14 illustrates another coding method employed by the compressed-data recording and/or reproducing apparatus shown in FIG. 1.

FIG. 14 shows a spectral signal illustrating a coding method in which tone signal components are separated. In this example shown in FIG. 14, three tone components are separated and are to be coded together with position data in the frequency domain.

Generally, in order to minimize loss of sound quality, it is necessary that tone signal components, which have energies only in specific spectral components, be quantized with very high precision. After separating tone components, however, spectral coefficients within each coding unit can be quantized with a comparatively small number of steps without causing the loss of auditory sound quality. For the simplicity of representation, only a relatively small number of spectral components are shown in FIG. 14. In an actual tone signal, however, energy is concentrated in a few spectral coefficients within a coding unit formed of several dozen of spectral components. Thus, an increase in the data amount caused by removing such tone components is small, and the overall coding efficiency can be enhanced by removing tone components.

The spectral signal shown in FIG. 14 is obtained by the transform means configured shown in FIG. 10, and has a frequency resolution twice as high as the spectral signal shown in FIG. 8. With such a high frequency resolution, energy is concentrated in specific spectral signal components. Thus, the aforementioned technique of removing tone components is more effectively employed.

Figure 15:
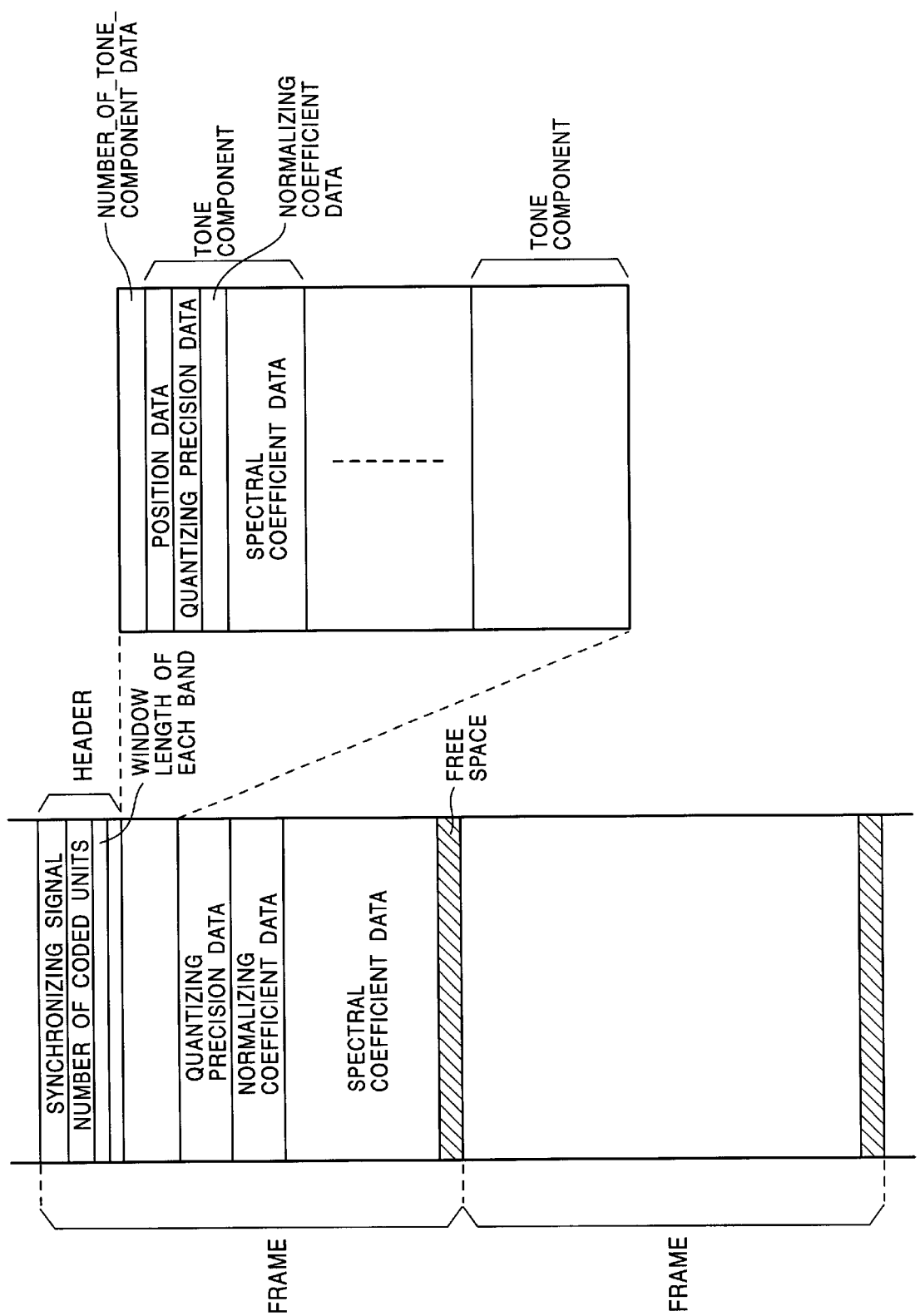
FIG. 15 illustrates a code-string generated by another coding method employed by the compressed-data recording and/or reproducing apparatus shown in FIG. 1.

FIG. 15 illustrates an example of the configuration of a code string obtained by the spectral signal shown in FIG. 14. In the example of the code string illustrated in FIG. 15, a header of each frame contains coded control data, such as a synchronizing signal and the number of coded units, with a predetermined number of bits. Subsequently, tone component data corresponding to tone signal components is coded.

In the tone component data, as shown in FIG. 15, the number of tone components is first coded, and then, positional information of each tone component in the frequency domain, quantizing precision information, normalizing coefficient information, and normalized and quantized spectral coefficient data are coded. Subsequent to the tone component, data of remaining signals (noise signals) obtained by subtracting the tone components from the original spectral signal is coded. In this data, quantizing precision data and normalizing coefficient data of each coding unit, and spectral coefficient data which has been normalized and quantized based on the above-mentioned normalizing coefficient data and quantizing precision data, respectively, are coded, starting from the coding unit of the lower range band. It should be noted that the spectral coefficient data of the tone signal and the noise signal are coded by variable-length coding.

Figure 16:
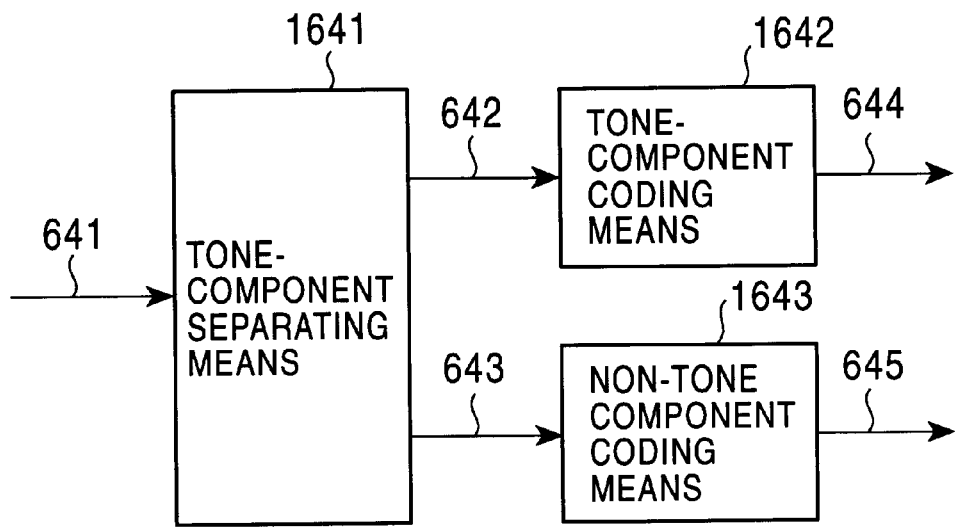
FIG. 16 is a block diagram illustrating the configuration of signal-component coding means for use in the compressed-data recording and/or reproducing apparatus shown in FIG. 1.

FIG. 16 illustrates the signal-component coding means 1102 shown in FIG. 2, which is configured to separate tone components.

The signal-component coding means 1102 is formed of tone-component separating means 1641, tone-component coding means 1642, and non-tone component coding means 1643. The tone-component coding means 1642 and the non-tone component coding means 1643 are configured similarly to, for example, the signal-component coding means shown in FIG. 4. The quantized signal components may be coded by variable-length coding, as discussed above.

In the signal-component coding means 1102, a signal 641 is separated into signal components 642 and 643 by the tone-component separating means 1641. The signal component 642 then undergoes tone-component coding processing by the tone-component coding means 1642, thereby outputting a signal component 644. Meanwhile, the signal component 643 separated by the tone-component separating means 1641 undergoes non-tone component coding processing by the non-tone component coding means 1643, thereby outputting a signal component 645.

Figure 17:
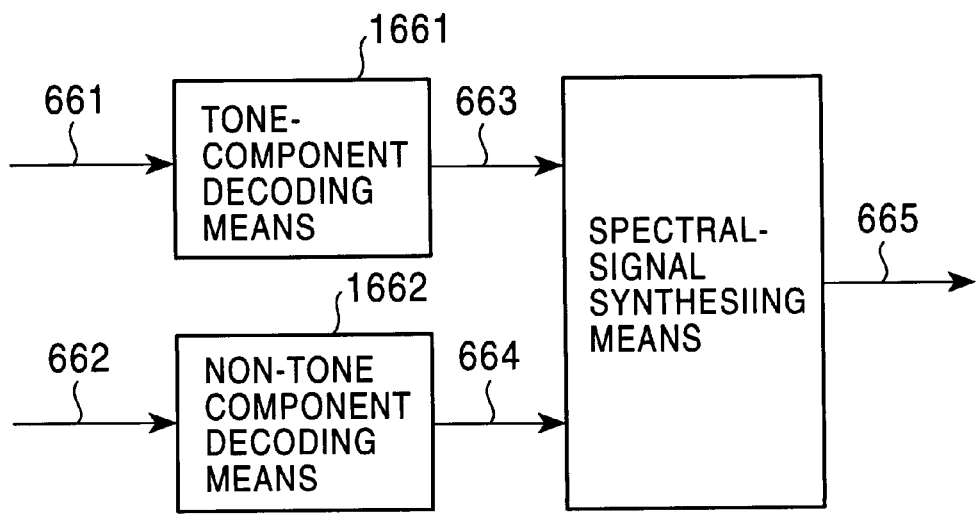
FIG. 17 is a block diagram illustrating the configuration of another signal-component decoding means for use in the compressed-data recording and/or reproducing apparatus shown in FIG. 1.

FIG. 17 illustrates an example of the configuration of the signal-component decoding means 1402 used for separating tone components shown in FIG. 5.

The signal-component decoding means 1402 is formed of tone-component decoding means 1661, non-tone component decoding means 1662, and spectral-signal synthesizing means 1663. The tone-component decoding means 1661 and the non-tone component decoding means 1662 may be configured similarly to the signal-component decoding means 1402 shown in FIG. 6.

In the signal-component decoding means 1402, the tone-component decoding means 1661 performs tone-component decoding processing on a signal component 661 to generate a signal component 663. The non-tone component decoding means 1662 performs non-tone component decoding processing on a signal component 662 to generate a signal component 664. The spectral-signal synthesizing means 1663 synthesizes the signal components 663 and 664 to generate a signal 665. If the quantized signal components have been coded by variable-length coding, they should be decoded before being dequantized.

The respective means for generating a code string from an acoustic waveform signal and generating an acoustic waveform signal from a code-string have been described.

The necessity may often arise of transforming the code string generated as described above into another code string. For example, when a code string transmitted via a communication channel having a relatively small transmission capacity is to be recorded on a recording medium having a comparatively large recording capacity, or when a code string is to be transmitted via a communication channel having a large transmission capacity over a short period and is to be recorded at a high rate on a recording medium having a relatively large recording capacity, it is necessary to employ a high-efficiency coding method in such a communication channel. To meet this requirement, spectrum transform having a long transform block is desirably used to obtain a high frequency resolution. Additionally, when code strings are to be recorded on a recording medium having a relatively large capacity, spectrum transform having a comparatively short transform block is desirably employed in order to implement coding and decoding in comparatively small-scale hardware. In particular, when code strings are to be recorded on a recording medium for use in portable machines, it is convenient for the spectrum transform to be performed after conducting band division in order to reduce the memory size of a decoder. The signal transmitted via a communication channel may be completely decoded and reproduced into the time-series signal, and then the time-series signal may be again coded to obtain a code string for a recording medium. Then, such a predetermined code string can be recorded on the recording medium. However, this requires the processing of the band division filter, which increases the amount of computation. In particular, when the code string is to be transmitted via a communication channel having a comparatively large transmission channel over a short period and is to be recorded on a recording medium having a relatively large recording capacity, it is necessary to perform fast code-string transform. By performing band division processing, which requires a large amount of computation, the time required for recording the code string on the recording medium disadvantageously becomes longer.

In the compressed-data recording and/or reproducing apparatus constructed in accordance with this embodiment of the present invention, the above-described drawback can be overcome by the following construction. When the transmitted code string is to be coded into another code, fast code transform can be performed without completely decoding the code string into a time-series signal.

A description is given below of fast code transform processing implemented by the compressed-data recording and/or reproducing apparatus constructed in accordance with this embodiment of the present invention.

Figure 18:
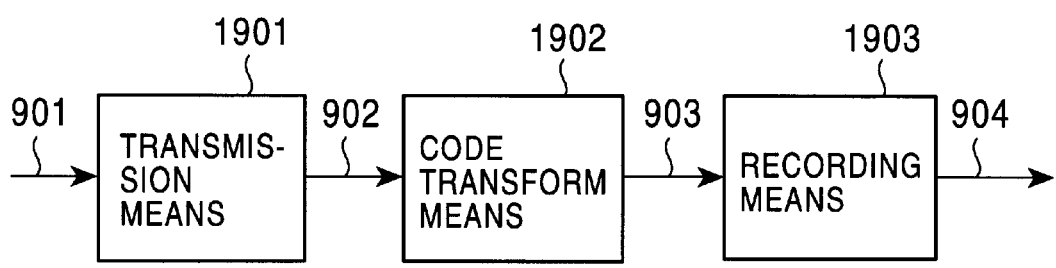
FIG. 18 is a block diagram illustrating the configuration of transmitting and recording means for use in the compressed-data recording and/or reproducing apparatus.

FIG. 18 illustrates the configuration of signal transmitting and recording means employed when a code string transmitted via a communication channel having a relatively small transmission capacity is to be recorded on a recording medium having a comparatively large recording capacity or when a code string is to be transmitted via a communication channel having a large transmission capacity over a short period and is to be recorded at a high rate on a recording medium having a comparatively large recording capacity. For example, the signal transmitting and recording means performs processing on the signal output from the encoder 63 of the compressed-data recording and/or reproducing apparatus shown in FIG. 1.

The aforementioned signal transmitting and recording means is formed of transmission means 1901, code transform means 1902, and recording means 1903.

The signal transmitting and recording means shown in FIG. 18 is formed by incorporating the information recording apparatus of the present invention. The signal transmitting and recording means includes: transmission means 1901 for inputting a first code string obtained by coding a spectral signal which has been transformed with a first block length after a time-series information signal had been divided into a first band group; code transform means 1902 for transforming the first code string into a second code string obtained by coding a spectral signal which has been transformed with a second block length after performing band division into a second band group; and recording means 1903 for recording the second code string on the above-described magneto-optical disk 1. Signals 901 and 902 correspond to the first code string, while signals 903 and 904 correspond to the second code string.

In the signal transmitting and recording means, the signal 901 is input into the transmission means and is output as the signal 902. The signal 902 is code-transformed by the code transform means 1902 and is output as the signal 903. The signal 903 is recorded by the recording means 1903 and is output as the signal 904. In this manner, the signal is recorded on a recording medium.

More specifically, the code string 901, which is data input into the transmission means 1901, is obtained by coding a spectral signal transformed with a relatively long block length after undergoing band division. The code string 904 is equivalent to a code string obtained by coding a spectral signal transformed with a comparatively short block length after undergoing band division, and is to be recorded on a recording medium of the magneto-optical disk 1 via the recording means 1903. Conversely, when a code string is to be transmitted via a communication channel having a large transmission capacity and is to be recorded on a recording medium having a small recording capacity, for example, when a code string is to be recorded on an expensive semiconductor memory via an optical fiber having a large transmission capacity, a code obtained by coding a spectral signal transformed with a relatively short block length after undergoing band division may be used as the code string 901, and a code obtained by coding a spectral signal having a comparatively long block length after undergoing band division may be used as the code string 904.

Figure 19:
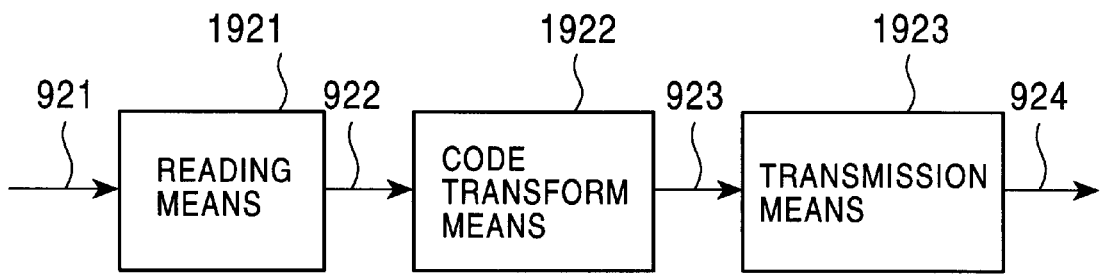
FIG. 19 is a block diagram illustrating the configuration of signal reading and transmitting means for use in the compressed-data recording and/or reproducing apparatus shown in FIG. 1.

FIG. 19 illustrates signal reading means employed when a code string recorded on a recording medium having a relatively large recording capacity is to be transformed at a high rate and is to be transmitted via a communication channel having a comparatively small transmission capacity, or when a code string is to be transmitted via a communication channel having a relatively large transmission capacity.

The signal reading means shown in FIG. 19 is formed of reading means 1921, code transform means 1922, and transmission means 1923. In the signal reading means, an input signal 921 is read by the reading means 1921 and is output as a signal 922. The signal 922 is code-transformed by the code transform means 1922 and is output as a signal 923. The signal 923 is processed by the transmission means 1923 and is then output as a signal 924.

More specifically, the signal 921, which is a code string, is obtained by coding a spectral signal which has been transformed with a relatively short block length after undergoing band division, and is to be read from a recording medium, such as a magneto-optical disk, via the reading means 1921. The code string 924 is comparable to a code obtained by coding a spectral signal which has been transformed with a comparatively long block length after undergoing band division.

Conversely, when a code signal recorded on a recording medium having a small recording capacity is to be read and transmitted via a communication channel having a large transmission capacity, for example, when a signal recorded on an expensive semiconductor memory is to be read and transmitted via an optical fiber having a large transmission capacity, a code obtained by coding a spectral signal transformed with a relatively long block length after undergoing band division may be employed as the code string 921, and a code obtained by coding a spectral signal transformed with a comparatively short block length after undergoing band division may be used as the code string 924.

Figure 20:
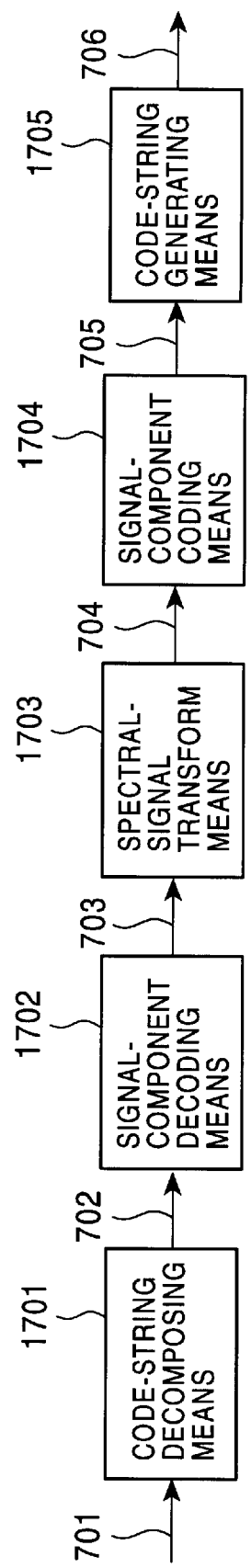
FIG. 20 is a block diagram illustrating the configuration of code transform means for use in the compressed-data recording and/or reproducing apparatus shown in FIG. 1.

FIG. 20 illustrates an example of the configuration of code transform means 1922 for transforming a code string into another code string. The code transform means 1922 is formed of code-string decomposing means 1701, signal-component decoding means 1702, spectral-signal transform means 1703, signal-component coding means 1704, and code-string generating means 1705.

The code transform means 1922 is constructed by incorporating the information coding apparatus of the present invention therein. More specifically, the code transform means 1922 includes: code-string decomposing means 1701, which serves as input means for inputting a first code string obtained by coding a spectral signal which has been transformed with a first block length after dividing a time-series information signal into a first band group; signal-component decoding means 1702 for decoding the input first code string into a spectral signal; spectral-signal transform means 1703 for transforming the decoded spectral signal into a spectral signal transformed with a second block length after being divided into a second band group; signal-component coding means 1704 for coding the transformed spectral signal into a second code string; and code-string generating means 1705. The first block length is set to be longer than the second block length. The compression ratio of the first code string is set higher than that of the second code string.

Figure 21:
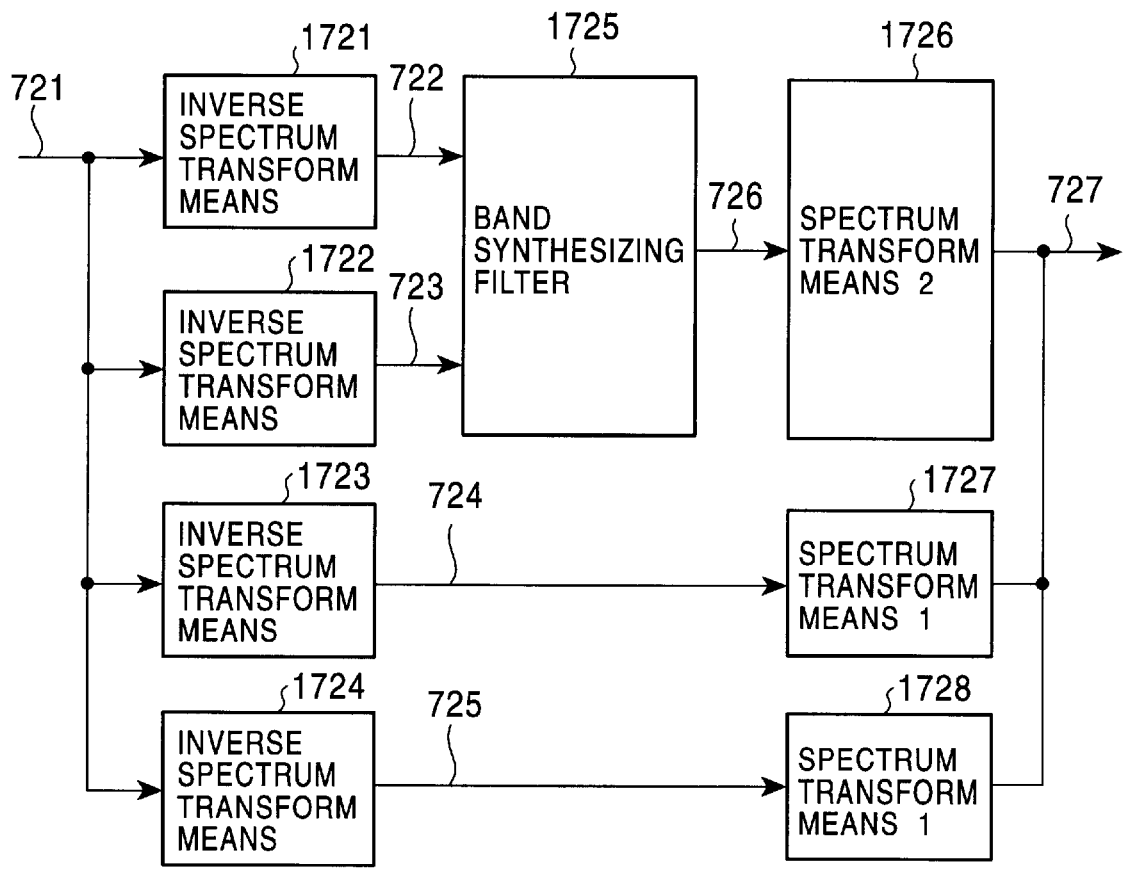
FIG. 21 is a block diagram illustrating the configuration of spectral-signal transform means for use in the compressed-data recording and/or reproducing apparatus shown in FIG. 1.

The aforementioned spectral-signal transform means 1703 is configured, for example, as shown in FIG. 21. With this configuration, if one of the bands of the second band group of the second code string has a bandwidth equivalent to that of synthesized two or more bands of the first band group of the first code string, the spectral signals of the above two or more bands of the first band group can be synthesized into one band of the second band group in the spectral-signal transform means 1703.

In the code transform means 1922 constructed as described above, an input signal 701 undergoes code-decomposition processing by the code-string decomposing means 1701 and is output as a signal 702. The signal 702 is decoded by the signal-component decoding means 1702 into a signal 703. The signal 703 then undergoes spectral-signal transform processing by the spectral-signal transform means 1703 and is output as a signal 704. The signal 704 is then coded by the signal-component coding means 1704 and is output as a signal 705. The signal 705 is then transformed into a code string and is output as a signal 706.

More specifically, the input into the code-string decomposing means 1701 is configured as the code string shown in FIG. 15. The output from the code-string generating means 1705 is configured as the code-string shown in FIG. 9.

The code-string decomposing means 1701 is configured similarly to the code-string decomposing means 1401 shown in FIG. 5. The signal-component decoding means 1702 is configured similarly to that shown in FIG. 17. The signal-component coding means 1704 is configured similarly to that shown in FIG. 4. The code-string generating means 1705 is configured similarly to the code-string generating means 1103 shown in FIG. 2.

FIG. 21 illustrates an example of the configuration of the spectral-signal transform means 1703 shown in FIG. 20. The spectral-signal transform 1703 means is formed of inverse spectrum transform means 1721, 1722, 1723, and 1724, a band synthesizing filter 1725, spectrum transform means (spectrum transform means 2) 1726, and spectrum transform means (spectrum transform means 1) 1727 and 1728.

In the spectral-signal transform means 1703, an input signal 721 has been divided into signal components among a plurality of bands, and the signal components are inverse-spectrum-transformed in the respective inverse spectrum transform means 1721, 1722, 1723, and 1724. Then, signal components 722 and 723 output from the inverse spectrum transform means 1721 and 1722, respectively, are synthesized in the band synthesizing filter 1725. A signal component 726 output from the band synthesizing filter 1725 is spectrum-transformed in the spectrum transform means 1726.

Signal components 724 and 725 which have been inverse-spectrum-transformed in the inverse spectrum transform means 1723 and 1724, respectively, are directly spectrum-transformed in the spectrum transform means 1727 and 1728, respectively, and are output as a signal 727.

The inverse spectrum transform means 1721, 1722, 1723, and 1724 are configured similarly to, for example, the inverse spectrum transform means 1621, 1622, 1623, and 1624, respectively, shown in FIG. 12. The spectrum transform means (spectrum transform means 2) 1726 and the spectrum transform means (spectrum transform means 1) 1727 and 1728 are configured similarly to, for example, the spectrum transform means 1203, 1204, and 1205, respectively, shown in FIG. 3.

The band synthesizing filter 1725 is used for synthesizing two higher-range bands having an equal bandwidth. The band synthesizing filter 1725 may be configured similarly to, for example, the band synthesizing filter 1631 shown in FIG. 13.

In this manner, according to the code transform means shown in FIG. 20 using the spectral-signal transform means 1703 shown in FIG. 21, the amount of computation required for the band-synthesizing and band-dividing operations can be significantly reduced compared to a conventional method in which the code string shown in FIG. 15 is completely decoded and is then coded into the code string shown in FIG. 9. It is thus possible to implement fast code transform.

It is now assumed that the following conditions are met. The code string before being transformed in the spectral-signal transform means 1703 is equal to the code string obtained by coding the spectral signal which has been transformed by using the transform means illustrated in FIG. 10. The band division filter 1601 is configured as shown in FIG. 11. The code string after being transformed is equal to the code string which should be originally obtained by coding the spectral signal which has been transformed by using the transform means 1101 shown in FIG. 3. If the band division filters 1201 and 1202 illustrated in FIG. 3 are identical to the band division filters 1611 and 1613, respectively, shown in FIG. 11, the band synthesizing filter 1631 shown in FIG. 13 corresponding to the band division filter 1612 shown in FIG. 11 may be used as the band synthesizing filter 1725 shown in FIG. 21.

Figure 22:
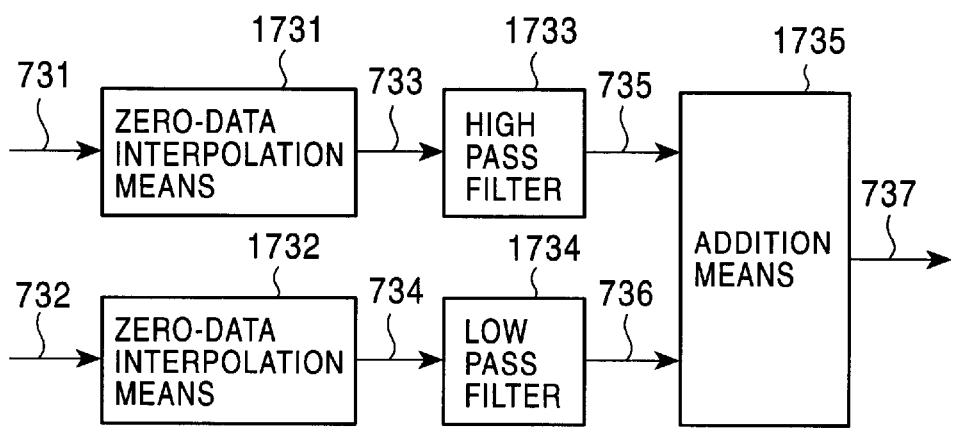
FIG. 22 is a block diagram illustrating the configuration of a band synthesizing filter for use in the compressed-data recording and/or reproducing apparatus shown in FIG. 1.

The band synthesizing filter 1725 is formed of, for example, as shown in FIG. 22, zero-data interpolation means 1731 and 1732, a high pass filter 1733, a low pass filter 1734, and addition means 1735.

The code transform means having the band synthesizing filter 1725 is formed by incorporating the code transform apparatus of the present invention. As discussed above, the code transform means 1922 includes: as shown in FIG. 20, input means, formed of the code-string decomposing means 1701, for inputting a first code string obtained by coding a spectral signal which has been spectrum-transformed after a time-series information signal had been divided into a first band group; and decoding means, formed of the code-string decomposing means 1701 and the signal-component decoding means 1702, for decoding the input first code string into a spectral signal. In this code transform means 1922, the band synthesizing filter 1725 is configured as shown in FIG. 22. With this configuration, for transforming the decoded spectral signal into a spectral signal obtained by performing band division into the second band group, part of the spectral signal in the higher band is inverse-transformed into a decimated time-series signal, and then, the decimated time-series signal is transformed into a lower-band spectral signal within the above-described higher band. The spectral signal output from the band synthesizing filter 1725 is then coded into the second code string by the signal-component coding means 1704 and the code-string generating means 1705, which serve as the coding means, shown in FIG. 20.

In the band synthesizing filter 1725, input signal components 731 and 732 are interpolated in the zero-data interpolation means 1731 and 1732, respectively. Signal components 733 and 734 interpolated in the zero-data interpolation means 1731 and 1732, respectively, are filtered by the high pass filter 1733 and the low pass filter 1734, respectively, and are output as signal components 735 and 736, respectively. The signal components 735 and 736 are then input into the addition means 1735 and are added, thereby being output as a signal 737.

More specifically, the higher-band input signal component 731 input into the zero-data interpolation means 1731 is equal to the signal component 722 shown in FIG. 21, while the lower-band input signal component 732 input into the zero-data interpolation means 1732 is equal to the signal component 723 shown in FIG. 21. The signal 737 output from the addition means 1735 corresponds to the signal 726 shown in FIG. 21.

In the band synthesizing filter 1725, the higher-band input signal component 731 and the lower-band input signal component 732, both of which are decimated to one-half the output signal 737, are interpolated with the signal having a value of zero in the zero-data interpolation means 1731 and 1732, respectively. Thereafter, the signal components 731 and 732 are filtered by the high pass filter 1733 and the low pass filter 1734, respectively, and are then added in the addition means 1735, thereby being output as the signal 737.

As the above-described band synthesizing filter 1725, a more simplified filter may be used; for example, a synthesizing filter having a shorter tap length may be used. If the tap length and the filter coefficient of the band synthesizing filter do not correspond to those of the band division filter, the original signal cannot be reproduced even after performing the band dividing operation and the band synthesizing operation. As described in this embodiment, however, data is compressed by utilizing auditory characteristics. In this case, if a signal distortion generated by the inconsistency of the two filters is smaller than the amount of quantizing noise caused by the decreased quantizing precision, it is actually masked by the signal sound, thereby suppressing a decrease in the sound quality to a minimal level. In particular, in the example shown in FIG. 21, if the sampling frequency of the original signal is, for example, 48 kHz, the sound quality is not significantly deteriorated from the auditory point of view, since the signal component 726 is at 12 kHz or higher. In the above-described example, the code string before transforming is obtained by coding spectral signal components which have been divided into four bands by using two stages of QMFs. If the code string is obtained by coding a spectral signal after undergoing band division by using a PQF, the resulting sound quality is not significantly deteriorated from the auditory point of view due to the masking effect. Thus, the PQF may be used instead of the QMF.

Figure 23:
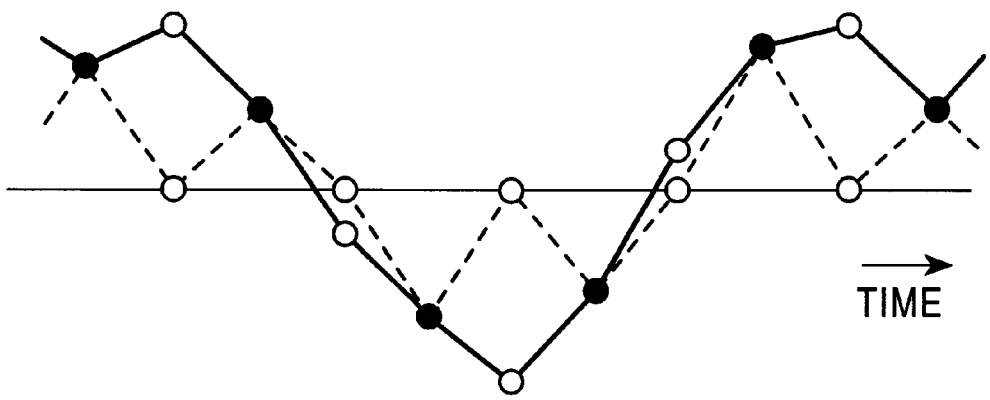
FIG. 23 illustrates a spectral-signal transform method employed by the compressed-data recording and/or reproducing apparatus shown in FIG. 1.
Figure 24:
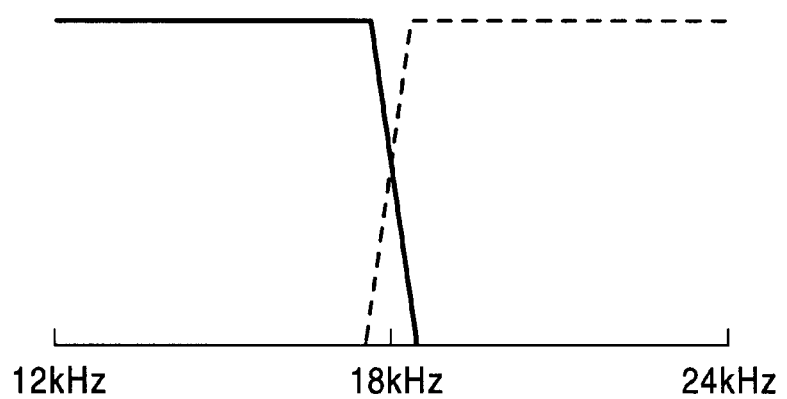
FIG. 24 illustrates a spectral-signal transform method employed by the compressed-data recording and/or reproducing apparatus shown in FIG. 1.

The provision of the band synthesizing filter 1725 may be omitted. This will be explained with reference to FIG. 23 by assuming that the sampling frequency of the original signal is 48 kHz. In FIG. 23, the black dots (•) indicate the sampling signal of the above signal component 732; the broken line represents the signal component 734 obtained by interpolating the signal component 732 with zero data; and the solid line indicates the signal component 736 after being passed through the low pass filter 1734. The signal component 732 corresponds to a signal component ranging from 12 kHz to 18 kHz which has been sampled at 12 kHz. Since the signal component 732 is interpolated with zero data, the sampling rate of the signal component is increased to 24 kHz, and also, the signal component of the band indicated by the broken line of FIG. 24 is added. However, human ears are extremely insensitive to sounds of 18 kHz or higher. Accordingly, the above-described signal component may be safely disregarded, producing very little influence on the auditory characteristics.

Thus, by transforming the data indicated by the broken line in FIG. 23 into a spectral signal and by disregarding the signal components of 18 kHz or higher, the processing of the low pass filter 1734 shown in FIG. 22 can be omitted. Since the signal components of 18 kHz or higher are originally disregarded, the processing of the zero-data interpolation means 1731, the high pass filter 1733, and the addition means 1735 may be safely omitted, with the result that the entire band synthesizing filter 1725 shown in FIG. 21 may be safely eliminated.

The code transform means having the spectral-signal transform means constructed as described above is formed by incorporating the code transform apparatus of the present invention. More specifically, the code transform means includes: input means for inputting a first code string obtained by coding a spectral signal which has been transformed with a first block length after a time-series signal had been divided into a first band group; decoding means for decoding the input first code string into a spectral signal; spectral-signal transform means for transforming the decoded spectral signal into a spectral signal transformed with a second block length after being divided into a second band group, and more specifically, for inverse-transforming only the lower-band spectral signal component of the first code string into the decimated time-series signal and for transforming the decimated time-series signal into the lower-band spectral signal component; and coding means for coding the transformed spectral signal.

Figure 25:
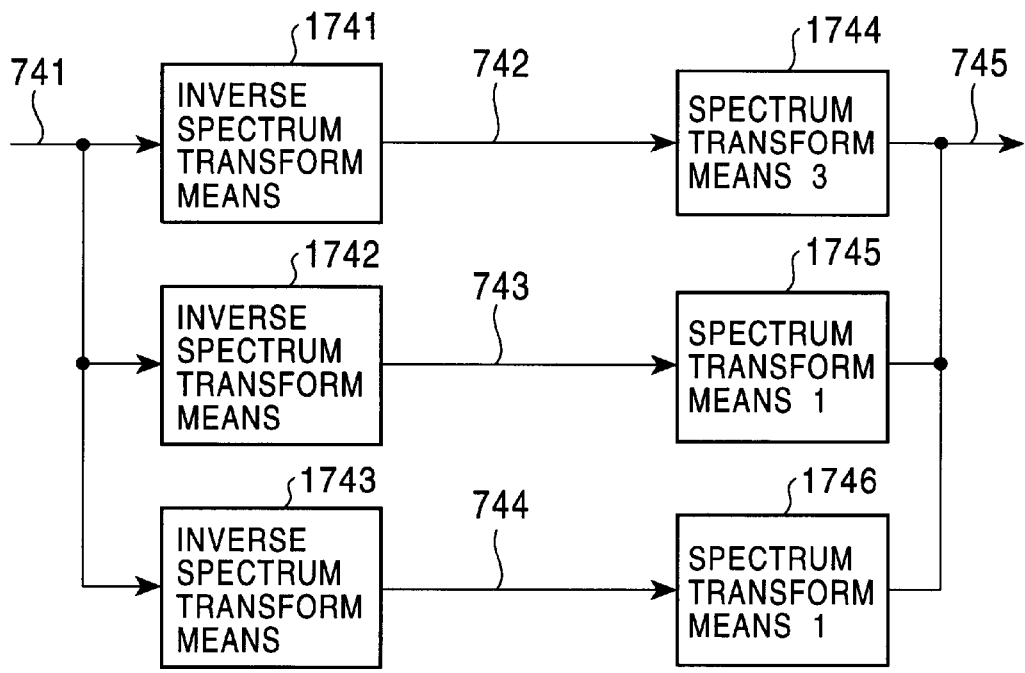
FIG. 25 is a block diagram illustrating the configuration of another spectral-signal transform means for use i n the compressed-data recording and/or reproducing apparatus shown in FIG. 1.

FIG. 25 illustrates an example of the above-described spectral-signal transform means without a band synthesizing filter. That is, the spectral-signal transform means shown in FIG. 25 is formed of inverse spectrum transform means 1741, 1742, and 1743, spectrum transform means (spectrum transform means 3) 1744, and spectrum transform means (spectrum transform means 1) 1745 and 1746.

In the above spectral-signal transform means, an input signal 741 is inverse-spectrum-transformed in the respective bands by the inverse spectrum transform means 1741, 1742, and 1743. Inverse-spectrum-transformed signal components 742, 743, and 744 output from the inverse spectrum transform means 1741, 1742, and 1743, respectively, are spectrum-transformed in the spectrum transform means 1744, 1745, and 1746, respectively, and are output as a signal 745.

More specifically, the inverse spectrum transform means 1741, 1742, and 1743 correspond to, for example, the inverse spectrum transform means 1722, 1723, and 1724, respectively, illustrated in FIG. 21, while the spectrum transform means (spectrum transform means 1) 1745 and 1746 correspond to, for example, the spectrum transform means (spectrum transform means 1) 1727 and 1728, respectively, shown in FIG. 21. It is now assumed that the spectrum transform means (spectrum transform means 2) 1726 shown in FIG. 21 transforms the 4M time-series signals 726 including overlapping portions into 2M spectral signals of 12 kHz to 24 kHz. In contrast, the spectrum transform means (spectrum transform means 3) 1744 shown in FIG. 25 transforms the 2M time-series signals including overlapping portions, except for zero data, into M spectral signals of 12 kHz to 18 kHz. Accordingly, the amount of computation is significantly reduced. In practice, if, for example, the above spectrum transform is implemented by simple product-sum operations, the number of operations can be reduced to about one-fourth the operations required for the spectrum transform means 1703 shown in FIG. 21. Such a reduction of product-sum operations in combination with the decreased product-sum operations in the band synthesizing filter remarkably increases the processing rate.

Figure 26:
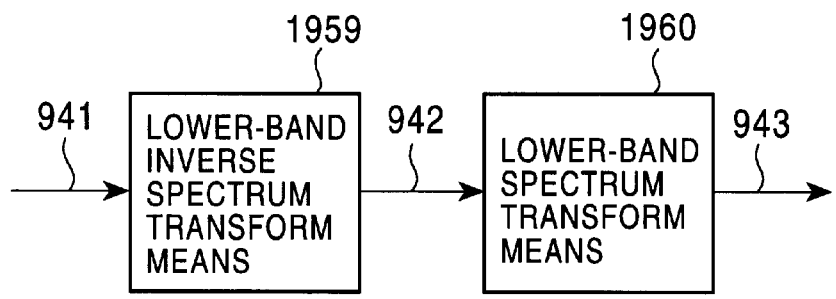
FIG. 26 is a block diagram illustrating another spectral-signal transform means for use in the compressed-data recording and/or reproducing apparatus shown in FIG. 1.

The same may apply to the case in which a code string obtained by coding a spectral signal which has been directly transformed without conducting band division is to be transformed. FIG. 26 illustrates an example of the configuration of such a spectral-signal transform means.

The spectral-signal transform means shown in FIG. 26 is formed of lower-band inverse spectrum transform means 1959 and lower-band spectrum transform means 1960. In the spectral-signal transform means, lower band components of an input signal 941 are inverse-spectrum-transformed by the lower-band inverse spectrum transform means 1959 and are output as a signal 942. Then, the signal 942 is spectrum-transformed by the lower-band spectrum transform means 1960, thereby being output as a signal 943.

More specifically, the signal 941 input into the lower-band inverse spectrum transform means 1959 is comparable to a spectral signal transformed with a long block length, while the signal 943 output from the lower-band spectrum transform means 1960 is comparable to a spectral signal transformed with a short block length. However, the higher-band spectral signal component of the signal 943 is zero.

The lower-band inverse spectrum transform means 1959 transforms the lower-band spectral signal component of the signal 941 and outputs the time-series signal 942 decimated in accordance with the bandwidth. The lower-band spectrum transform means 1960 transforms the time-series signal 942 decimated in accordance with the bandwidth and outputs the lower-band spectral signal 943.

In the spectral-signal transform means shown in FIG. 26, as well as in the higher-band spectral-signal transform means shown in FIG. 25, much faster transform processing can be achieved than when the transform means executes transform processing on the entire band. In this example, however, since the time-series signal 942 is decimated to one-half or less, the bandwidth of the spectral signal 943 is reduced to one-half or less. Accordingly, the spectral-signal transform means can be configured, as shown in FIG. 25. It is impossible to reduce the bandwidth of the output spectral signal to, for example, three-quarters.

Figure 27:
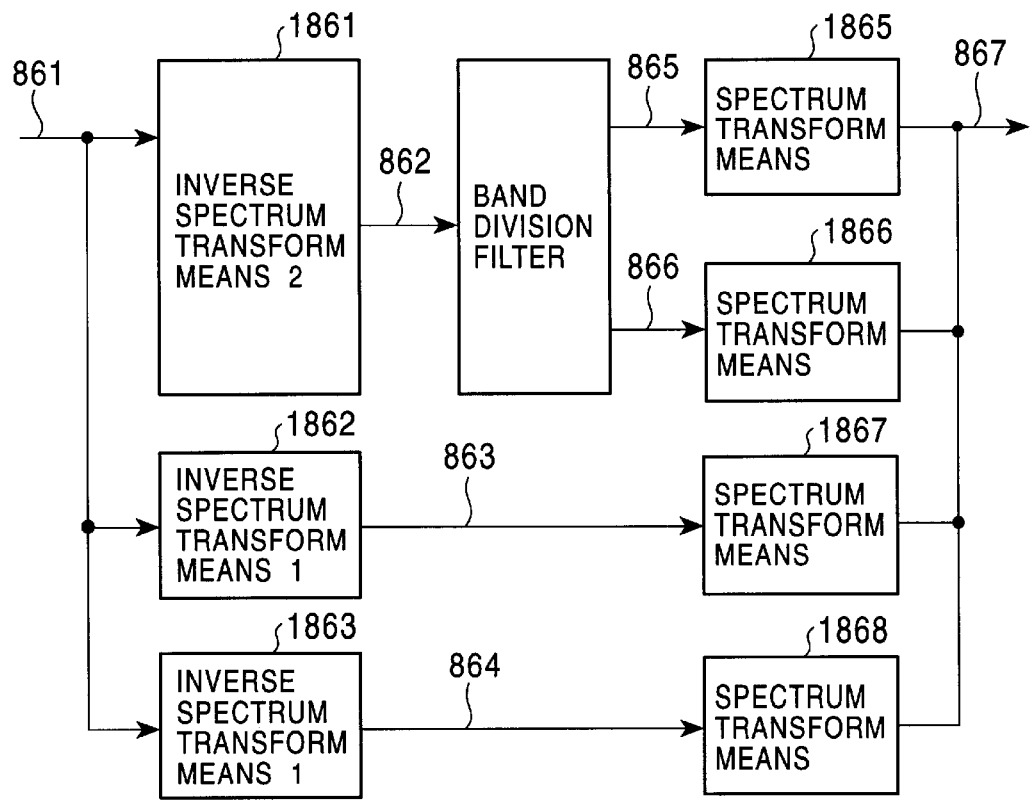
FIG. 27 illustrates the configuration of another spectral-signal transform means for use in the compressed-data recording and/or reproducing apparatus shown in FIG. 1.

In contrast to the spectral-signal transform means shown in FIG. 21, FIG. 27 illustrates an example of the configuration of spectral-signal transform means for transforming the code obtained by coding the spectral signal which has been transformed by the transform means shown in FIG. 3 into the code obtained by coding the spectral signal which has been transformed by the transform means shown in FIG. 10.

The spectral-signal transform means illustrated in FIG. 27 is formed of inverse spectrum transform means (inverse spectrum transform means 2) 1861, inverse spectrum transform means (inverse spectrum transform means 1) 1862 and 1863, a band division filter 1864, and spectrum transform means 1865, 1866, 1867, and 1868.

In the above spectral-signal transform means, an input signal 861 is inverse-spectrum-transformed in the respective bands in the inverse spectrum transform means 1861, 1862, and 1863 and is output as signal components 862, 863, and 864, respectively. Then, the signal component 862 undergoes band division in the band division filter 1864.

Subsequently, signal components 865 and 866 divided by the band division filter 1864, and signal components 863 and 864 inverse-spectrum-transformed by the inverse spectrum transform means 1862 and 1863, respectively, are spectrum-transformed in the spectrum transform means 1865, 1866, 1867, and 1868, respectively, and are output as a signal 867.

More specifically, the inverse spectrum transform means (inverse spectrum transform means 2) 1861 corresponds to, for example, the inverse spectrum transform means 1501 shown in FIG. 7, and the inverse spectrum transform means (inverse spectrum transform means 1) 1862 and 1863 correspond to, for example, the inverse spectrum transform means 1502 and 1503, respectively, shown in FIG. 7. The spectrum transform means 1865, 1866, 1867, and 1868 correspond to, for example, the spectrum transform means 1602, 1603, 1604, and 1605, respectively, illustrated in FIG. 10.

In the example illustrated in FIG. 27, immediately after the lower-band signal components are inverse-spectrum-transformed by the inverse spectrum transform means 1862 and 1863, the resulting signal components 863 and 864 are spectrum-transformed in the respective bands by the spectrum transform means 1867 and 1868, respectively. With this arrangement, the amount of computation is reduced over the spectral-signal transform means in which the original time-series signal is completely reproduced. Additionally, as the band division filter 1864, as in the band synthesizing filter 1725 illustrated in FIG. 21, a band division filter having a comparatively short tap length may be used. In this case, the sound quality is not significantly lowered by virtue of the auditory characteristics.

Figure 28:
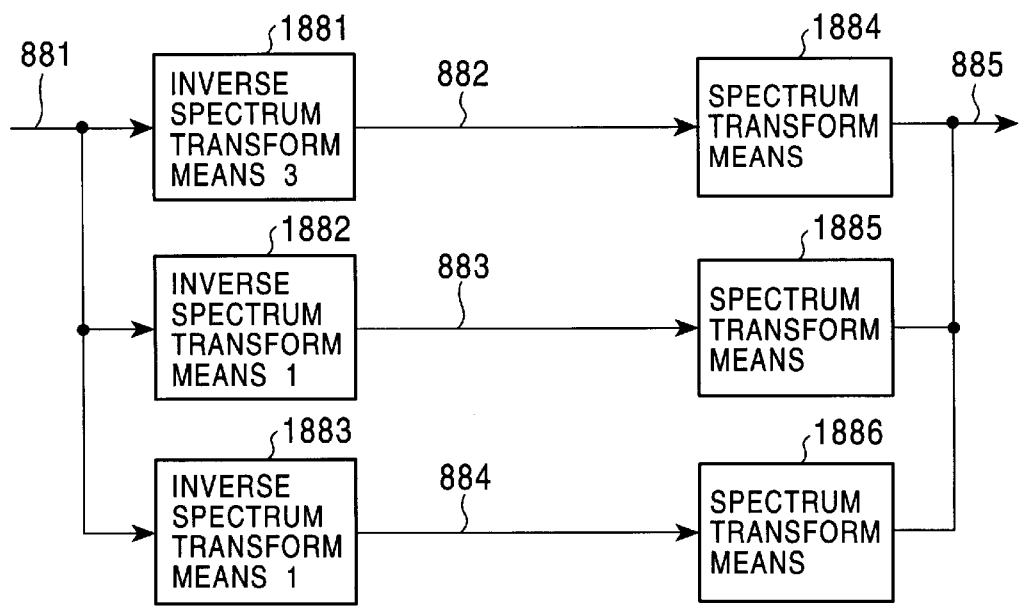
FIG. 28 illustrates the configuration of another spectral-signal transform means for use in the compressed-data recording and/or reproducing apparatus shown in FIG. 1.

As in the spectral-signal transform means shown in FIG. 25, if it is sufficient that the signals lower than 18 kHz be coded, the provision of the band division filter 1864 may be omitted. The configuration of such a spectral-signal transform means is shown in FIG. 28. The configuration of the spectral-signal transform means employed when the sampling frequency of the original sound signal is 48 kHz is shown.

The spectral-signal transform means shown in FIG. 28 is formed of inverse spectrum transform means 1881, 1882, and 1883, and spectrum transform means 1884, 1885, and 1886.

In this spectral-signal transform means, an input signal 881 is inverse-spectrum-transformed in the respective bands in the inverse spectrum transform means 1881, 1882, and 1883, and is output as signal components 882, 883, and 884, respectively. The signal components 882, 883, and 884 are directly spectrum-transformed by the spectrum transform means 1884, 1885, and 1886, respectively, and are output as a signal 885.

More specifically, the inverse spectrum transform means (inverse spectrum transform means 1) 1882 and 1883 correspond to, for example, the inverse spectrum transform means 1862 and 1863 shown in FIG. 27, while inverse spectrum transform means (inverse spectrum transform means 3) 1881 corresponds to, for example, the inverse spectrum transform means 1861 (inverse spectrum transform means 2) shown in FIG. 27. The inverse spectrum transform means 1881 restricts the input signal 881 of 12 kHz to 24 kHz to spectral signal components of 12 kHz to 18 kHz, and outputs the signal 882 decimated to one-half in the time domain. The spectrum transform means 1884, 1885, and 1886 correspond to, for example, the spectrum transform means 1866, 1867, and 1868, respectively, illustrated in FIG. 27.

More specifically, the spectral-signal transform means configured as described above, as illustrated in FIG. 28, performs inverse spectrum transform by assuming that spectral signal components of 18 kHz or higher contained in the spectral signal of 12 kHz to 24 kHz are zero. Since the signal components of 12 kHz to 24 kHz do not substantially contain signal components of 18 kHz or higher, an influence of aliasing components generated by simply decimating the obtained signal can be ignored. The processing of the band division filter is not particularly required.

The inverse spectrum transform means 1881 is configured to transform a half number of spectral signals processed in the inverse spectrum transform means 1861 shown in FIG. 27 into a time-series signal which has been decimated to one-half within the band. Thus, the processing of the inverse spectrum transform means 1881 is less heavy compared to that of the inverse spectrum transform means 1861 shown in FIG. 27. The reason for this is similar to that for reducing the processing of the spectrum transform means 1744 illustrated in FIG. 25.

Although the transform processing described above is for monoaural spectral signals, it may be performed on the individual channels to be used for multi-channel signals, such as stereo signals. In this case, faster transform can be achieved by further simplifying the processing while maintaining good sound quality by utilizing the auditory characteristics.

Figure 29:
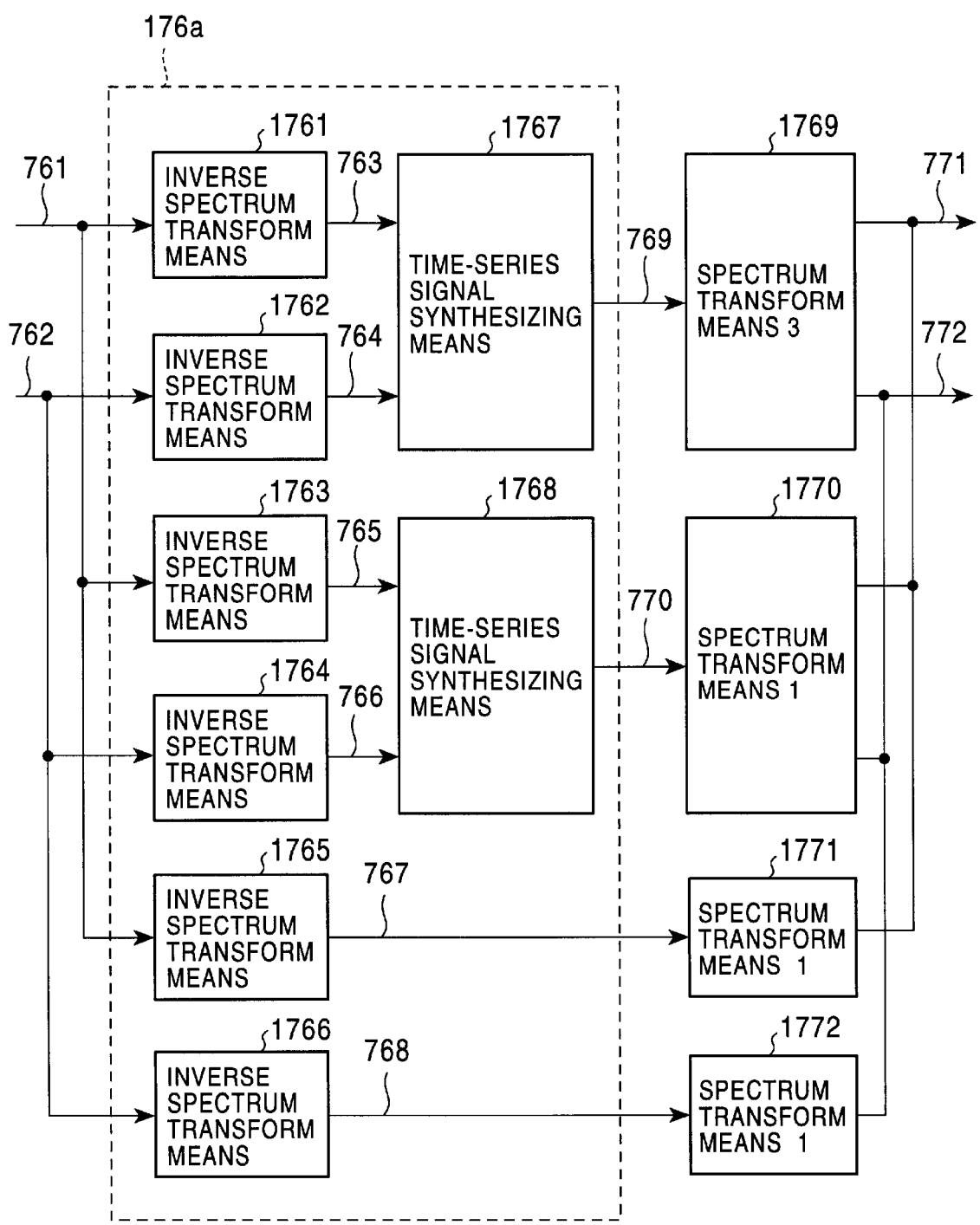
FIG. 29 is a block diagram illustrating the configuration of another spectral-signal transform means for use in the compressed-data recording and/or reproducing apparatus shown in FIG. 1.

FIG. 29 illustrates an example of the configuration of multi-channel spectral-signal transform means for transforming a stereo spectral signal into another spectral signal at a high rate.

The spectral-signal transform means shown in FIG. 29 is formed of inverse spectrum transform means 1761, 1762, 1763, 1764, 1765, and 1766, time-series synthesizing means 1767 and 1768, spectrum transform means (spectrum transform means 3) 1769, spectrum transform means (spectrum transform means 1) 1770, 1771, and 1772. In FIG. 29, a signal 761 is an L-channel spectral signal, while a signal 762 is an R-channel spectral signal.

The code transform means having the aforementioned spectral-signal transform means is formed by incorporating the code transform apparatus of the present invention. The spectral-signal transform means includes: input means for inputting a first code string obtained by coding time-series information signals corresponding to a plurality of channels; and transform means for transforming the input first code string into a second code string that produces the same higher band for the respective channels of the time-series information signals when being decoded.

In FIG. 29, the input means is formed of the inverse spectrum transform means 1761, 1762, 1763, 1764, 1765, and 1766, while the transform means is formed of the time-series synthesizing means 1767 and 1768.

The above-described spectral-signal transform means may be used in the following type of code transform means, which includes: input means for inputting a first code string obtained by coding spectral signals which have been transformed after multi-channel time-series information signals had been divided into a first band group; decoding means for decoding the input first code string into the spectral signals; spectral-signal transform means for transforming the decoded spectral signals into spectral signals which have been transformed after being divided into a second band group; and coding means for coding the transformed spectral signals into a second code string. With this arrangement, the spectral-signal transform means may transform the higher-band multi-channel signals into the same types of signals.

In the spectral-signal transform means, the signal 761, which is an input L-channel spectral signal, is inverse-spectrum-transformed in the respective bands in the inverse spectrum transform means 1761, 1763, and 1765, while the signal 762, which is an input R-channel spectral signal, is inverse-spectrum-transformed in the respective bands in the inverse spectrum transform means 1762, 1764, and 1766.

Signals 763 and 764 which have been inverse-spectrum-transformed in the inverse spectrum transform means 1761 and 1762, respectively, are synthesized in the time domain by the time-series signal synthesizing means 1767, while signals 765 and 766 which have been inverse-spectrum-transformed in the inverse spectrum transform means 1763 and 1764, respectively, are synthesized in the time domain by the time-series signal synthesizing means 1768. Signals 769 and 770 generated by being synthesized in the time-series signal synthesizing means 1767 and 1768, respectively, are spectrum-transformed in the spectrum transform means 1769 and 1770, respectively.

Signals 767 and 768 which have been inverse-spectrum-transformed in the inverse spectrum transform means 1765 and 1766, respectively, are directly spectrum-transformed in the spectrum transform means 1771 and 1772, respectively.

In this manner, the spectral-signal transform means suitably performs inverse spectrum transform and spectrum transform on the input multi-channel signals 761 and 762, and also outputs as multi-channel signals 771 and 772.

More specifically, the inverse spectrum transform means 1761 and 1762 correspond to, for example, the inverse spectrum transform means 1741 shown in FIG. 25; the inverse spectrum transform means 1763 and 1764 correspond to, for example, the inverse spectrum transform means 1742 shown in FIG. 25; and the inverse spectrum transform means 1765 and 1766 correspond to, for example, the inverse spectrum transform means 1743 shown in FIG. 25.

In the example configured as described above, the L-channel signal and the R-channel signal, except the lowest-band signal components, are first synthesized in the time domain, and are then spectrum-transformed. This type of transform processing does not seriously impair sound quality since higher-band signal components produce very little influence on the stereo sound from the auditory point of view. It is thus possible to reduce the amount of spectrum transform processing for higher-band signal components while maintaining good sound quality. Accordingly, faster transform processing can be achieved. In the foregoing description, there is no difference between the respective channels of the output signals from the spectrum transform means (spectrum transform means 3) 1769 and the spectrum transform means (spectrum transform means 1) 1770. As an example of the modifications of this technique, however, weights may be assigned to the respective channels of the output signals from the spectrum transform means (spectrum transform means 3) 1769 and the spectrum transform means (spectrum transform means 1) 1770 in accordance with the energy ratio of the higher-band L/R spectral signal components. Then, the signals of the respective channels are produced.

In the foregoing description with reference to FIG. 29, a technique of processing multi-channel signals based on the transform method employed by disregarding the highest band, shown in FIG. 25, has been discussed. However, the multi-channel spectral-signal transform means shown in FIG. 29 may be employed based on one of the transform methods shown in FIGS. 21, 27, and 28.

More specifically, if the multi-channel spectral-signal transform means illustrated in FIG. 29 is adapted to the spectral-signal transform means shown in FIG. 21, the inverse spectrum transform means 1761 and 1762 may be substituted with the inverse spectrum transform means 1721 and 1722, and higher-band transform means formed of the band synthesizing filter 1725, respectively, illustrated in FIG. 21. In this case, the time-series signal synthesizing means 1767 synthesizes signals having 12 kHz to 24 kHz in the time domain. Instead of the spectrum transform means (spectrum transform means 3) 1769, spectrum transform means that executes processing similar to the spectrum transform means (spectrum transform means 2) 1726 is employed.

If the multi-channel spectral-signal transform means illustrated in FIG. 29 is adapted to the spectral-signal transform means shown in FIG. 27, the following modification may be made. The inverse spectrum transform means 1761 and 1762 may be substituted with the inverse spectrum transform means (inverse spectrum transform means 2) 1861 and higher-band transform means formed of the band division filter 1864, respectively, shown in FIG. 27. In this case, time-series signal synthesizing means for processing an output corresponding to the signal 865, i.e., the highest band of 18 kHz to 24 kHz, shown in FIG. 27, and spectrum transform means corresponding to the spectrum transform means 1865 may be further added. An L output and an R output of the newly added spectrum transform means are output as the signals 771 and 772, respectively. The time-series signal synthesizing means 1767 is used for processing the band from 12 kHz to 18 kHz, i.e., an output corresponding to the signal 866 shown in FIG. 27. Instead of the spectrum transform means (spectrum transform means 3) 1769, spectrum transform means that executes processing similar to the spectrum transform means 1866 is employed. Likewise, the inverse spectrum transform means 1763, 1764, 1765, and 1766 are replaced by the inverse spectrum transform means 1862, 1862, 1863, and 1863, respectively, illustrated in FIG. 27. The spectrum transform means (spectrum transform means 1) 1770, 1771, and 1772 are substituted with the spectrum transform means 1867, 1868, and 1868, respectively, shown in FIG. 27.

Alternatively, if the multi-channel spectral-signal transform means illustrated in FIG. 29 is adapted to the spectral-signal transform means shown in FIG. 28, the inverse spectrum transform means 1761, 1762, 1763, 1764, 1765, and 1766 are replaced by the inverse spectrum transform means 1881, 1881, 1882, 1882, 1883, and 1883, respectively, shown in FIG. 28. Instead of the spectrum transform means (spectrum transform means 3) 1769 and the spectrum transform means (spectrum transform means 1) 1770, 1771, and 1772, the spectrum transform means 1884, 1885, 1886, and 1886, respectively, illustrated in FIG. 28 may be used.

In the spectral-signal transform means illustrated in FIG. 29, higher-band signal components are synthesized in the time domain. In contrast, FIG. 30 illustrates an example of the configuration of multi-channel spectral-signal transform means in which spectral signal components can be synthesized in the frequency domain.

Figure 30:
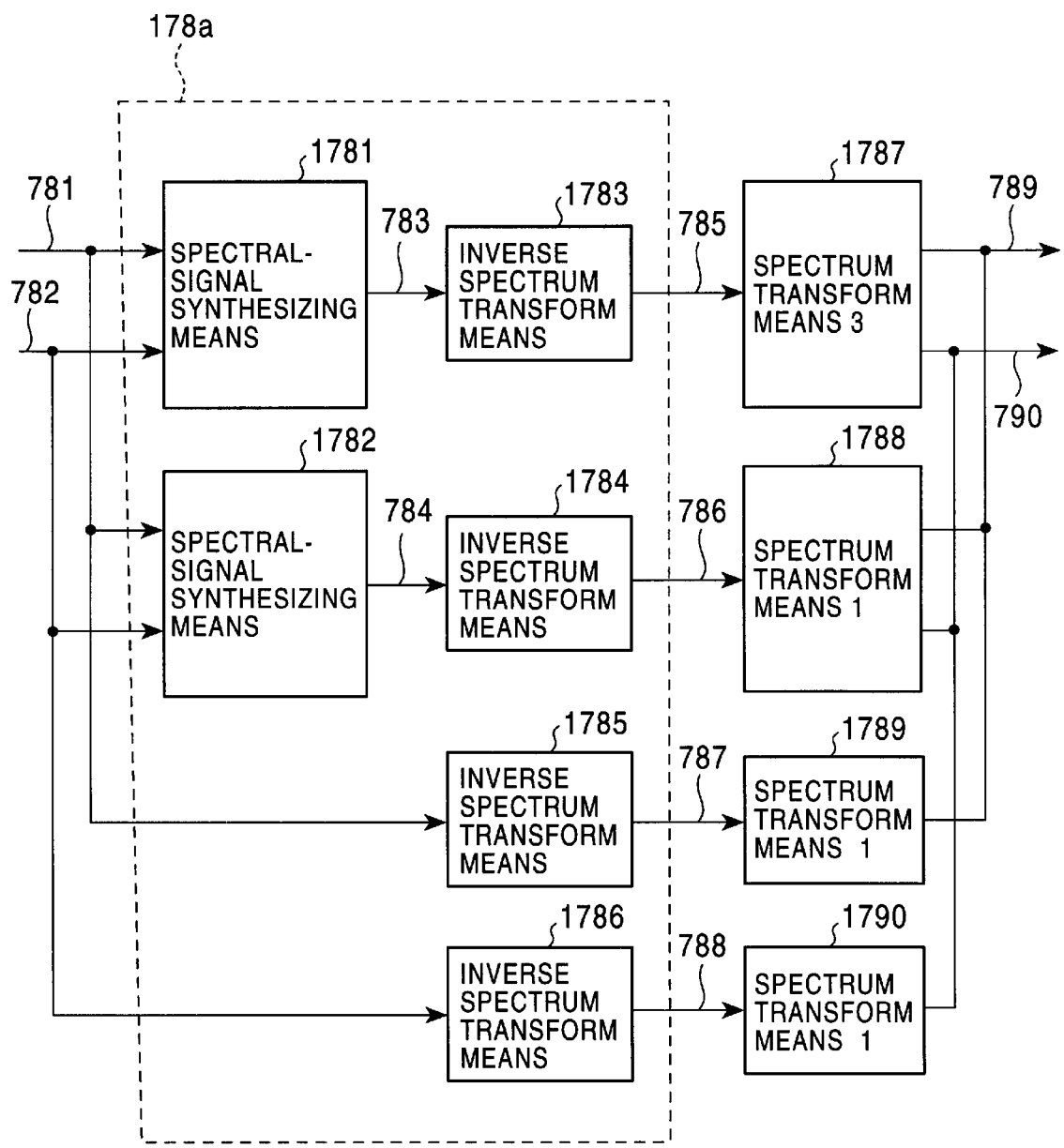
FIG. 30 is a block diagram illustrating the configuration of another spectral-signal transform means for use in the compressed-data recording and/or reproducing apparatus shown in FIG. 1.

The multi-channel spectral-signal transform means shown in FIG. 30 is formed of spectral-signal synthesizing means 1781 and 1782, inverse spectral transform means 1783, 1784, 1785, and 1786, spectrum transform means (spectrum transform means 3) 1787, and spectrum transform means (spectrum transform means 1) 1788, 1789, and 1790.

In this spectral-signal transform means, input signals 781 and 782 are synthesized in the respective bands in the spectral-signal synthesizing means 1781 and 1782 and are output as signals 783 and 784, respectively. The signals 783 and 784 are inverse-spectrum-transformed in the inverse spectral transform means 1783 and 1784, respectively, and are output as signals 785 and 786, respectively. The signals 785 and 786 are spectrum-transformed in the spectrum transform means 1787 and 1788, respectively.

The lower band components of the input signals 781 and 782 are inverse-spectrum-transformed in the inverse spectral transform means 1785 and 1786 and are output as the signals 787 and 788, respectively. The signals 787 and 788 are spectrum-transformed in the spectrum transform means 1789 and 1790, respectively.

In this manner, the aforementioned spectral-signal transform means appropriately performs inverse-spectrum-transform and spectrum-transform on the signals 781 and 782, which are input as stereo signals, and outputs them as signals 789 and 790, respectively.

In the above-described multi-channel spectral-signal transform means, the processing of the inverse spectrum transform means is simplified, thereby further enabling faster transform. However, this spectral-signal transform means cannot be configured as in this example when the transform block length is different between L and R channels. In this example, as well as in the previous example, weights may be assigned to the L and R channels of the output signals from the spectrum transform means (spectrum transform means 3) 1787 and the spectrum transform means (spectrum transform means 1) 1788 in accordance with the energy ratio of the higher-band L and R spectral-signals. In this manner, the respective channels of the signals may be produced.

The spectral-signal transform means may be configured in such a manner that the inverse spectrum transform unit 176a shown in FIG. 29 and the inverse spectrum transform unit 178a shown in FIG. 30 are switchable. This makes it possible to execute processing while considering the processing rate and data precision.

In the foregoing description with reference to FIG. 30, a technique of processing multi-channel signals based on the transform method employed by disregarding the highest band, shown in FIG. 25, has been discussed. However, the multi-channel spectral-signal transform means shown in FIG. 30 may be employed based on one of the transform methods shown in FIGS. 21, 27, and 28.

More specifically, if the multi-channel spectral-signal transform means illustrated in FIG. 30 is adapted to the spectral-signal transform means shown in FIG. 21, the inverse spectrum transform means 1783 may be substituted with the inverse spectrum transform means 1721 and 1722, and higher-band transform means formed of the band synthesizing filter 1725, illustrated in FIG. 21. In this case, the time-series signal synthesizing means 1781 synthesizes signals having 12 kHz to 24 kHz in the frequency domain. Instead of the spectrum transform means (spectrum transform means 3) 1787, spectrum transform means that executes processing similar to the spectrum transform means (spectrum transform means 2) 1726 is employed.

If the multi-channel spectral-signal transform means illustrated in FIG. 30 is adapted to the spectral-signal transform means shown in FIG. 27, the following modification may be made. The inverse spectrum transform means 1783 may be substituted with the inverse spectrum transform means (inverse spectrum transform means 2) 1861 and higher-band transform means formed of the band division filter 1864, shown in FIG. 27. In this case, the spectrum transform means (spectrum transform means 3) 1787 is replaced by spectrum transform means, corresponding to the spectrum transform means 1866, for processing an output corresponding to the signal 866, i.e., the band of 12 kHz to 18 kHz, shown in FIG. 27, and spectrum transform means, corresponding to the spectrum transform means 1865, for processing an output corresponding to the signal 865, i.e., the highest band of 18 kHz to 24 kHz, shown in FIG. 27. An L output and an R output of the above spectrum transform means are output as the signals 789 and 790, respectively. The inverse spectrum transform means 1784, 1785, and 1786 are replaced by the inverse spectrum transform means 1862, 1863, and 1863, respectively, illustrated in FIG. 27. The spectrum transform means (spectrum transform means 1) 1788, 1789, and 1790 are substituted with the spectrum transform means 1867, 1868, and 1868, respectively, shown in FIG. 27.

Alternatively, if the multi-channel spectral-signal transform means illustrated in FIG. 30 is adapted to the spectral-signal transform means shown in FIG. 28, the inverse spectrum transform means 1783, 1784, 1785, and 1786 are replaced by the inverse spectrum transform means 1881, 1882, 1883, and 1883, respectively, shown in FIG. 28. Instead of the spectrum transform means (spectrum transform means 3) 1787 and the spectrum transform means (spectrum transform means 1) 1788, 1789, and 1790, the spectrum transform means 1884, 1885, 1886, and 1886, respectively, illustrated in FIG. 28 may be used.

Figure 31:
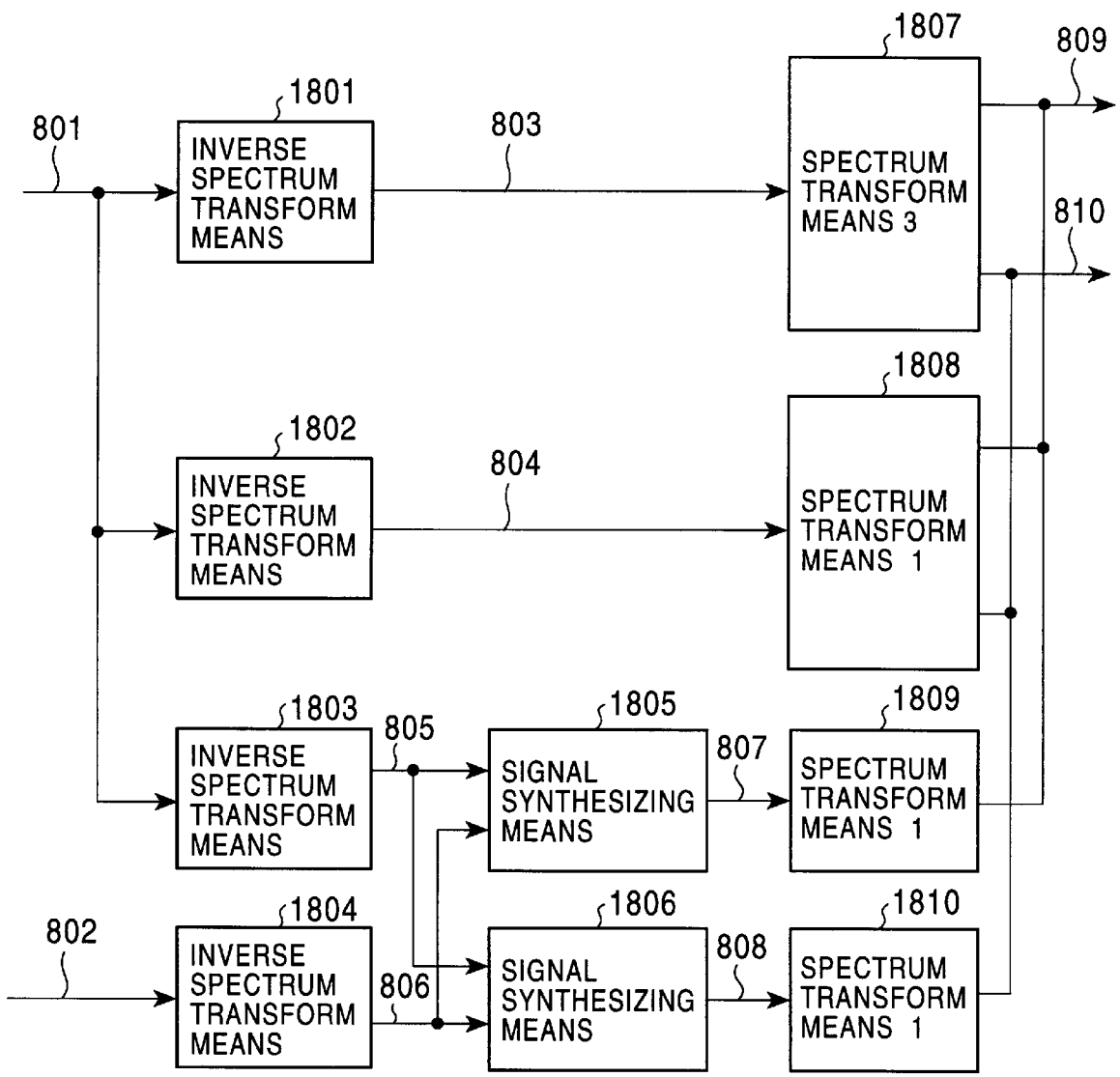
FIG. 31 is a block diagram illustrating the configuration of another spectral-signal transform means for use in the compressed-data recording and/or reproducing apparatus shown in FIG. 1.

FIG. 31 illustrates an example of the configuration of spectral-signal transform means for transforming spectral signals 801 and 802 corresponding to (L+R)/2 and (L−R)/2 into other spectral signals 809 and 810 corresponding to L and R, respectively.

The spectral-signal transform means shown in FIG. 31 is formed of inverse spectrum transform means 1801, 1802, 1803, and 1804, signal synthesizing means 1805 and 1806, spectrum transform means (spectrum transform means 3) 1807, and spectrum transform means (spectrum transform means 1) 1808, 1809, and 1810.

In this spectral-signal transform means, an input signal 801 is inverse-spectrum-transformed in the respective bands in the inverse spectrum transform means 1801, 1802, and 1803, and a signal 802 is inverse-spectrum-transformed in the inverse spectrum transform means 1804. A signal component 805 obtained by being inverse-spectrum-transformed in the inverse spectrum transform means 1803 is input into the signal synthesizing means 1805 and 1806. A signal component 806 obtained by being inverse-spectrum-transformed in the inverse spectrum transform means 1804 is input into the signal synthesizing means 1805 and 1806.

The signal synthesizing means 1805 synthesizes the signal components 805 and 806, while the signal synthesizing means 1806 synthesizes the signal components 805 and 806. Signal components 807 and 808 output from the signal synthesizing means 1805 and 1806, respectively, are spectrum-transformed in the spectrum transform means 1809 and 1810, respectively.

The spectrum transform means 1807 performs spectrum transform by using a function similar to that of the spectrum transform means 1787 shown in FIG. 30.

Signal components 803 and 804 obtained by being inverse-spectrum-transformed in the inverse spectrum transform means 1801 and 1802, respectively, are directly spectrum-transformed in the spectrum transform means 1807 and 1808, respectively.

In this manner, the spectral-signal transform means suitably performs inverse spectrum transform and spectrum transform on the signal 801, i.e., the signal (L+R)/2, and the signal 802, i.e., (L−R)/2, and outputs them as the signals 809 and 810, respectively.

With this configuration, by assuming that the original time-series signal has been sampled at 48 kHz, the spectral-signal transform means executes the following processing. The signal components of 12 kHz to 18 kHz are processed by the inverse spectrum transform means 1801; the signal components of 6 kHz to 12 kHz are processed by the inverse spectrum transform means 1802; and the signal components of 0 kHz to 6 kHz are processed by the inverse spectrum transform means 1803 and 1804.

The signal synthesizing means 1805 synthesizes lower-band time-series signals of (L+R)/2 and (L−R)/2 to generate the L-channel lower-band time-series signal, while the signal synthesizing means 1806 synthesizes lower-band time-series signals of (L+R)/2 and (L−R)/2 to generate the R-channel lower-band time-series signal. In this configuration, L and R spectral signals are separately produced from the signal components only of 0 kHz to 6 kHz, while the L and R-shared spectral signal is generated from the higher-band signal components. That is, the spectrum transform means (spectrum transform means 3) 1807 and the spectrum transform means (spectrum transform means 1) 1808 output the same signal for L and R, respectively.

The aforementioned processing is performed based on the fact that stereo sound is dominated by the lower band, as discussed above. That is, even if the above-described processing is simplified, as described above, relatively good stereo sound can be obtained.

If L and R spectral signals are separately coded, more faithful stereo sound can be presented. As an example of the modifications, for example, the energy ratio between the L-channel signal and the R-channel signal may be obtained from the (L+R)/2 signal and the (L−R)/2 signal, and based on the energy ratio, weights may be assigned to the L-channel higher-band spectral signal and the R-channel higher-band spectral signal.

In the foregoing description with reference to FIG. 31, a technique of processing multi-channel signals based on the transform method employed by disregarding the highest band, shown in FIG. 25, has been discussed. However, the multi-channel spectral-signal transform means shown in FIG. 31 may be employed based on one of the transform methods shown in FIGS. 21, 27, and 28.

More specifically, if the multi-channel spectral-signal transform means illustrated in FIG. 31 is adapted to the spectral-signal transform means shown in FIG. 21, the inverse spectrum transform means 1801 may be substituted with the inverse spectrum transform means 1721 and 1722, and higher-band transform means formed of the band synthesizing filter 1725, illustrated in FIG. 21. In this case, instead of the spectrum transform means (spectrum transform means 3) 1807, spectrum transform means that executes processing similar to the spectrum transform means (spectrum transform means 2) 1726 is employed.

If the multi-channel spectral-signal transform means illustrated in FIG. 31 is adapted to the spectral-signal transform means shown in FIG. 27, the following modification may be made. The inverse spectrum transform means 1801 may be substituted with the inverse spectrum transform means (inverse spectrum transform means 2) 1861 and higher-band transform means formed of the band division filter 1864, shown in FIG. 27. In this case, the spectrum transform means (spectrum transform means 3) 1807 is replaced by spectrum transform means, corresponding to the spectrum transform means 1866, for processing an output corresponding to the signal 866, i.e., the band of 12 kHz to 18 kHz, shown in FIG. 27, and spectrum transform means, corresponding to the spectrum transform means 1865, for processing an output corresponding to the signal 865, i.e., the highest band of 18 kHz to 24 kHz, shown in FIG. 27. An L output and an R output of the above spectrum transform means are output as the signals 809 and 810, respectively. The inverse spectrum transform means 1802, 1803, and 1804 are replaced by the inverse spectrum transform means 1862, 1863, and 1863, respectively, illustrated in FIG. 27. The spectrum transform means (spectrum transform means 1) 1808, 1809, and 1810 are substituted with the spectrum transform means 1867, 1868, and 1868, respectively, shown in FIG. 27.

Alternatively, if the multi-channel spectral-signal transform means illustrated in FIG. 31 is adapted to the spectral-signal transform means shown in FIG. 28, the inverse spectrum transform means 1801, 1802, 1803, and 1804 are replaced by the inverse spectrum transform means 1881, 1882, 1883, and 1883, respectively, shown in FIG. 28. Instead of the spectrum transform means (spectrum transform means 3) 1807 and the spectrum transform means (spectrum transform means 1) 1808, 1809, and 1810, the spectrum transform means 1884, 1885, 1886, and 1886, respectively, illustrated in FIG. 28 may be used.

Figure 32:
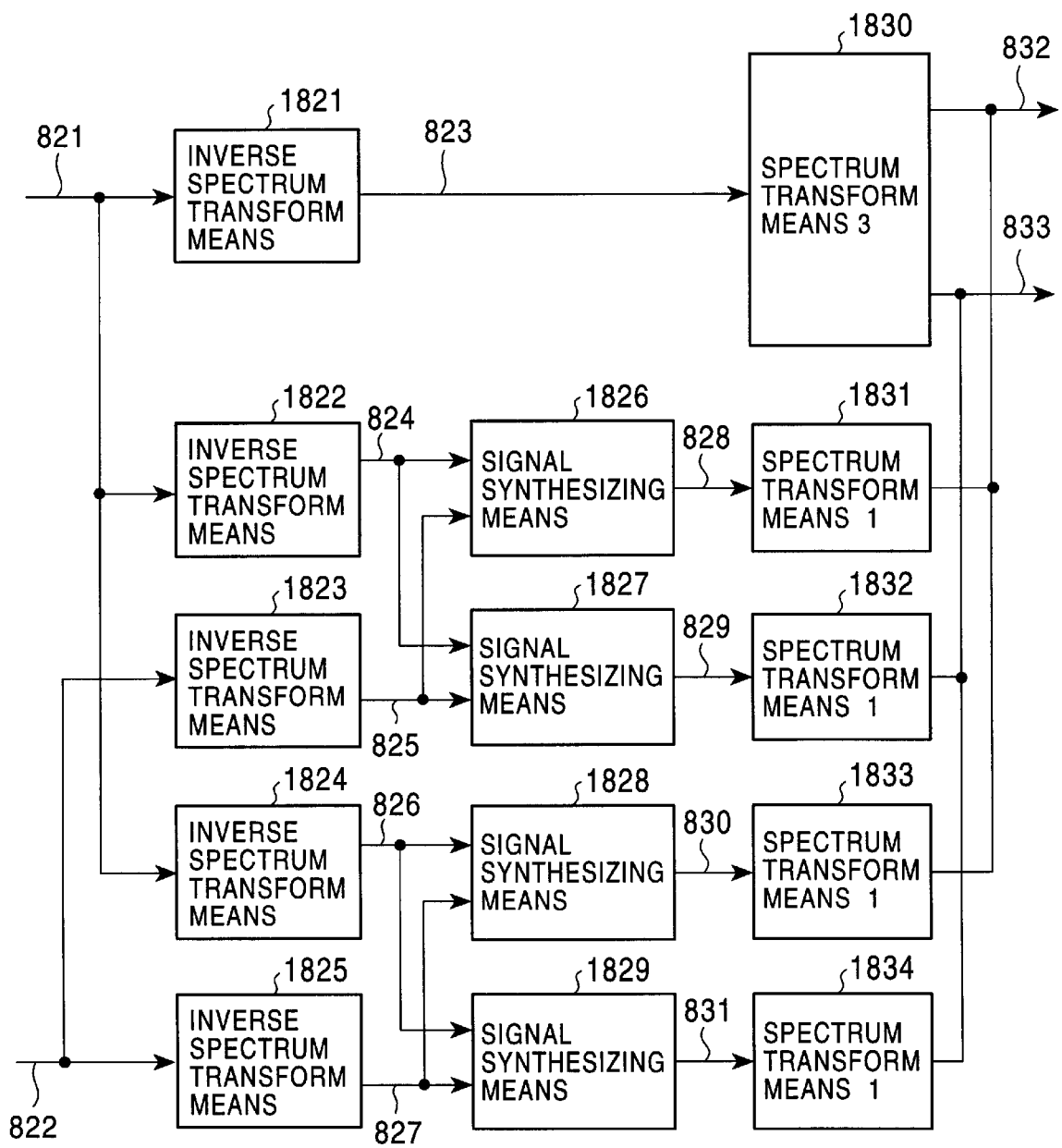
FIG. 32 is a block diagram illustrating the configuration of another spectral-signal transform means for use in the compressed-data recording and/or reproducing apparatus shown in FIG. 1.

FIG. 32 illustrates an example of the configuration of spectral-signal transform means for transforming spectral signals 821 and 822 corresponding to (L+R)/2 and (L−R)/2, respectively, into other types of spectral signals 832 and 833 corresponding to L and R, respectively.

The spectral-signal transform means illustrated in FIG. 32 is formed of inverse spectrum transform means 1821, 1822, 1823, 1824, and 1825, signal synthesizing means 1826, 1827, 1828, and 1829, spectrum transform means (spectrum transform means 3) 1830, spectrum transform means (spectrum transform means 1) 1831, 1832, 1833, and 1834.

In this spectral-signal transform means, the input signal 821 is inverse-spectrum-transformed in the respective bands in the inverse spectrum transform means 1821, 1822, and 1824, while the signal 822 is inverse-spectrum-transformed in the inverse spectrum transform means 1823 and 1825.

A signal component 824 obtained by being inverse-spectrum-transformed in the inverse spectrum transform means 1822 is input into the signal synthesizing means 1826 and 1827, while a signal component 826 obtained by being inverse-spectrum-transformed in the inverse spectrum transform means 1824 is input into the signal synthesizing means 1828 and 1829.

A signal component 825 acquired by being inverse-spectrum-transformed in the inverse spectrum transform means 1823 is input into the signal synthesizing means 1826 and 1827, while a signal component 827 acquired by being inverse-spectrum-transformed in the inverse spectrum transform means 1825 is input into the signal synthesizing means 1828 and 1829.

The signal synthesizing means 1826 synthesizes signal components 824 and 825 to generate a signal component 828, while the signal synthesizing means 1827 synthesizes signal components 824 and 825 to generate a signal component 829. The signal synthesizing means 1828 synthesizes the signal components 826 and 827 to produce a signal component 830, while the signal synthesizing means 1829 synthesizes the signal components 826 and 827 to produce a signal component 831.

Then, the signal components 828, 829, 830, and 831 obtained by being synthesized in the signal synthesizing means 1826, 1827, 1828, and 1829, respectively, are spectrum-transformed in the spectrum transform means 1831, 1832, 1833, and 1834, respectively. A signal 823 obtained by being inverse-spectrum-transformed by the inverse spectrum transform means 1821 is directly spectrum-transformed in the spectrum transform means 1830.

As discussed above, the spectral-signal transform means appropriately performs spectrum transform and inverse spectrum transform on the input signals 821 and 822 and outputs them as the signals 832 and 833, respectively.

The inverse spectrum transform means 1821 shown in FIG. 32 processes signal components of 12 kHz to 18 kHz; the inverse spectrum transform means 1822 and 1823 process signal components of 6 kHz to 12 kHz; and the inverse spectrum transform means 1824 and 1825 process signal components of 0 kHz to 6 kHz. In this spectral-signal transform means, L and R spectral signals are separately generated for the band from 0 kHz to 12 kHz. Thus, on one hand, the amount of processing is greater than that required for the spectral-signal transform means shown in FIG. 31, but on the other hand, more faithful stereo sound can be reproduced.

In the foregoing description with reference to FIG. 32, a technique of processing multi-channel signals based on the transform method employed by disregarding the highest band, shown in FIG. 25, has been discussed. However, the multi-channel spectral-signal transform means shown in FIG. 32 may be employed based on one of the transform methods shown in FIGS. 21, 27, and 28.

More specifically, if the multi-channel spectral-signal transform means illustrated in FIG. 32 is adapted to the spectral-signal transform means shown in FIG. 21, the inverse spectrum transform means 1821 may be substituted with the inverse spectrum transform means 1721 and 1722, and higher-band transform means formed of the band synthesizing filter 1725, illustrated in FIG. 21. In this case, instead of the spectrum transform means (spectrum transform means 3) 1830, spectrum transform means that executes processing similar to the spectrum transform means (spectrum transform means 2) 1726 is employed.

If the multi-channel spectral-signal transform means illustrated in FIG. 32 is adapted to the spectral-signal transform means shown in FIG. 27, the following modification may be made. The inverse spectrum transform means 1821 may be substituted with the inverse spectrum transform means (inverse spectrum transform means 2) 1861 and higher-band transform means formed of the band division filter 1864, shown in FIG. 27. In this case, the spectrum transform means (spectrum transform means 3) 1830 is replaced by spectrum transform means, corresponding to the spectrum transform means 1866, for processing an output corresponding to the signal 866, i.e., the band of 12 kHz to 18 kHz, shown in FIG. 27, and spectrum transform means, corresponding to the spectrum transform means 1865, for processing an output corresponding to the signal 865, i.e., the highest band of 18 kHz to 24 kHz, shown in FIG. 27. An L output and an R output of the above spectrum transform means are output as the signals 832 and 833, respectively. The inverse spectrum transform means 1822, 1823, 1824, and 1825 are replaced by the inverse spectrum transform means 1862, 1862, 1863, and 1863, respectively, illustrated in FIG. 27. The spectrum transform means (spectrum transform means 1) 1831, 1832, 1833, and 1834 are substituted with the spectrum transform means 1867, 1867, 1868, and 1868, respectively, shown in FIG. 27.

Alternatively, if the multi-channel spectral-signal transform means illustrated in FIG. 32 is adapted to the spectral-signal transform means shown in FIG. 28, the inverse spectrum transform means 1821, 1822, 1823, 1824, and 1825 are replaced by the inverse spectrum transform means 1881, 1882, 1882, 1883, and 1883, respectively, shown in FIG. 28. Instead of the spectrum transform means (spectrum transform means 3) 1830 and the spectrum transform means (spectrum transform means 1) 1831, 1832, 1833, and 1834, the spectrum transform means 1884, 1885, 1885, 1886, and 1886, respectively, illustrated in FIG. 28 may be used.

The aforementioned method for transforming higher-band signal components simultaneously in a plurality of channels is not restricted to transform between code strings obtained by being spectrum-transformed after conducting band division. The above method may be used for the following situation. At least one of the code strings has been obtained by coding a time-series signal decimated in each band after conducting band division.

Figure 33:
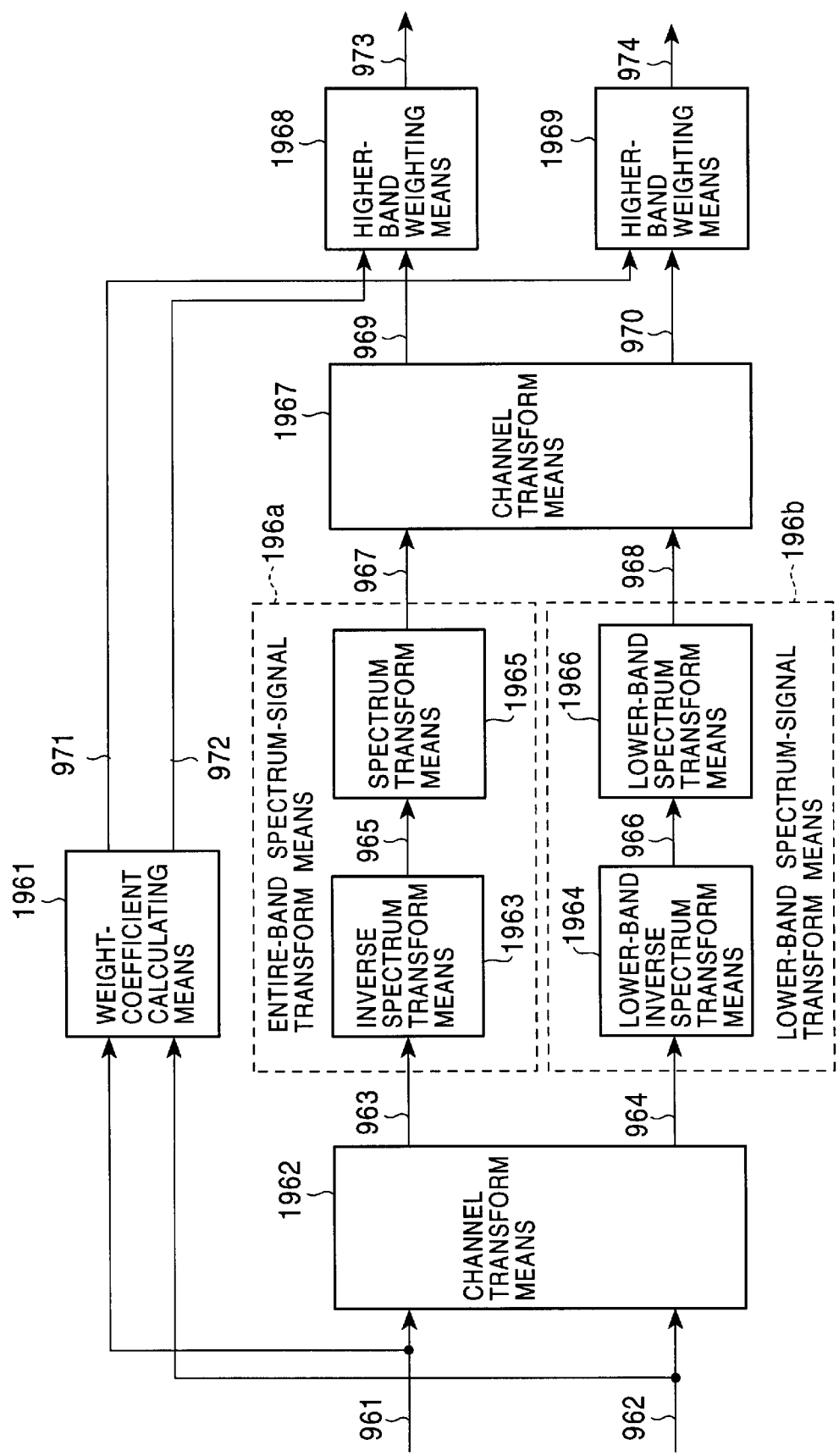
FIG. 33 is a block diagram illustrating the configuration of another spectral-signal transform means for use in the compressed-data recording and/or reproducing apparatus shown in FIG. 1.

Higher-band signals may be processed simultaneously in a plurality of channels without using a band division filter. FIG. 33 illustrates an example of the configuration of such a spectral-signal transform means.

The spectral-signal transform means shown in FIG. 33 is formed of channel transform means 1962, inverse spectrum transform means 1963, spectrum transform means 1965, lower-band inverse spectrum transform means 1964, lower-band spectrum transform means 1966, channel transform means 1967, weight-coefficient calculating means 1961, and higher-band weighting means 1968 and 1969.

The code transform means having the aforementioned spectral-signal transform means is formed by incorporating the code transform apparatus of the present invention. More specifically, the spectral-signal transform means includes: input means for inputting a first code string obtained by coding time-series information signals corresponding to a plurality of channels; and code-string transform means for transforming the first code string into a second code string which produces the same higher band for the respective channels of the time-series information signals when being decoded and in which weights have been assigned to the respective channels of the signals.

In FIG. 33, in the spectral-signal transform means, the input means is formed of the channel transform means 1962 and 1967, the inverse spectrum transform means 1963, the spectrum transform means 1965, the lower-band inverse spectrum transform means 1964, the lower-band spectrum transform means 1966, and the code-string transform means for assigning weights is formed of the higher-band weighting means 1968 and 1969.

In the spectral-signal transform means, input signals 961 and 962 are channel-transformed in the channel transform means 1962 and are output as signals 963 and 964, respectively. Subsequently, the signal 963 is inverse-spectrum-transformed in the inverse spectrum transform means 1963 and is output as a signal 965. The signal 965 is then spectrum-transformed in the spectrum transform means 1965. Meanwhile, the signal 964 output from the channel transform means 1962 is inverse-spectrum-transformed in the lower-band inverse spectrum transform means 1964 and is output as a signal 966. The signal 966 is then spectrum-transformed in the lower-band spectrum transform means 1966.

The channel transform means 1967 channel-transforms signals 967 and 968 which are output from the spectrum transform means 1965 and the lower-band spectrum transform means 1966, respectively. Channel-transformed signals 969 and 970 are then input into the higher-band weighting means 1968 and 1969, respectively. The weight coefficients of the above-described input signals 961 and 962 are calculated by the weight-coefficient calculating means 1961.

The higher-band weighting means 1968 and 1969 respectively determine weight coefficients from signals 971 and 972 indicating weight coefficients output from the weight-coefficient calculating means 1961, and respectively assign weights to the signals 969 and 970 output from the channel transform means 1967, thereby outputting them as signals 973 and 974, respectively.

More specifically, the input signals 961 and 962 input into the channel transform means 1962 are an L-channel spectral signal and an R-channel spectral signal, respectively. The channel transform means 1962 generates an (L+R)/2 spectral signal 963 and an (L−R)/2 spectral signal 964 from the L-channel spectral signal and the R-channel spectral signal.

The (L+R)/2 spectral signal is entirely processed by the inverse spectrum transform means 1963 and the spectrum transform means 1965, and the entire-band spectral signal 967 is supplied into the channel transform means 1967. In contrast, only the lower band of the (L−R)/2 spectral signal is processed by the lower-band inverse spectrum transform means 1964 and the lower-band spectrum transform means 1966, and the lower-band spectral signal 968 is supplied into the channel transform means 1967.

The channel transform means 1967 generates the L-channel spectral signal 969 and the R-channel spectral signal 970 from the signals 967 and 968, respectively, and supplies them to the higher-band weighting means 1968 and 1969, respectively.

Meanwhile, the weight-coefficient calculating means 1961 respectively calculates the L-channel higher-band weight coefficient 971 and the R-channel higher-band weight coefficient 972 from the original L-channel spectral signal 961 and the original R-channel spectral signal 962 based on the energy ratio of the L channel and the R channel, respectively. Then, the L-channel higher-band weight coefficient 971 and the R-channel higher-band weight coefficient 972 are supplied to the higher-band weighting means 1968 and the higher-band weighting means 1969, respectively.

The higher-band weighting means 1968 and 1969 respectively assign weights to the L-channel spectral signal and the R-channel spectral signal based on the above-described weight coefficients, and outputs them as the L-channel spectral signal 973 and the R-channel spectral signal 974, respectively. By performing weighting processing, as described above, code strings can be transformed much faster while maintaining good stereo sound.

In the spectral-signal transform means shown in FIG. 33, the inverse spectrum transform means 1963 and the spectrum transform means 1965 form what is called the "entire-band spectral-signal transform means" 196$a$, while the lower-band inverse spectrum transform means 1964 and the lower-band spectrum transform means 1966 form what is called the "lower-band spectral-signal transform means 196$b$".

The entire-band spectral-signal transform means 196*a* may be configured similarly to, for example, the spectral-signal transform means illustrated in FIG. 21. The lower-band spectral-signal transform means 196*b* may be formed of the inverse spectrum transform means 1723 and 1724, and the spectrum transform means 1727 and 1728, which form the lower-band spectral-signal transform portion of the spectral-signal transform means shown in FIG. 21. Alternatively, the entire-band spectral-signal transform means 196*a* may be configured similarly to the entirety of the spectral-signal transform means shown in FIG. 25, while the lower-band spectral-signal transform means 196*b* may be configured similarly to the lower band portion of the spectral-signal transform means shown in FIG. 25. The entire-band spectral-signal transform means 196*a* and the lower-band spectral-signal transform means 196*b* may be configured in forms other than the above-described configurations. For example, the entire-band spectral-signal transform means 196*a* may transform entire-band spectral signals without conducting band synthesizing and band division. The lower-band spectral-signal transform means 196*b* may be configured similarly to the spectral-signal transform means illustrated in FIG. 26.

The L-channel spectral signal and the R-channel spectral signal are transformed into other types of L-channel spectral signal and R-channel spectral signal by utilizing the aforementioned method. With this method, as far as the (L−R)/2 signal is concerned, only the lower band must be processed. Accordingly, the amount of processing can be reduced compared to that when an L-channel spectral signal and an R-channel spectral signal are separately processed.

In this example, even if the same signals for the L channel and the R channel are output by omitting the higher-band weighting means, relatively good stereo sound can be maintained.

Figure 34:
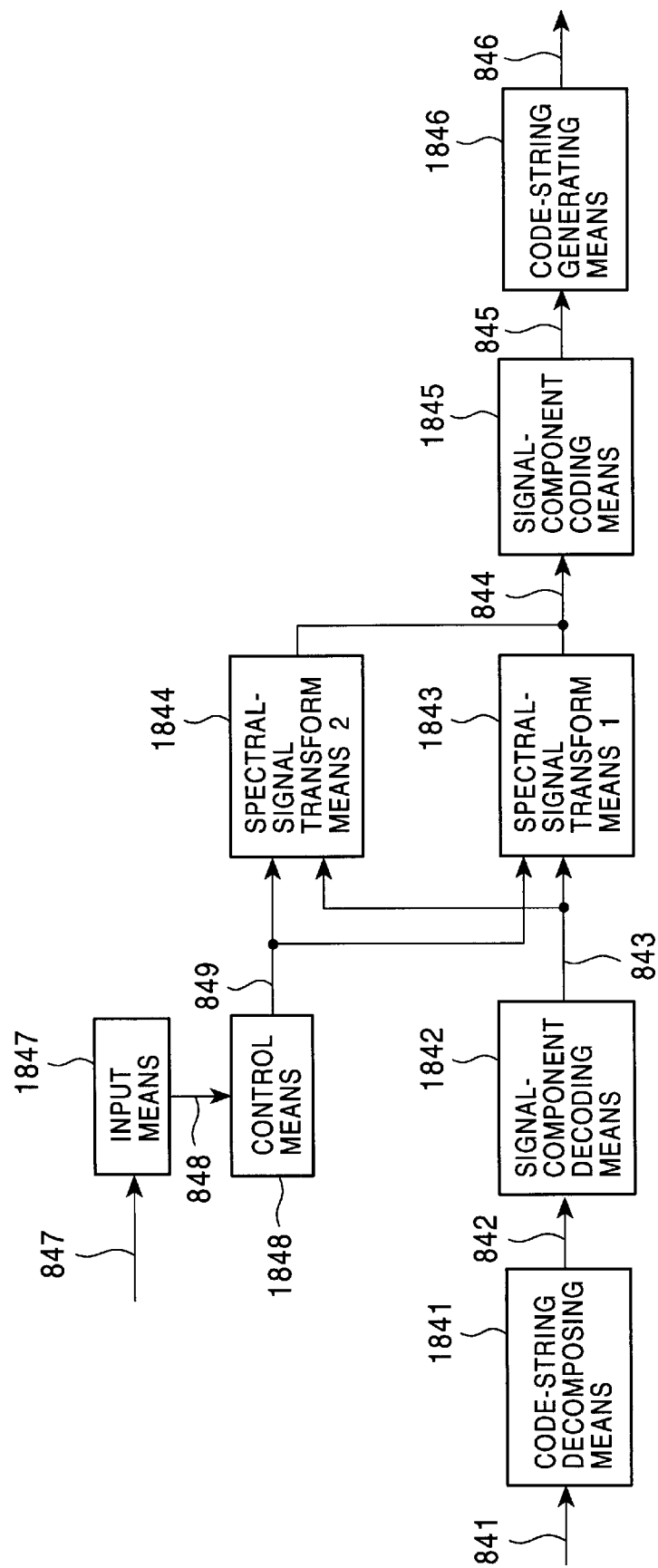
FIG. 34 is a block diagram illustrating the configuration of another coding transform means for use in the compressed-data recording and/or reproducing apparatus shown in FIG. 1.

FIG. 34 illustrates an example of the configuration of code transform means in which the user is able to determine whether priority is to be given to the intercode processing rate or high quality of the resulting sound after transforming. In this example, the level of sound quality is determined by whether more faithful stereo sound can be reproduced.

The code transform means illustrated in FIG. 34 is formed of code-string decomposing means 1841, signal-component decoding means 1842, spectral-signal transform means (spectral-signal transform means 1) 1843, signal-component coding means 1845, code-string generating means 1846, input means 1847, control means 1848, and spectral-signal transform means (spectral-signal transform means 2) 1844.

The code transform means is constructed by incorporating the code transform control apparatus of the present invention. The code transform means is formed of the spectral-signal transform means (spectral-signal transform means 1) 1843 and the spectral-signal transform means (spectral-signal transform means 2) 1844, which serve as a plurality of code transform processing means for transforming a first code string into a second code string, and the control means 1848, which serves as code transform selection means for selecting between the spectral-signal transform means (spectral-signal transform means 1) 1843 and the spectral-signal transform means (spectral-signal transform means 2) 1844 based on selecting information (signal 848), which indicates input transform-processing-rate control information.

In this code transform means, the code string of an input signal 841 is decomposed in the code-string decomposing means 1841, and a decomposed signal 842 is decoded in the signal-component decoding means 1842. A decoded signal 843 is then transformed into a spectral signal in the spectral-signal transform means (spectral-signal transform means 2) 1844 or the spectral-signal transform means (spectral-signal transform means 1) 1843 in accordance with the corresponding processing rate, and is input into the signal-component coding means 1845 as a signal 844. The signal 844 is then coded in the signal-component coding means 1845, and is input into the code-string generating means 1846 as a signal 845.

The above-described spectral-signal transform means 1844 and 1843 are switched by the control means 1848. More specifically, an instruction 847 is input into the input means and is output as a signal 848. Upon receiving the signal 848, the control means 1848 generates a signal 849 and switches between the spectral-signal transform means 1844 and the spectral-signal transform means 1843 based on the signal 849.

More specifically, the spectral-signal transform means (spectral-signal transform means 1) 1843 shown in FIG. 34 is configured similarly to the spectrum transform means shown in FIG. 31, while the spectral-signal transform means (spectral-signal transform means 2) 1844 is configured similarly to the spectrum transform means shown in FIG. 32.

The control means 1848 controls either the spectral-signal transform means 1843 or the spectral-signal transform means 1844 to perform spectrum transform in accordance with the selecting information 848 supplied via the input means 1847.

Figure 35:
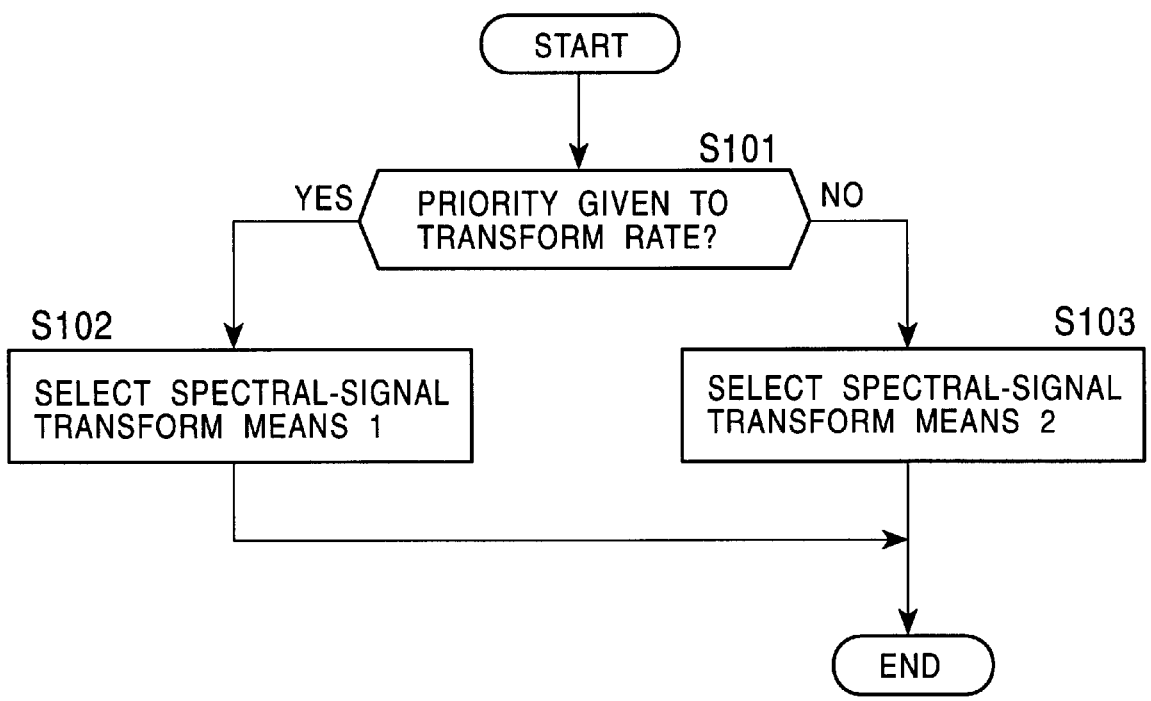
FIG. 35 is a flow chart illustrating a control method employed by the code transform means for use in the compressed-data recording and/or reproducing apparatus shown in FIG. 1.

FIG. 35 is a flow chart illustrating the selection processing executed by the control means 1848 shown in FIG. 34. The selection processing is executed based on the signal 848, which is used as selecting information shown in FIG. 34, as discussed above.

In step S101, the code transform means first determines, based on the above selecting information, whether priority is to be given to the transform rate. If the outcome of step S101 is yes, the process proceeds to step S102 in which the code transform means performs spectrum transform by using the spectral-signal transform means 1843. If it is found in step S101 that priority is not to be given to the transform rate, the process proceeds to step S103 in which the code transform means performs spectrum transform by using the spectral-signal transform means 1844.

According to the aforementioned processing, it is possible to select, by a determination of the user, whether priority is to be given to the intercode transform processing rate or high quality of the resulting sound after transforming. Additionally, the type of band division filter or band synthesizing filter used for performing code transform may be selectively switched. For example, instead of using a PQF band synthesizing filter, a QMF band synthesizing filter may be employed to perform processing within a restricted band.

Alternatively, if the QMF band synthesizing filter is used, the number of taps may be selectively changed. The transformed code strings may not be independently reproduced by the respective channels, but the reproducible highest band may be selectively changed. Additionally, from among different combinations of the transform processing load and the transform processing rate provided for the transform processing discussed with reference to FIGS. 1 through 33, a desired combination may be selected and used in the selecting processing described with reference to FIGS. 34 and 35.

It is obvious from the foregoing description that in any of the above modifications, the user is able to determine whether, and at which level, priority is to be given to the intercode transform processing rate or high quality of the resulting sound after transforming.

A description has been given of transforming a code transmitted via a communication channel into a code to be recorded on a recording medium. The present invention may be applied to the case in which a code recorded on a single recording medium is to be transformed into a code to be recorded on another recording medium by using another format.

In this embodiment, an audio signal has been transformed. However, the present invention may be applied to intercode transform for codes obtained by coding spectral signals which have been transformed from an image signal by using a band division filter and by performing spectrum transform.

The aforementioned various types of processing executed by the compressed-data recording and/or reproducing apparatus may be executed by a program recorded on a recording medium. That is, for example, an information processing apparatus for processing data may execute the aforementioned processing according to a program recorded on a recording medium.

As is seen from the foregoing description, the present invention offers the following advantages.

According to the compressed-data recording and/or reproducing apparatus of the foregoing embodiment, a first code string obtained by coding a spectral signal which has been transformed with a first block length after a time-series information signal had been divided into a first band group is input. The input first code string is decoded into a spectral signal. The decoded spectral signal is transformed into a spectral signal which is transformed with a second block length after being divided into a second band group. The transformed spectral signal is coded into a second code string. According, the fast code-string transform operation can be performed. As a consequence, a code string transmitted via a communication channel over a short period can be transformed into another code string at a high rate.

According to the compressed-data recording and/or reproducing apparatus, a first code string obtained by coding time-series information signals corresponding to a plurality of channels is input. The input first code string is transformed into a second code string which produces the same higher band for the respective channels of the time-series information signals when being decoded. This makes it possible to simultaneously process higher-band components in transforming a code string obtained by coding spectral signals having a plurality of channels which have been transformed after undergoing the band dividing operation.

With this arrangement, a code string formed of time-series information signals having a plurality of channels can be transformed at a high rate. For example, a code string transmitted via a communication channel over a short period can be transformed into another code string at a high rate.

According to the compressed-data recording and/or reproducing apparatus, a first code string obtained by coding time-series information signals corresponding to a plurality of channels is input. The input first code string is transformed into a second code string which produces the same higher band for the respective channels of the time-series information signals when being decoded and in which weights have been assigned to the respective channels of the signals. This makes it possible to simultaneously process higher-band components in transforming a code string obtained by coding spectral signals having a plurality of channels which have been transformed after undergoing the band dividing operation.

With this arrangement, a code string formed of time-series information signals having a plurality of channels can be transformed at a high rate. For example, a code string transmitted via a communication channel over a short period can be transformed into another code string at a high rate.

According to the compressed-data recording and/or reproducing apparatus of the present invention, a plurality of code transform operations for transforming a first code string into a second code string are selectable. The code transform operations are selected based on input transform-operation-rate control information. With this arrangement, based on the code-transform-operation-rate information demanded by the user, the transform rate satisfying the user's demand can be ensured. In this case, if the first code string is, for example, audio information, sound quality can also be guaranteed.

According to the compressed-data recording and/or reproducing apparatus, a first code string obtained by coding a spectral signal which has been transformed with a first block length after a time-series information signal had been divided is input into a first band group. The first code string is transformed into a second code string which has been transformed with a second block length after being divided into a second band group. The second code string is then recorded on a recording medium. Accordingly, a transmitted code string obtained by coding a signal which has been spectrum transformed with a comparatively long block length after undergoing band division can be transformed into a code string comparable to a code string obtained by coding a signal which has been spectrum-transformed with a relatively short block length after undergoing band division. Then, the transformed code string can be recorded on a recording medium.

With this arrangement, fast code-string transform can be performed. This makes it possible to transform, for example, a code string transmitted via a communication channel over a short period into another code string at a high rate and to record the transformed code string on a recording medium.

According to the compressed-data recording and/or reproducing apparatus of the present invention, a first code string obtained by coding a spectral signal which has been transformed after a time-series information signal had been divided into a first band group is input. The input first code string is decoded into the spectral signal. Part of the spectral signal of a higher band is inverse-transformed into a decimated time-series signal, and the decimated time-series signal is then transformed into a lower-band spectral signal within the higher band so that the decoded spectral signal is transformed into a spectral signal which is transformed after being divided into a second band group. The transformed spectral signal is coded into a second code string. With this arrangement, fast code-string transform can be performed. As a result, for example, a code string transmitted via a communication channel over a short period can be transformed into another code string at a high rate.

According to the compressed-data recording and/or reproducing apparatus of the present invention, a first code string obtained by coding a spectral signal which has been transformed with a first block length after a time-series information signal had been divided into a first band group is input. Alternatively, a first code string obtained by coding a spectral signal which has been directly transformed with the first block length is input. The input first code string is decoded into the spectral signal. Only the lower-band spectral signal of the first code string is inverse-transformed into a decimated time-series signal, and the decimated time-series signal is transformed into a lower-band spectral signal so that the decoded spectral signal is directly transformed into a spectral signal which is transformed with a second block length or is transformed into a spectral signal which is transformed with a second block length after being divided into a second band group. The transformed spectral signal is then coded. With this arrangement, fast code-string transform can be performed. This makes it possible to transform, for example, a code string transmitted via a communication channel over a short period into another code string at a high rate.

What is claimed is:

1. A method for transforming an information signal that has been processed by bit compression into a first code string to facilitate efficient transfer of the information signal to or from a recording medium, the information signal having been divided into a first band group based on a first block length before being transformed into a spectral signal that is then encoded into the first code string, the method comprising:

decoding the first code string into the spectral signal;

dividing the decoded spectral signal into a second band group;

transforming the decoded spectral signal into another spectral signal using a second block length; and coding the transformed spectral signal into a second code string.

2. The method according to claim 1, wherein the first block length is longer than the second block length.

3. The method according to claim 1, wherein the first code string has a higher compression ratio than the second code string.

4. The method according to claim 1, wherein the information signal comprises an audio signal.

5. The method according to claim 1, wherein the step of transforming the decoded spectral signal comprises the step of synthesizing a portion of the spectral signal contained within two or more bands of the first band group of the first code string into one band of the second band group of the second code string.

6. The method according to claim 5, wherein the step of synthesizing includes using a first spectral-signal transform band-synthesizing filter that is different from a second spectral-signal transform band-synthesizing filter used for decoding the first code string.

7. The method according to claim 5, wherein the first spectral-signal transform band-synthesizing filter has a shorter tap length than the second spectral-signal transform band synthesizing filter used for decoding the first code string.

8. The method according to claim 5, wherein the two or more bands of the first band group are in a band range that is higher than at least one other band of the first band group.

9. The method according to claim 1, further comprising the steps of:

retrieving the first code string from a storage medium; and transmitting the second code string via a communication channel to the recording medium.

10. The method according to claim 9, wherein the communication channel has a transmission capacity and the storage medium has a recording capacity that is substantially different than the transmission capacity of the communication channel.

11. An apparatus for use in a compressed-data recording and/or reproducing system to transform a time-series information signal that has been processed by bit compression into a first code string, the apparatus comprising:

means for receiving the first code string produced by coding a spectral signal that has been transformed from the information signal after the information signal has been divided into a first band group;

decoding means for decoding the first code string into the spectral signal;

spectral-signal transform means for dividing the decoded spectral signal into a second band group and for transforming the decoded spectral signal into another spectral signal using a second block length; and coding means for coding the transformed spectral signal into a second code string.

12. The apparatus according to claim 11, wherein the first block length is longer than the second block length.

13. The apparatus according to claim 11, wherein the first code string has a higher compression ratio than the second code string.

14. The apparatus according to claim 11, wherein the information signal comprises an audio signal.

15. The apparatus according to claim 11, wherein said spectral-signal transform means synthesizes a portion of the spectral signal contained within two or more bands of the first band group of the first code string into one band of the second band group of the second code string.

16. The apparatus according to claim 15, wherein the spectral-signal transform means uses a first spectral-signal transform band-synthesizing filter that is different from a second spectral-signal transform band-synthesizing filter used for decoding the first code string.

17. The apparatus according to claim 15, wherein the first spectral-signal transform band-synthesizing filter has a shorter tap length than the second spectral-signal transform band synthesizing filter used for decoding the first code string.

18. The apparatus according to claim 15, wherein the two or more bands of the first band group are in a band range that is higher than at least one other band of the first band group.

19. The apparatus according to claim 11, wherein the compressed-data recording and/or reproducing system has a storage medium, and the means for receiving the first code string is adapted to retrieve the first code string from the storage medium.

20. The apparatus according to claim 19, further comprises a means for transmitting the second code string to a recording medium via a communication channel connected to the compressed-data recording and/or receiving apparatus.

21. The apparatus according to claim 20, wherein the communication channel has a transmission capacity and the storage medium has a recording capacity that is substantially different than the transmission capacity of the communication channel.

22. A computer-readable medium containing program instructions for controlling a compressed-data recording and/or reproducing apparatus to perform a method, the compressed-data recording and/or reproducing apparatus having a first code string produced by bit compressing an information signal, wherein the information signal is processed as a first block with a first block length, the information signal is divided into a first band group based on the first block length, the first block includes a time-series component of the information signal, and the time-series component is transformed using the first block length into a spectral signal that is then encoded into the first code string, the method comprising the steps of:

decoding the first code string into the spectral signal;

dividing the decoded spectral signal into a second band group;

transforming the decoded spectral signal into another spectral signal using a second block length; and coding the transformed spectral signal into a second code string.

23. The computer-readable medium according to claim 22, the step of transforming the decoded spectral signal comprises the step of synthesizing a portion of the spectral signal contained within two or more bands of the first band group of the first code string into one band of the second band group of the second code string.

24. The computer-readable medium according to claim 23, wherein the method further comprises the steps of:

retrieving the first code string from a storage medium; and transmitting the second code string via a communication channel to the recording medium.

25. The computer-readable medium according to claim 24, wherein the communication channel has a transmission capacity and the storage medium has a recording capacity that is substantially different than the transmission capacity of the communication channel.

26. A method for transforming a first plurality of time-series information signals that have been processed by bit compression into a first code string to facilitate efficient transfer of the information signals to or from a recording medium, the method comprising:

receiving the first code string; and transforming the first code string into a second code string which when decoded produces a second plurality of time-series information signals, where each of the second plurality of time-series information signals corresponds to a respective one of the first plurality of time-series information signals, and where the second plurality of time-series information signals each has the same higher band when decoded.

27. The method according to claim 26, wherein the first code string is produced after the first plurality of time-series information signals have undergone a band dividing operation.

28. The method according to claim 27, wherein the first code string is produced by coding each of a first plurality of spectral signals that have been spectrum-transformed from a respective one of the first plurality of time-series information signals after undergoing the band dividing operation.

29. The method according to claim 28, wherein the step of transforming the first code string into the second code string comprises the steps of:

decoding the first code string into the first plurality of spectral signals;

inverse-transforming the first plurality of spectral signals;

synthesizing in the time-domain a portion of each of the inverse-transformed spectral signals;

spectrum-transforming the synthesized portion of each of the inverse-transformed spectral signals to form a plurality of higher band spectral signals for each of the second plurality of time-series information signals;

separately spectrum-transforming a remaining portion of each of the inverse-transformed spectral signals to form a respective lower band spectral signal for each of the second plurality of time-series information signals; and coding the higher band spectral signals in combination with the respective lower band signals for each of the second plurality of time-series information signals into a second code string.

30. The method according to claim 28, wherein the step of transforming the first code string into the second code string comprises the steps of:

decoding the first code string into the first plurality of spectral signals;

synthesizing in the frequency-domain a portion of each of the first plurality of spectral signals;

inverse-transforming the synthesized portion of each of the first plurality of spectral signals to form a plurality of higher band spectral signals for each of the second plurality of time-series information signals;

separately inverse-transforming a remaining portion of each of the spectral signals to form a respective lower band spectral signal for each of the second plurality of time-series information signals; and coding the higher band spectral signals in combination with the respective lower band signals for each of the second plurality of time-series information signals into a second code string.

31. The method according to claim 26, wherein the second code string is comparable to the first code string when the first code string is produced after the first plurality of time-series information has undergone a band dividing operation.

32. The method according to claim 31, wherein the second code string is comparable to the first code string when the first code string is obtained by coding a plurality of spectral signals that have been transformed from the first plurality of time-series information signals after the first plurality of time-series information signals have undergone a band dividing operation.

33. The method according to claim 26, wherein the higher band comprises the range of 12 kHz or higher in the time-domain.

34. The method according to claim 26, wherein the the higher band comprises the range of 12 kHz to 18 kHz in the time-domain.

35. The method according to claim 26, wherein the first code string is obtained by independently coding a plurality of spectral signals that have each been transformed from a respective one of the first plurality of time-series information signals, each of the first plurality of time-series information signals corresponding to a respective one of a plurality of channels.

36. The method according to claim 26, wherein the time-series information signals comprise audio signals.

37. The method according to claim 26, wherein the step of receiving the first code comprises the step of retrieving the first code string from a storage medium.

38. The method according to claim 37, further comprising the step of transmitting the second code string via a communication channel to the recording medium.

39. The method according to claim 38, wherein the communication channel has a transmission capacity and the storage medium has a recording capacity that is substantially different than the transmission capacity of the communication channel.

40. A compressed-data recording and/or reproducing apparatus comprising:

receiving means for receiving a first code string produced by bit compressing a first plurality of time-series information signals, each time-series information signal is associated with one of a plurality of channels connected to the compress-data recording and/or reproducing system; and transform means for transforming the first code string into a second code string which when decoded produces a second plurality of time-series information signals, where each of the second plurality of time-series information signals corresponds to a respective one of the first plurality of time-series information signals, and where the second plurality of time-series information signals each has the same higher band when decoded.

41. The apparatus according to claim 40, wherein the first code string is produced after the first plurality of time-series information signals have undergone a band dividing operation into a first band group.

42. The apparatus according to claim 41, wherein the first code string is produced by coding each of a first plurality of spectral signals that have been spectrum-transformed from a respective one of the first plurality of time-series information signals after the first plurality of time-series information signals have undergone the band dividing operation.

43. The apparatus according to claim 42, wherein the transform means comprises:
  means for decoding the first code string into the first plurality of spectral signals;
  means for inverse-transforming the first plurality of spectral signals;
  means for synthesizing in the time-domain a portion of each of the inverse-transformed spectral signals;
  means for spectrum-transforming the synthesized portion of each of the inverse-transformed spectral signals to form a plurality of higher band spectral signals for each of the second plurality of time-series information signals;
  means for separately spectrum-transforming a remaining portion of each of the inverse-transformed spectral signals to form a respective lower band spectral signal for each of the second plurality of time-series information signals; and
  means for coding the higher band spectral signals in combination with the respective lower band signals for each of the second plurality of time-series information signals into a second code string.

44. The apparatus according to claim 42, wherein the transform means comprises:
  means for decoding the first code string into the first plurality of spectral signals;
  means for synthesizing in the frequency-domain a portion of each of the first plurality of spectral signals;
  means for inverse-transforming the synthesized portion of each of the first plurality of spectral signals to form a plurality of higher band spectral signals for each of the second plurality of time-series information signals;
  means for separately inverse-transforming a remaining portion of each of the spectral signals to form a respective lower band spectral signal for each of the second plurality of time-series information signals; and
  means for coding the higher band spectral signals in combination with the respective lower band signals for each of the second plurality of time-series information signals into a second code string.

45. The apparatus according to claim 40, wherein the second code string is comparable to the first code string when the first code string is produced after the first plurality of time-series information has undergone a band dividing operation.

46. The apparatus according to claim 45, wherein the second code string is comparable to the first code string when the first code string is obtained by coding a plurality of spectral signals that have been transformed from the first plurality of time-series information signals after the first plurality of time-series information signals have undergone a band dividing operation.

47. The apparatus according to claim 40, wherein the higher band comprises the range of 12 kHz or higher in the time-domain.

48. The apparatus according to claim 40, wherein the higher band comprises the range of 12 kHz to 18 kHz in the time-domain.

49. The apparatus according to claim 40, wherein the first code string is obtained by independently coding a plurality of spectral signals that have each been transformed from a respective one of the first plurality of time-series information signals, each of the first plurality of time-series information signals corresponding to a respective one of a plurality of channels.

50. The apparatus according to claim 40, wherein the time-series information signals comprise audio signals.

51. The apparatus according to claim 40, further comprising a storage medium adapted to contain the first code string when the first code string is produced.

52. The apparatus according to claim 51, wherein the receiving means for receiving the first code string is adapted to retrieve the first code string from the storage medium.

53. The apparatus according to claim 52, further comprising a means for transmitting the second code string to a recording medium via a communication channel connected to the compressed-data recording and/or receiving apparatus.

54. The apparatus according to claim 53, wherein the communication channel has a transmission capacity and the storage medium has a recording capacity that is substantially different than the transmission capacity of the communication channel.

55. A method for transforming a first and a second time-series information signals that have been processed by bit compression into a first code string to facilitate efficient transfer of the information signals to or from a recording medium, the method comprising:
  receiving the first code string; and
  transforming the input first code string into a second code string which when decoded produces a third time-series information signal corresponding to the first time-series information signal and a fourth time-series information signal corresponding to the second time-series information signal,
  where the third and the fourth time-series information signals each has the same higher band, and
  where the third time-series information signal is assigned a first weight based on the energy ratio of the first time-series information signal and the fourth time-series information signal is assigned a second weight based on the energy ratio of the second time-series information signal.

56. The method according to claim 31, wherein the first code string is produced after the first and the second time-series information signals have undergone a band dividing operation.

57. The method according to claim 56, wherein the first code string is produced by coding a first and a second spectral signals, the first and the second spectral signals having each been spectrum-transformed from the first and the second time-series information signals after the first and the second time-series information signals have undergone the band dividing operation.

58. The method according to claim 57, wherein the step of transforming the first code string into the second code string comprises the steps of:
  decoding the first code string into the first and the second spectral signals;
  inverse-transforming the first and the second spectral signals;

synthesizing in the time-domain a portion of each of the first and the second inverse-transformed spectral signals;

spectrum-transforming the synthesized portion of each of the first and the second inverse-transformed spectral signals to form a plurality of higher band spectral signals for both the third and the fourth time-series information signals;

separately spectrum-transforming a remaining portion of each of the first and the second inverse-transformed spectral signals to form a respective lower band spectral signal for the third and the fourth time-series information signals; and coding the higher band spectral signals in combination with the respective lower band signals for both the third and the fourth time-series information signals into a second code string.

59. The method according to claim 57, wherein the step of transforming the first code string into the second code string comprises the steps of:

decoding the first code string into the first and the second spectral signals;

synthesizing in the frequency-domain a portion of each of the first and the second spectral signals;

inverse-transforming the synthesized portion of each of the first and the second spectral signals to form a plurality of higher band spectral signals for both the third and the fourth time-series information signals;

separately inverse-transforming a remaining portion of each of the first and the second spectral signals to form a respective lower band spectral signal for each of the third and the fourth time-series information signals; and coding the higher band spectral signals in combination with the respective lower band signals for both the third and the fourth time-series information signals into a second code string.

60. The method according to claim 55, wherein the second code string is comparable to the first code string when the first code string is produced after the first and the second time-series information signals have undergone a band dividing operation.

61. The method according to claim 60, wherein the second code string is comparable to the first code string when the first code string is obtained by coding a first and a second spectral signals that have been transformed from the first and the second time-series information signals after the first and the second time-series information signals have undergone a band dividing operation.

62. The method according to claim 55, wherein the higher band comprises the range of 12 kHz or higher in the time-domain.

63. The method according to claim 55, wherein the higher band comprises the range of 12 kHz to 18 kHz in the time-domain.

64. The method according to claim 55, wherein the first code string is obtained by independently coding a first and a second spectral signal that have each been transformed respectively from the first and the second time-series information signals, each of the first and the second time-series information signals corresponding to a respective one of a plurality of channels.

65. The method according to claim 55, wherein the first and the second time-series information signals comprise audio signals.

66. The method according to claim 55, wherein the step of receiving the first code comprises the step of retrieving the first code string from a storage medium.

67. The method according to claim 66, further comprising the step of transmitting the second code string via a communication channel to the recording medium.

68. The method according to claim 67, wherein the communication channel has a transmission capacity and the storage medium has a recording capacity that is substantially different than the transmission capacity of the communication channel.

69. A compressed-data recording and/or reproducing apparatus comprising:

receiving means for receiving a first code string produced by coding a first and a second time-series information signal, the first and the second time-series information signals corresponding to one of a plurality of channels; and transform means for transforming the input first code string into a second code string which when decoded produces a third time-series information signal corresponding to the first time-series information signal and a fourth time-series information signal corresponding to the second time-series information signal, where the third and the fourth time-series information signals each has the same higher band, and where the third time-series information signal is assigned a first weight based on the energy ratio of the first time-series information signal and the fourth time-series information signal is assigned a second weight based on the energy ratio of the second time-series information signal.

70. The apparatus according to claim 69, wherein the first code string is produced after the first and the second time-series information signals have undergone a band dividing operation.

71. The apparatus according to claim 70, wherein the first code string is produced by coding a first and a second spectral signals, the first and the second spectral signals having each been spectrum-transformed from the first and the second time-series information signals after the first and the second time-series information signals have undergone the band dividing operation.

72. The apparatus according to claim 71, wherein the transform means comprises:

means for decoding the first code string into the first and the second spectral signals;

means for inverse-transforming the first and the second spectral signals;

means for synthesizing in the time-domain a portion of each of the first and the second inverse-transformed spectral signals;

means for spectrum-transforming the synthesized portion of each of the first and the second inverse-transformed spectral signals to form a plurality of higher band spectral signals for both the third and the fourth time-series information signals;

means for separately spectrum-transforming a remaining portion of each of the first and the second inverse-transformed spectral signals to form a respective lower band spectral signal for the third and the fourth time-series information signals; and means for coding the higher band spectral signals in combination with the respective lower band signals for both the third and the fourth time-series information signals into a second code string.

73. The apparatus according to claim 71, wherein the transform means comprises:

means for decoding the first code string into the first and the second spectral signals;

means for synthesizing in the frequency-domain a portion of each of the first and the second spectral signals;

means for inverse-transforming the synthesized portion of each of the first and the second spectral signals to form a plurality of higher band spectral signals for both the third and the fourth time-series information signals;

means for separately inverse-transforming a remaining portion of each of the first and the second spectral signals to form a respective lower band spectral signal for each of the third and the fourth time-series information signals; and means for coding the higher band spectral signals in combination with the respective lower band signals for both the third and the fourth time-series information signals into a second code string.

74. The apparatus according to claim 69, wherein the second code string is comparable to the first code string when the first code string is produced after the first and the second time-series information signals have undergone a band dividing operation.

75. The apparatus according to claim 74, wherein the second code string is comparable to the first code string when the first code string is obtained by coding a first and a second spectral signals that have been transformed from the first and the second time-series information signals after the first and the second time-series information signals have undergone a band dividing operation.

76. The apparatus according to claim 69, wherein the higher band comprises the range of 12 kHz or higher in the time-domain.

77. The apparatus according to claim 69, wherein the higher band comprises the range of 12 kHz to 18 klz in the time-domain.

78. The apparatus according to claim 69, wherein the first code string is obtained by independently coding a first and a second spectral signal that have each been transformed respectively from the first and the second time-series information signals, each of the first and the second time-series information signals corresponding to a respective one of a plurality of channels.

79. The apparatus according to claim 69, wherein the first and the second time-series information signals comprise audio signals.

80. The apparatus according to claim 69, further comprising a storage medium adapted to contain the first code string when the first code string is produced.

81. The apparatus according to claim 80, wherein the receiving means for receiving the first code string is adapted to retrieve the first code string from a storage medium.

82. The apparatus according to claim 81, further comprises a means for transmitting the second code string to a recording medium via a communication channel connected to the compressed-data recording and/or receiving apparatus.

83. The apparatus according to claim 82, wherein the communication channel has a transmission capacity and the storage medium has a recording capacity that is substantially different than the transmission capacity of the communication channel.

84. A computer-readable medium containing program instructions for controlling a compressed-data recording and/or reproducing apparatus to perform a method, the method comprising the steps of:

receiving a first code string produced by coding a first plurality of time-series information signal, the first and the second time-series information signals corresponding to one of a plurality of channels; and transforming the first code string into a second code string which when decoded produces a second plurality of information signals, where each of the second plurality of time-series information signals corresponds to a respective one of the first plurality of time-series information signals, and where the second plurality of time-series information signals each has the same higher band when decoded.

85. The computer-readable medium according to claim 84, wherein the method further comprises the steps of:

retrieving the first code string from a storage medium; and transmitting the second code string via a communication channel to the recording medium.

86. The computer-readable medium according to claim 85, wherein the communication channel has a transmission capacity and the storage medium has a recording capacity that is substantially different than the transmission capacity of the communication channel.

87. A computer-readable medium containing program instructions for controlling a compressed-data recording and/or reproducing apparatus to perform a method, the method comprising the steps of:

receiving a first code string produced by coding a first and a second time-series information signal, the first and the second time-series information signals corresponding to one of a plurality of channels; and transforming the input first code string into a second code string which when decoded produces a third time-series information signal corresponding to the first time-series information signal and a fourth time-series information signal corresponding to the second time-series information signal, where the third and the fourth time-series information signals each has the same higher band, and where the third time-series information signal is assigned a first weight based on the energy ratio of the first time-series information signal and the fourth time-series information signal is assigned a second weight based on the energy ratio of the second time-series information signal.

88. The computer-readable medium according to claim 87, wherein the method further comprises the steps of:

retrieving the first code string from a storage medium; and transmitting the second code string via a communication channel to the recording medium.

89. The computer-readable medium according to claim 88, wherein the communication channel has a transmission capacity and the storage medium has a recording capacity that is substantially different than the transmission capacity of the communication channel.

90. A method for selectively controlling the transformation of a first and a second information signal that have each been processed by bit compression into a first code string for storage on a recording medium, the first and the second time-series information signals each corresponding to one of a plurality of channels, the method comprising:

receiving transform-operation-rate control information; and selecting one of a plurality of code transformers to transform the first code string into a second code string based on the transform-operation-rate control information, each of the plurality of code transformers having one of a plurality of filter types with a predetermined number of filter taps, the plurality of filter types including a band dividing filter and a band synthesizing filter.

91. The method according to claim 90, wherein the one of the plurality of code transformers is selected based on a selected filter type identified by the transform-operation-rate control information, the selected filter type corresponds to one of the plurality of filter types.

92. The method according to claim 91, wherein the one of the plurality of code transformers is selected based on a selected number of filter taps identified by the transform-operation-rate control information, the selected number of filter taps corresponds to the predetermined number of taps of one of the plurality of filter types.

93. The method according to claim 90, wherein the one of the plurality of code transformers is selected based on a band in which the second code string is reproducible.

94. The method according to claim 90, wherein the one of the plurality of code transformers is selected based on a band in which respective channels of the second code string are independently reproducible.

95. The method according to claim 90, wherein the first code string and the second code string comprise audio information.

96. An apparatus for selectively controlling the additional compression of a first and a second information signal that have been processed by bit compression into a first code string for storage on a recording medium, comprising:

a plurality of code transformers; and code transform selection means for selecting one of the plurality of code transformers to transform the first code string into a second code string based on input transform-operation-rate control information.

97. The apparatus according to claim 96, wherein each of the plurality of code transformers has a respective one of a plurality of filter types with a predetermined number of filter taps, the plurality of filter types including a band dividing filter and a band synthesizing filter.

98. The apparatus according to claim 97, wherein the code transform selection means selects the one of the plurality of code transformers based on a selected number of filter taps identified by the transform-operation-rate control information, the selected number of filter taps corresponding to the predetermined number of taps of one of the plurality of filter types.

99. The apparatus according to claim 96, wherein bands in which the second code string is reproducible are different among the plurality of code transformers.

100. The apparatus according to claim 96, wherein bands in which respective channels of the second code string are independently reproducible are different among the plurality of code transformers.

101. The apparatus according to claim 96, wherein the first code string and the second code string comprise audio information.

102. A computer-readable medium containing program instructions for controlling a compressed-data recording and/or reproducing apparatus to perform a method, the compressed-data recording and/or reproducing apparatus having a first code string produced by bit compression of a first and a second time series information signal, the method comprising the steps of:

receiving transform-operation-rate control information; and selecting one of a plurality of code transformers to transform the first code string into a second code string based on the transform-operation-rate control information.

103. The computer-readable medium according to claim 102, wherein the one of the plurality of code transformers is selected based on a selected filter type identified by the transform-operation-rate control information, the selected filter type corresponds to one of the plurality of filter types.

104. The computer-readable medium according to claim 103, wherein the one of the plurality of code transformers is selected based on a selected number of filter taps identified by the transform-operation-rate control information, the selected number of filter taps corresponding to the predetermined number of taps of one of the plurality of filter types.

105. The computer-readable medium according to claim 102, wherein the one of the plurality of code transformers is selected based on a band in which the second code string is reproducible.

106. The computer-readable medium according to claim 102, wherein the one of the plurality of code transformers is selected based on a band in which respective channels of the second code string are independently reproducible.

107. The computer-readable medium according to claim 102, wherein the first code string and the second code string comprise audio information.

108. A method for transforming an information signal that has been processed by bit compression into a first code string to facilitate efficient transfer of the information signal to or from a recording medium, the information signal having been divided into a first band group based on a first block length before being transformed into a spectral signal that is then encoded into the first code string, the method comprising:

decoding the first code string into the spectral signal;

dividing the decoded spectral signal into a plurality of frequency bands that form a second band group, wherein a first portion of the decoded spectral signal is divided into a first band of the plurality of frequency bands and a second portion of the decoded spectral signal is divided into a second band of the plurality of frequency bands, the first band being higher in frequency spectrum than the second band;

inverse-transforming the first portion of the spectral signal of the first band into a decimated time-series signal; and transforming the decimated time-series signal into a spectral signal within a band formed from the first and second bands; and coding the transformed spectral signal into a second code string.

109. The method according to claim 108, wherein a portion of the transformed spectral signal includes a lower-band spectral signal within the higher band of the spectral signal decoded from the first code string.

110. The method according to claim 108, wherein a first plurality of time-series signal components obtained by performing a band dividing operation on a higher band of the information signal that has been processed by bit compression into the first code string are comparable to a second plurality of time-series signal components obtained by performing a band dividing operation on a higher band of the transformed spectral signal encoded into the second code string.

111. The method according to claim 108, wherein the band formed from the first and second bands is in the range of 12 kHz to 24 kHz.

112. The method according to claim 108, wherein the information signal comprises time-series audio signal.

113. The method according to claim 108, wherein the step of receiving the first code comprises the step of retrieving the first code string from a storage medium.

114. The method according to claim 113, further comprising the step of transmitting the second code string via a communication channel to the recording medium.

115. The method according to claim 114, wherein the communication channel has a transmission capacity and the storage medium has a recording capacity that is substantially different than the transmission capacity of the communication channel.

116. An apparatus for use in a compressed-data recording and/or reproducing system to transform a time-series information signal that has been processed by bit compression into a first code string, the apparatus comprising:

means for receiving the first code string produced by coding a spectral signal that has been transformed from the information signal after the information signal has been divided into a first band group;

means for decoding the first code string into the spectral signal;

means for dividing the decoded spectral signal into a plurality of frequency bands that form a second band group, wherein a first portion of the decoded spectral signal is divided into a first band of the plurality of frequency bands and a second portion of the decoded spectral signal is divided into a second band of the plurality of frequency bands, the first band being higher in frequency spectrum than the second band;

means for inverse-transforming the first portion of the spectral signal of the first band into a decimated time-series signal; and means for transforming the decimated time-series signal into a spectral signal within a band formed from the first and second bands; and means for coding the transformed spectral signal into a second code string.

117. The apparatus according to claim 116, wherein a portion of the transformed spectral signal includes a lower-band spectral signal within the higher band of the spectral signal decoded from the first code string.

118. The apparatus according to claim 116, wherein a first plurality of time-series signal components obtained by performing a band dividing operation on a higher band of the information signal that has been processed by bit compression into the first code string are comparable to a second plurality of time-series signal components obtained by performing a band dividing operation on a higher band of the transformed spectral signal encoded into the second code string.

119. The apparatus according to claim 116, wherein the band formed from the first and second bands is in the range of 12 kHz to 24 kHz.

120. The apparatus according to claim 116, wherein the information signal comprises time-series audio signal.

121. The apparatus according to claim 116, wherein the compressed-data recording and/or reproducing system has a storage medium, and the means for receiving the first code string is adapted to retrieve the first code string from the storage medium.

122. The apparatus according to claim 121, further comprising a means for transmitting the second code string to a recording medium via a communication channel connected to the compressed-data recording and/or receiving apparatus.

123. The apparatus according to claim 122, wherein the communication channel has a transmission capacity and the storage medium has a recording capacity that is substantially different than the transmission capacity of the communication channel.

124. A method transforming an information signal that has been processed by bit compression into a first code string to facilitate efficient transfer of the information signal to or from a recording medium, the information signal having been divided into a first band group based on a first block length before being transformed into a spectral signal that is then encoded into the first code string, the method comprising:

decoding the first code string into the spectral signal;

dividing the decoded spectral signal into a plurality of frequency bands, a first portion of the decoded spectral signal is divided into a first band of the plurality of frequency bands, the first band is lower in frequency spectrum than other bands in the plurality of frequency bands;

inverse-transforming the first portion of the spectral signal of the first band into a decimated time-series signal while substantially preventing inverse-transforming the remaining portion of the spectral signal;

transforming the decimated time-series signal into a lower-band spectral signal; and a coding step of coding the lower-band spectral signal into a second code string.

125. The method according to claim 124, wherein the lower-band spectral signal is transformed with a second block length that is different from the first block length.

126. The method according to claim 124, wherein the step of receiving the first code comprises the step of retrieving the first code string from a storage medium.

127. The method according to claim 126, further comprising the step of transmitting the second code string via a communication channel to the recording medium.

128. The method according to claim 128, wherein the communication channel has a transmission capacity and the storage medium has a recording capacity that is substantially different than the transmission capacity of the communication channel.

129. An apparatus for use in a compressed-data recording and/or reproducing system to transform a time-series information signal that has been processed by bit compression into a first code string, the apparatus comprising:

means for receiving the first code string produced by coding a spectral signal that has been transformed from the information signal after the information signal has been divided into a first band group;

means for decoding the first code string into the spectral signal;

means for dividing the decoded spectral signal into a plurality of frequency bands, a first portion of the decoded spectral signal is divided into a first band of the plurality of frequency bands, the first band is lower in frequency spectrum than other bands in the plurality of frequency bands;

means for inverse-transforming the first portion of the spectral signal of the first band into a decimated time-series signal while substantially preventing inverse-transforming the remaining portion of the spectral signal;

means for transforming the decimated time-series signal into a lower-band spectral signal; and means for coding the lower-band spectral signal into a second code string.

130. The apparatus according to claim 129, wherein the means for transforming uses a second block length that is different from the first block length to form the lower-band spectral signal, the second block length.

131. The apparatus according to claim 129, wherein the compressed-data recording and/or reproducing system has a storage medium, and the means for receiving the first code string is adapted to retrieve the first code string from the storage medium.

132. The apparatus according to claim 131, further comprising a means for transmitting the second code string to a recording medium via a communication channel connected to the compressed-data recording and/or receiving apparatus.

133. The apparatus according to claim 132, wherein the communication channel has a transmission capacity and the storage medium has a recording capacity that is substantially different than the transmission capacity of the communication channel.

134. A computer-readable medium containing program instructions for controlling a compressed-data recording and/or reproducing apparatus to perform a method, the compressed-data recording and/or reproducing apparatus having a first code string produced by bit compressing an information signal, wherein the information signal is processed as a first block with a first block length, the information signal is divided into a first band group based on the first block length, the first block includes a time-series component of the information signal, and the time-series component is transformed using the first block length into a spectral signal that is then encoded into the first code string, the method comprising the steps of:

decoding the first code string into the spectral signal;

dividing the decoded spectral signal into a plurality of frequency bands that form a second band group, wherein a first portion of the decoded spectral signal is divided into a first band of the plurality of frequency bands and a second portion of the decoded spectral signal is divided into a second band of the plurality of frequency bands, the first band being higher in frequency spectrum than the second band;

inverse-transforming the first portion of the spectral signal of the first band into a decimated time-series signal; and transforming the decimated time-series signal into a spectral signal within a band formed from the first and second bands; and coding the transformed spectral signal into a second code string.

135. The computer-readable medium according to claim 134, wherein the method further comprises the steps of:

retrieving the first code string from a storage medium; and transmitting the second code string via a communication channel to the recording medium.

136. The computer-readable medium according to claim 135, wherein the communication channel has a transmission capacity and the storage medium has a recording capacity that is substantially different than the transmission capacity of the communication channel.

137. A computer-readable medium containing program instructions for controlling a compressed-data recording and/or reproducing apparatus to perform a method, the compressed-data recording and/or reproducing apparatus having a first code string produced by bit compressing an information signal, wherein the information signal is processed as a first block length, the information signal is divided into a first band group based on the first block length, the first block includes a time-series component of the information signal, and the time-series component is transformed using the first block length into a spectral signal that is then encoded into the first code string, the method comprising the steps of:

decoding the first code string into the spectral signal;

dividing the decoded spectral signal into a plurality of frequency bands, a first portion of the decoded spectral signal is divided into a first band of the plurality of frequency bands, the first band is lower in frequency spectrum than other bands in the plurality of frequency bands;

inverse-transforming the first portion of the spectral signal of the first band into a decimated time-series signal while substantially preventing inverse-transforming the remaining portion of the spectral signal;

transforming the decimated time-series signal into a lower-band spectral signal; and a coding step of coding the lower-band spectral signal into a second code string.

138. The computer-readable medium according to claim 137, wherein the method further comprises the steps of:

retrieving the first code string form a storage medium; and transmitting the second code string via a communication channel to the recording medium.

139. The computer-readable medium according to claim 138, wherein the communication channel has a transmission capacity and the storage medium has a recording capacity that is substantially different that the transmission capacity of the communication channel.

* * * * *